Figure 22:
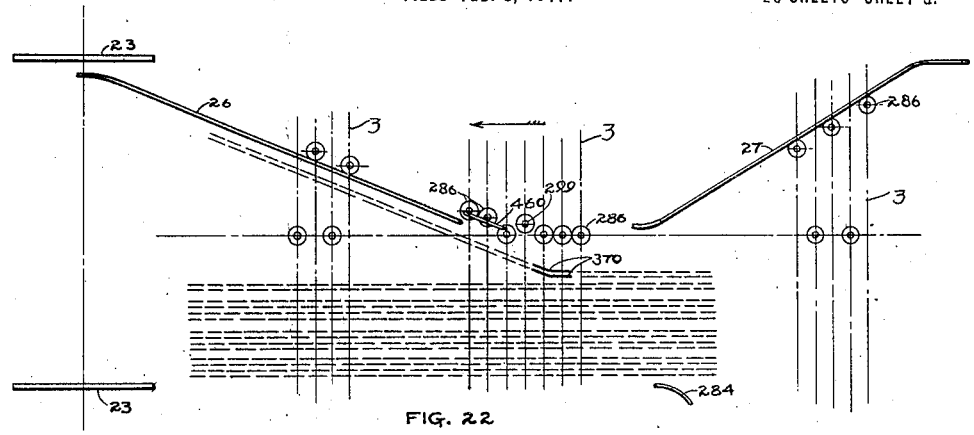

Jan. 16, 1923.
C. C. CADDEN.
MAIL ASSEMBLING MACHINE.
FILED FEB. 8, 1917.
1,442,126.
20 SHEETS—SHEET 1.
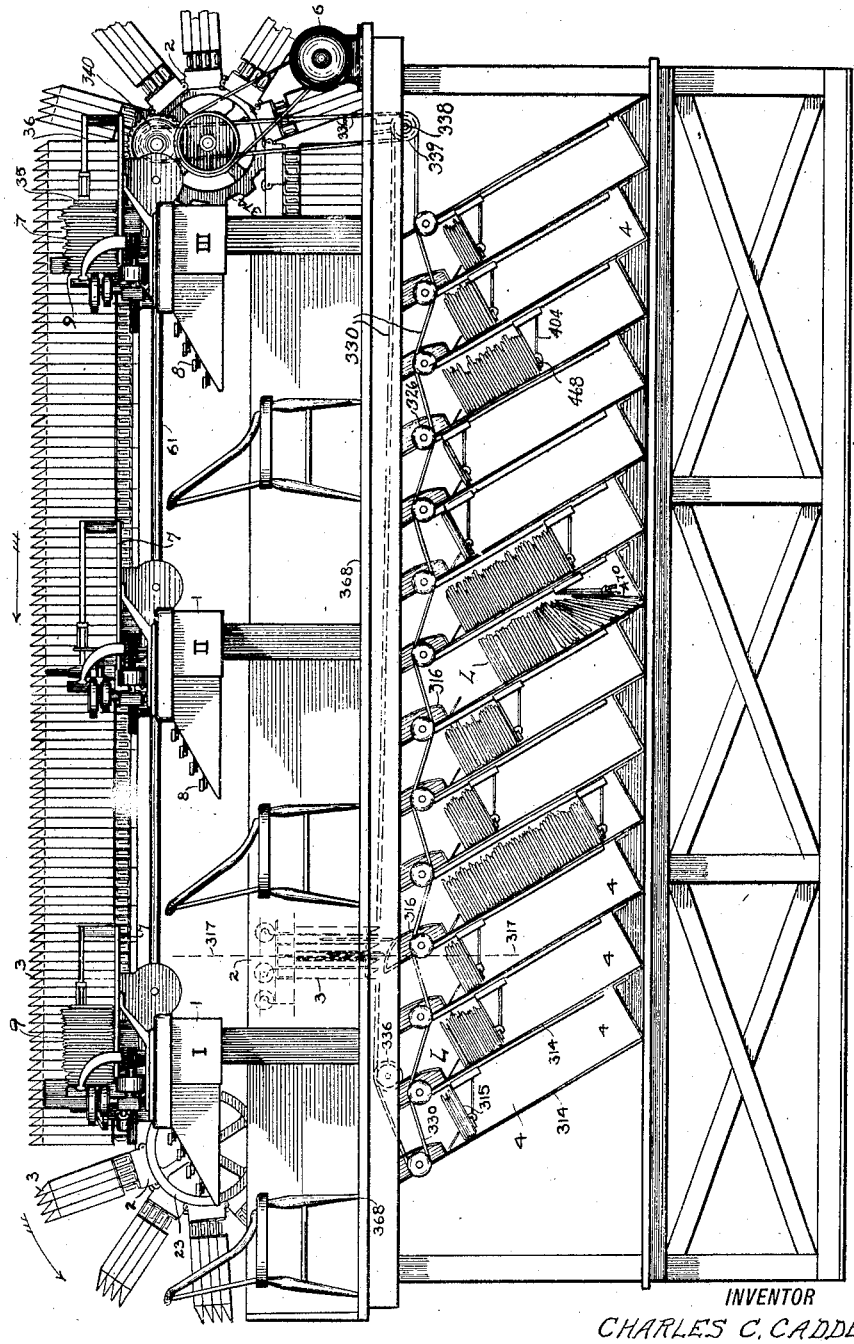
INVENTOR
CHARLES C. CADDEN,
BY
Baker Macklin
ATTORNEYS Jan. 16, 1923.
C. C. CADDEN.
MAIL ASSEMBLING MACHINE.
FILED FEB. 8, 1917.
1,442,126.
20 SHEETS—SHEET 2.
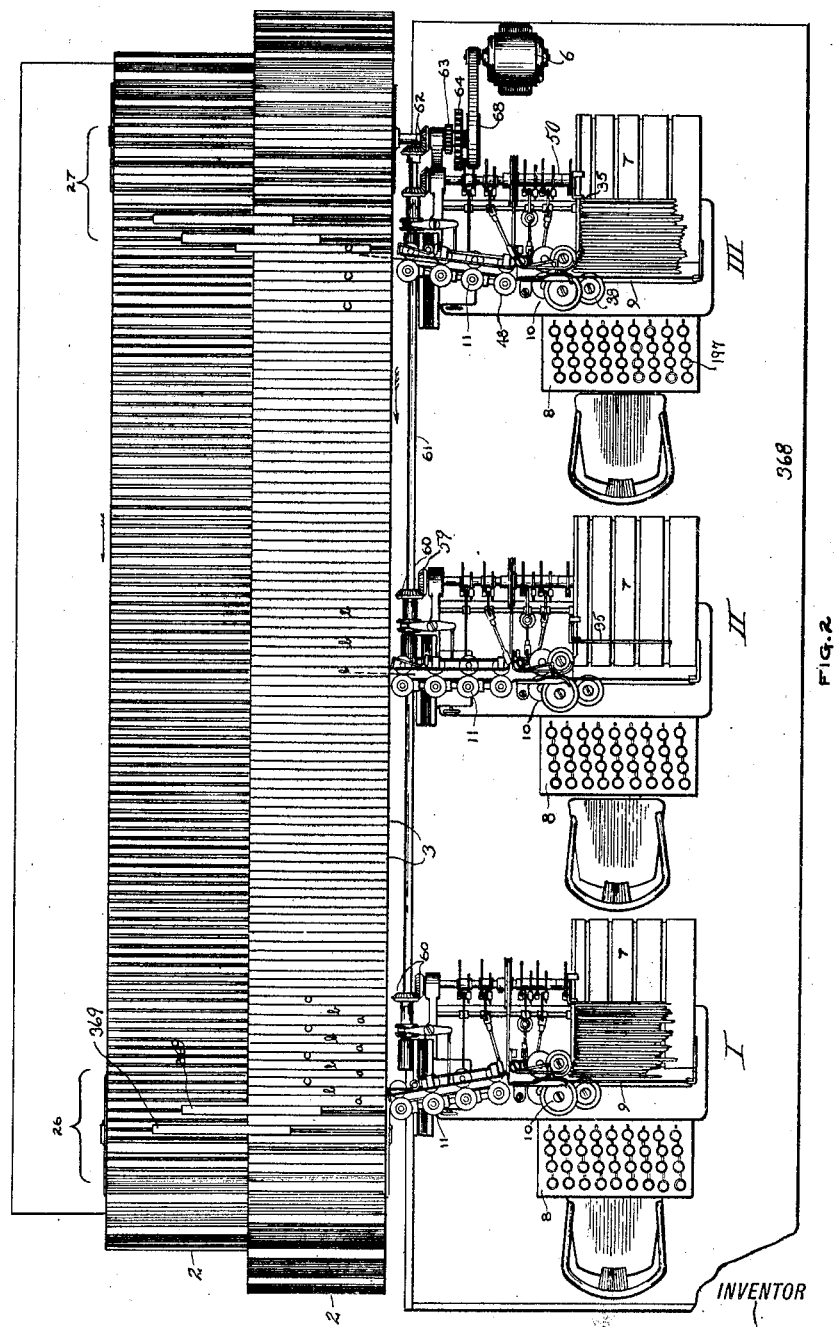
INVENTOR
CHARLES C. CADDEN,
BY
Baker & Macklin,
ATTORNEY'S Jan. 16, 1923.

C. C. CADDEN.
MAIL ASSEMBLING MACHINE.
FILED FEB. 8, 1917.

1,442,126.

20 SHEETS—SHEET 5.

INVENTOR
CHARLES C. CADDEN,
BY
Bates & Macklin,
ATTORNEYS

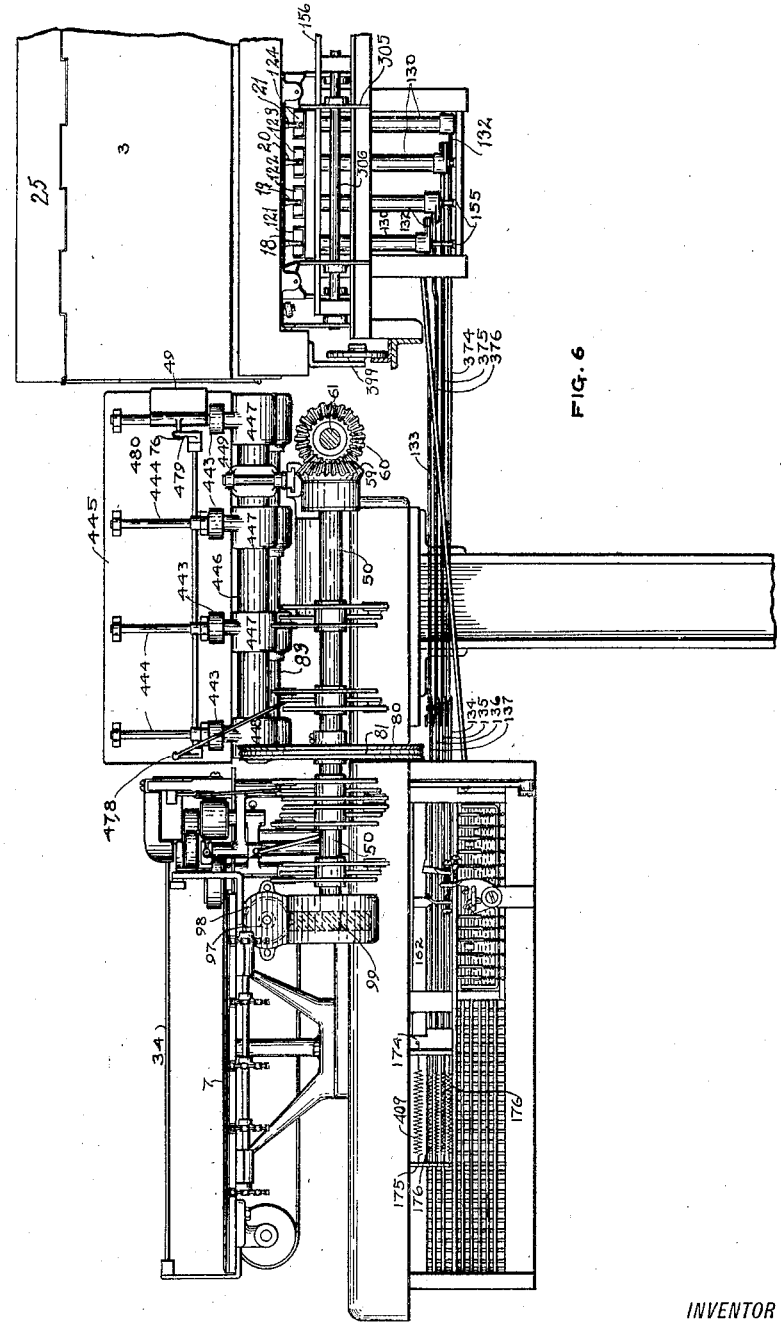

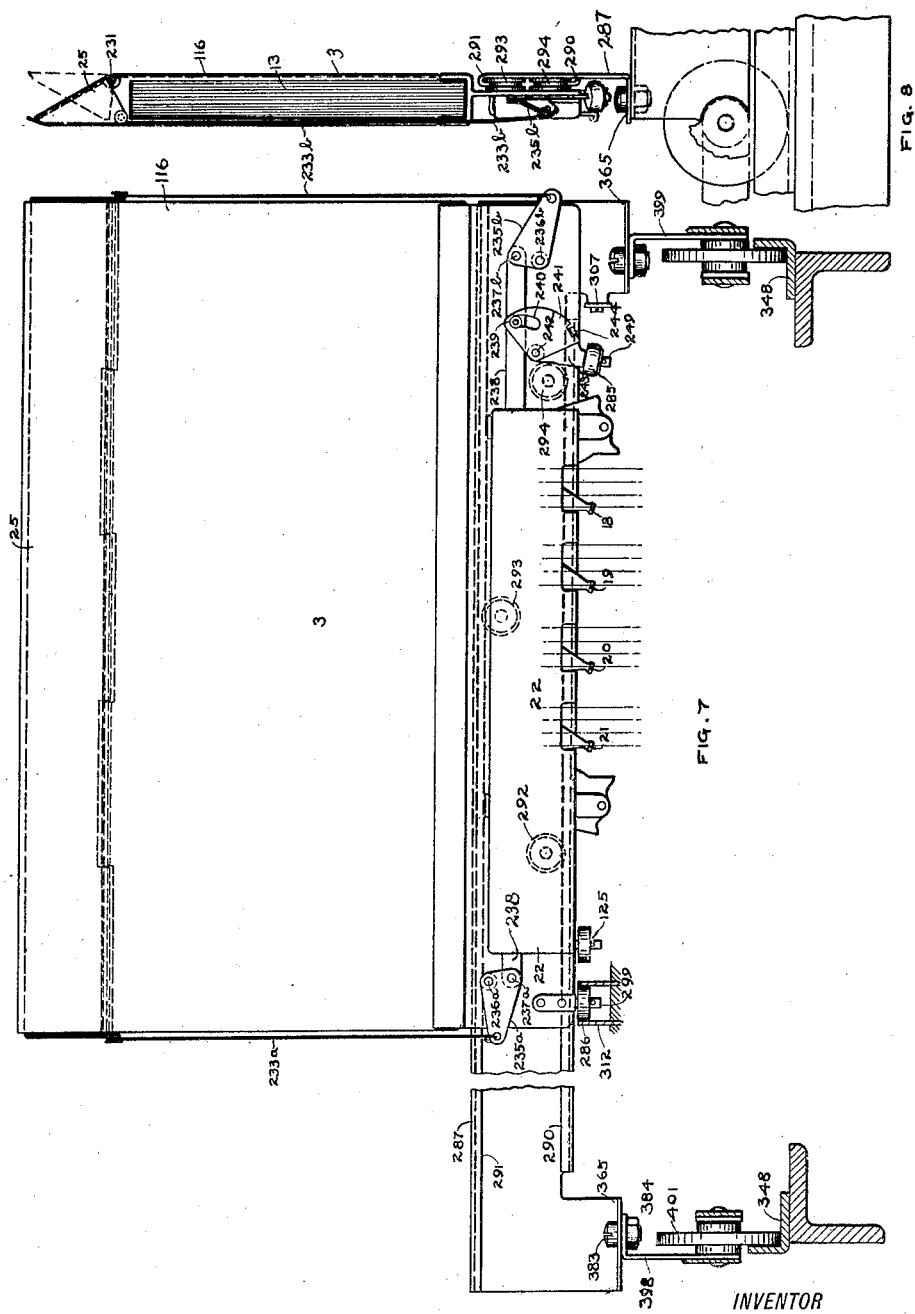

Jan. 16, 1923.　　　　　　　　　　　　　　　　　　　1,442,126.
C. C. CADDEN.
MAIL ASSEMBLING MACHINE.
FILED FEB. 8, 1917.　　　　　　　　　20 SHEETS—SHEET 8.

INVENTOR
CHARLES C. CADDEN
BY
Baker & Macklin,
ATTORNEYS

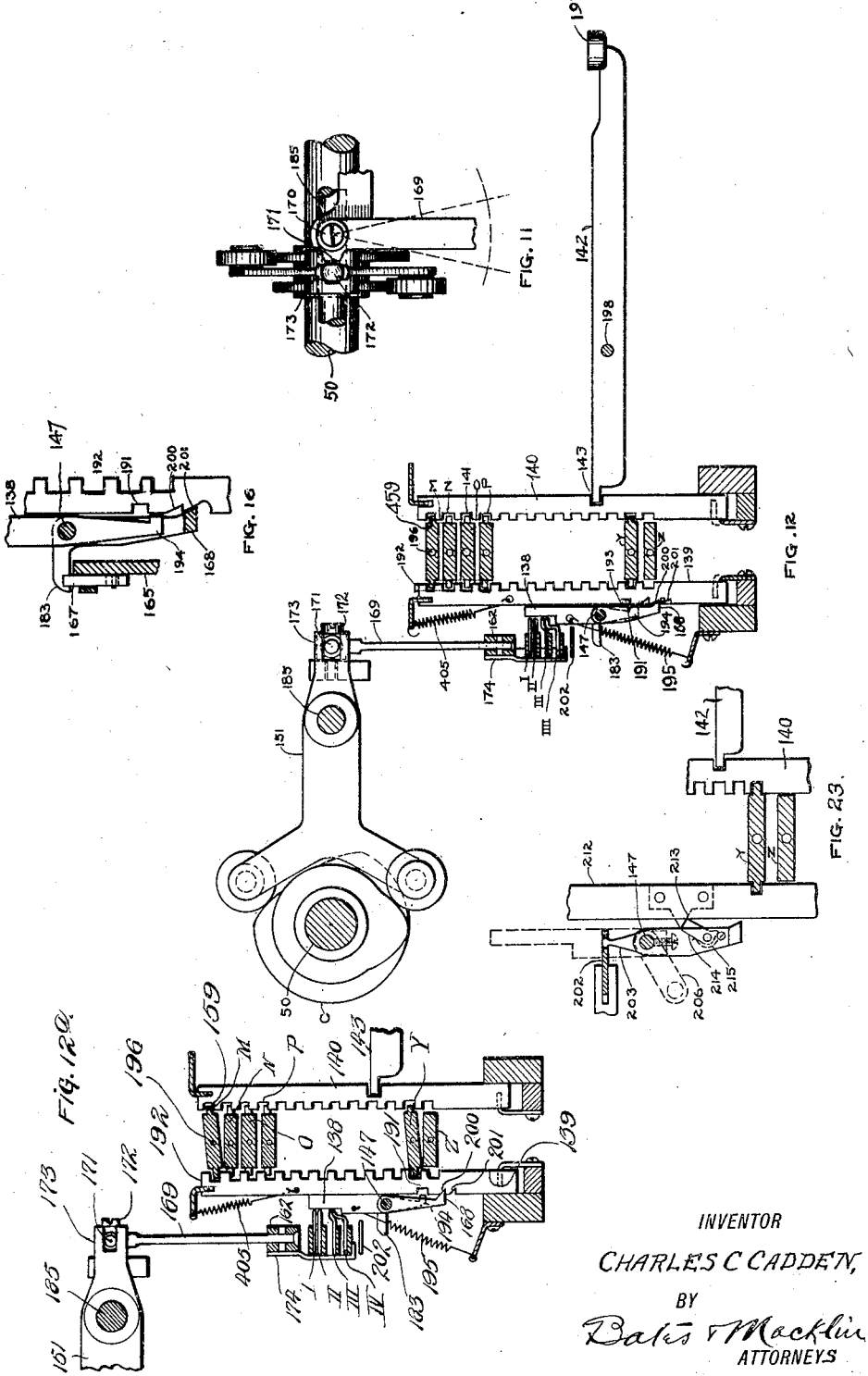

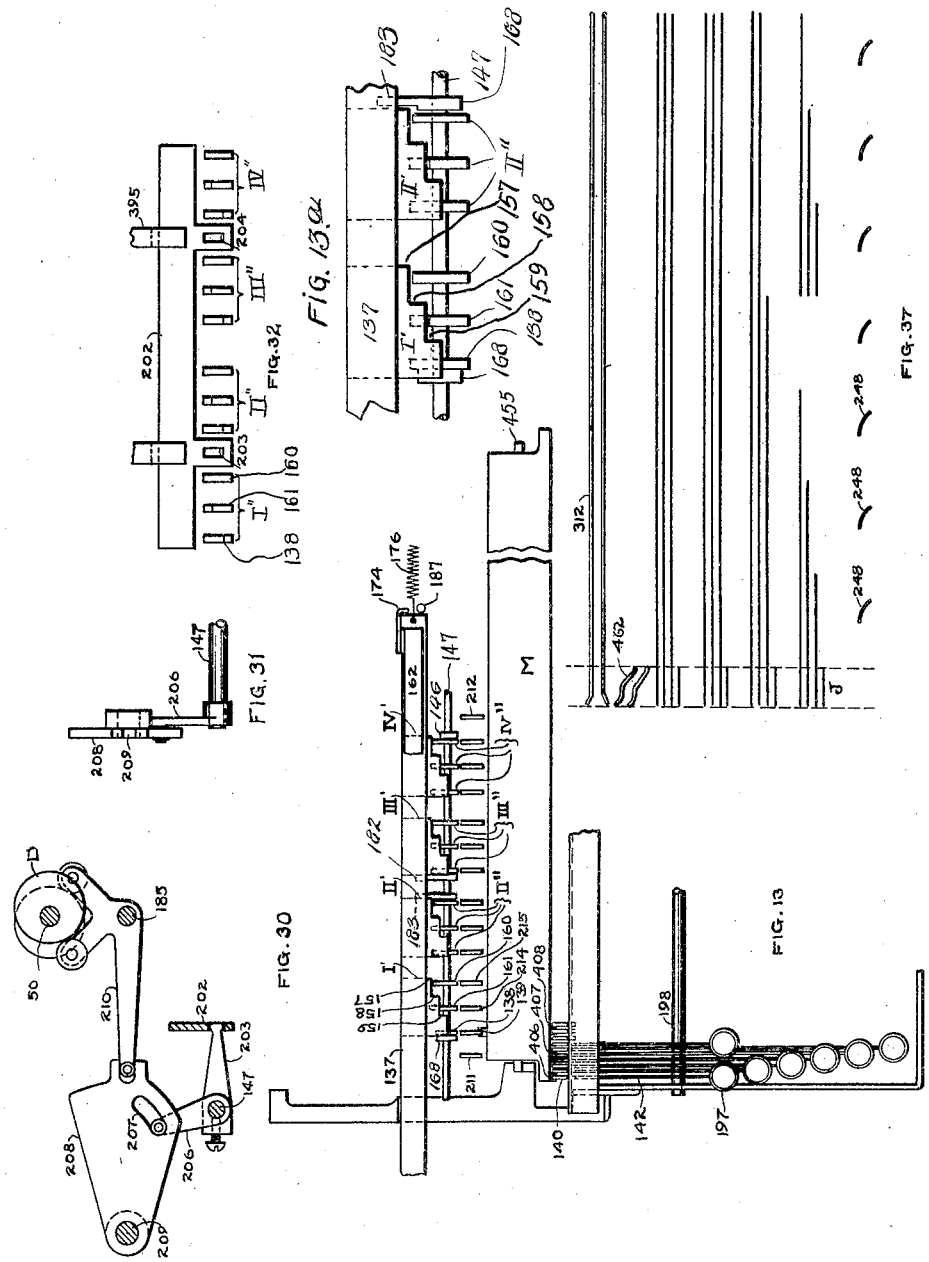

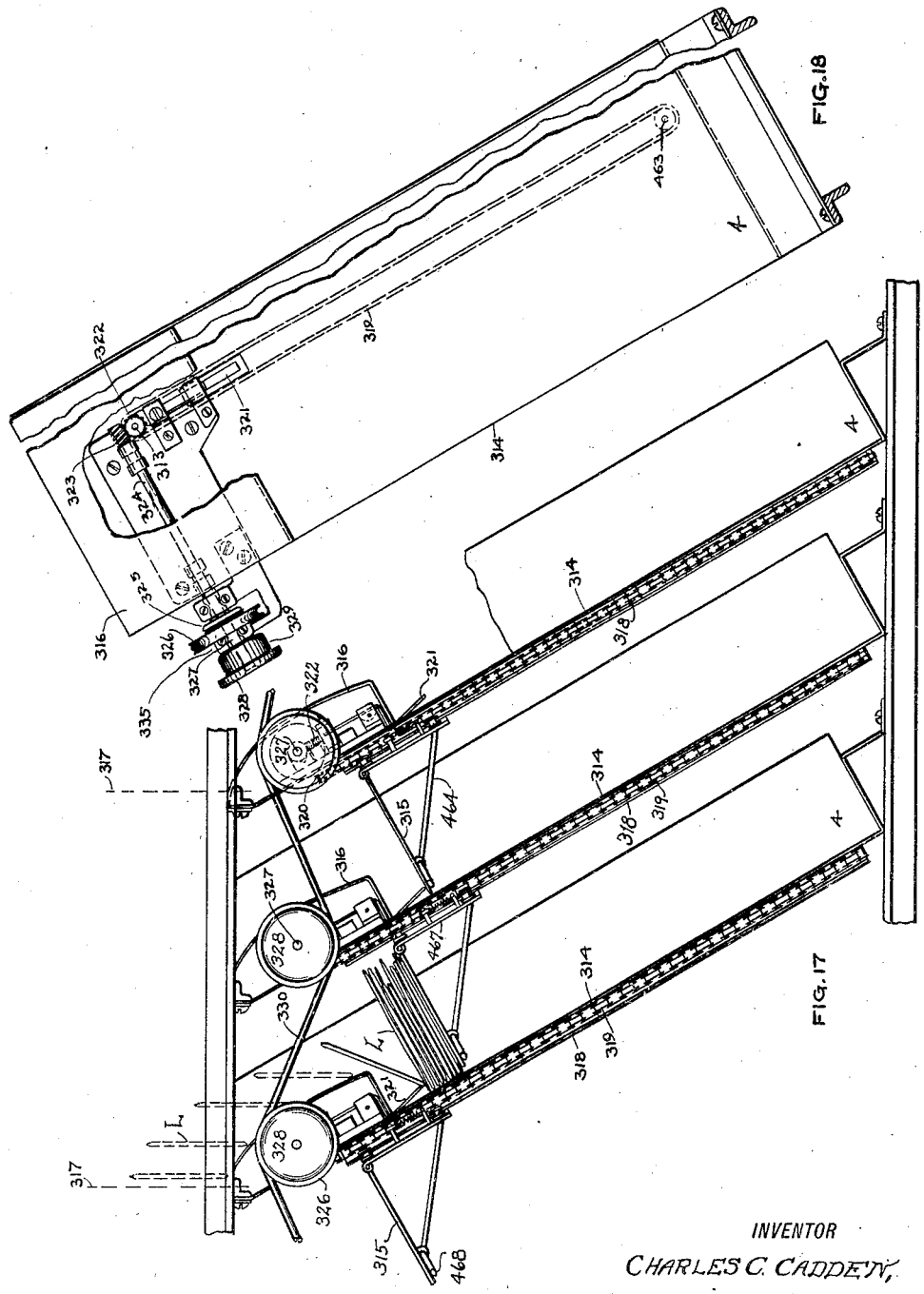

Jan. 16, 1923.

C. C. CADDEN.
MAIL ASSEMBLING MACHINE.
FILED FEB. 8, 1917.

1,442,126.

20 SHEETS—SHEET 13.

INVENTOR
CHARLES C CADDEN
BY
Baker Macklin
ATTORNEYS

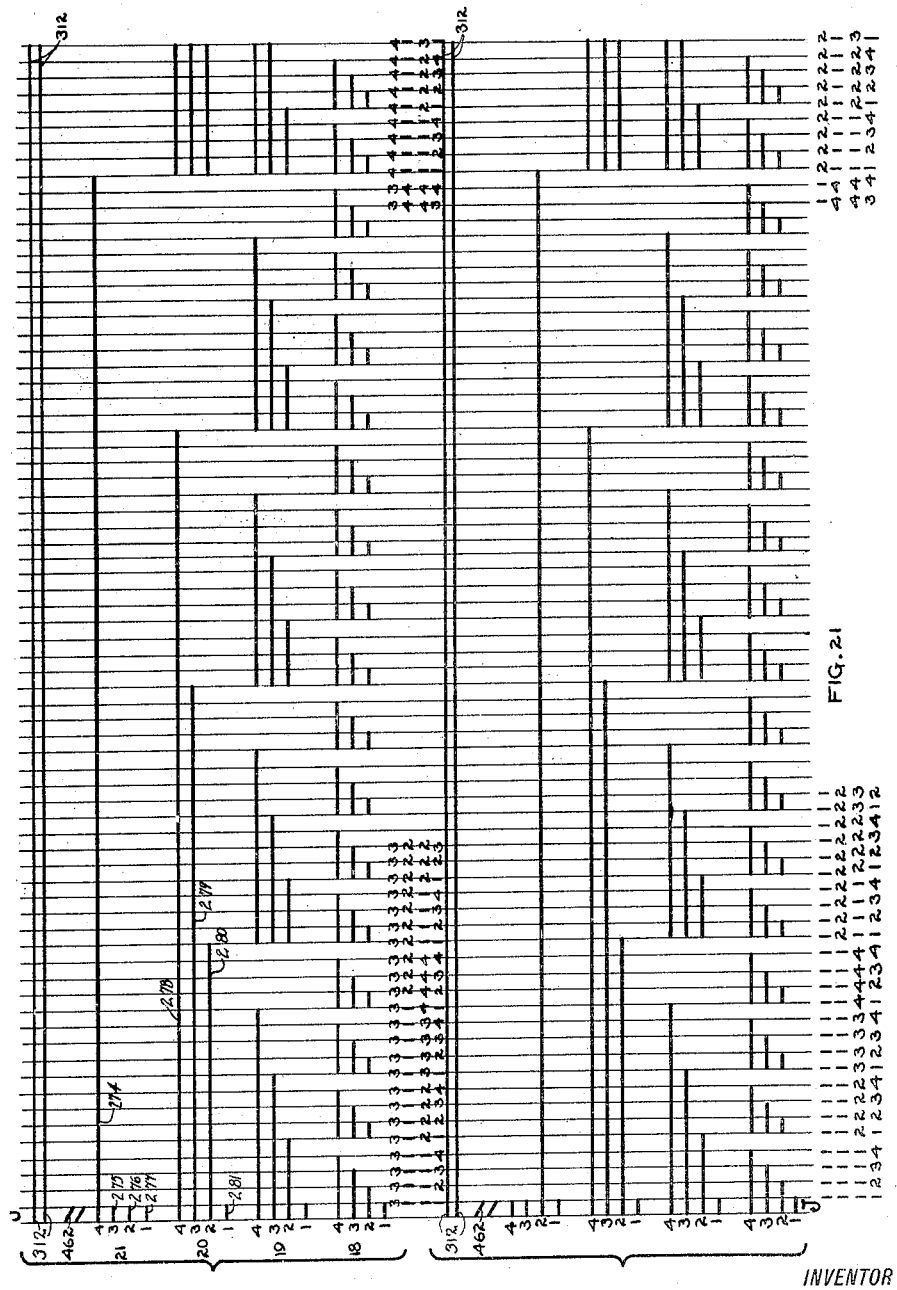

Jan. 16, 1923.    1,442,126.
C. C. CADDEN.
MAIL ASSEMBLING MACHINE.
FILED FEB. 8, 1917.    20 SHEETS—SHEET 15.
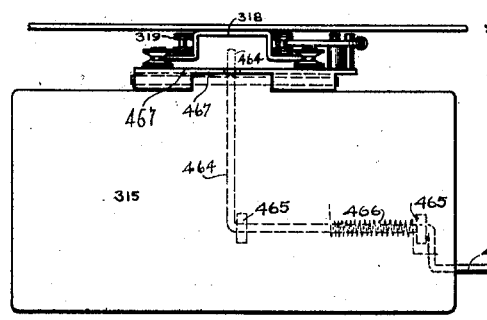
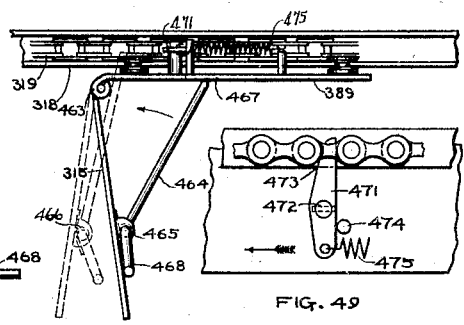
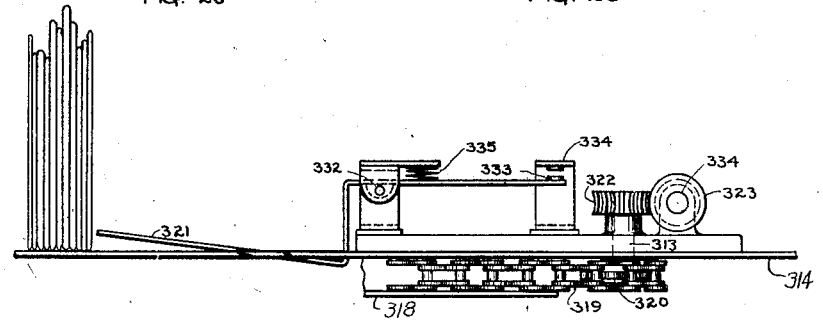
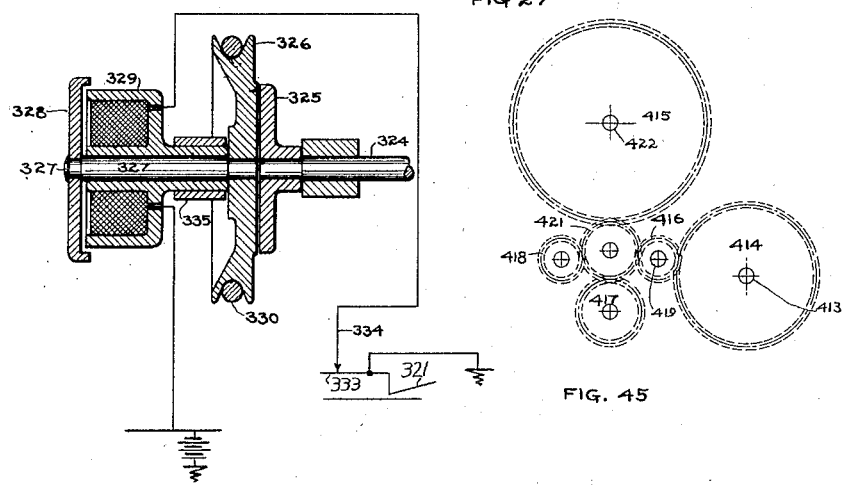
INVENTOR
CHARLES C. CADDEN,
BY
Baker Macklin,
ATTORNEYS

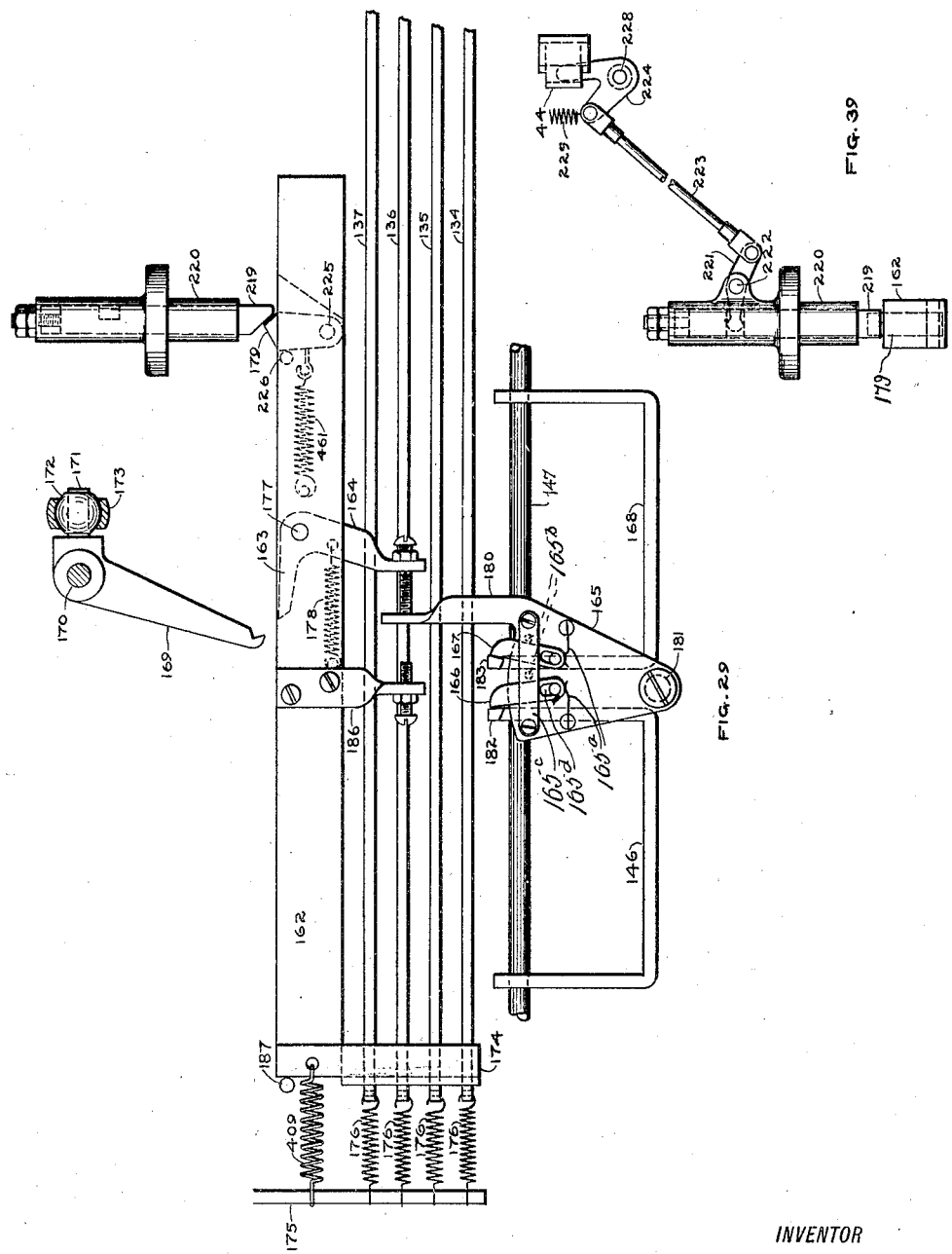

Jan. 16, 1923.

C. C. CADDEN.
MAIL ASSEMBLING MACHINE.
FILED FEB. 8, 1917.

1,442,126.

20 SHEETS—SHEET 17.

INVENTOR
CHARLES C. CADDEN,
BY
*Baker & Macklin*
ATTORNEYS

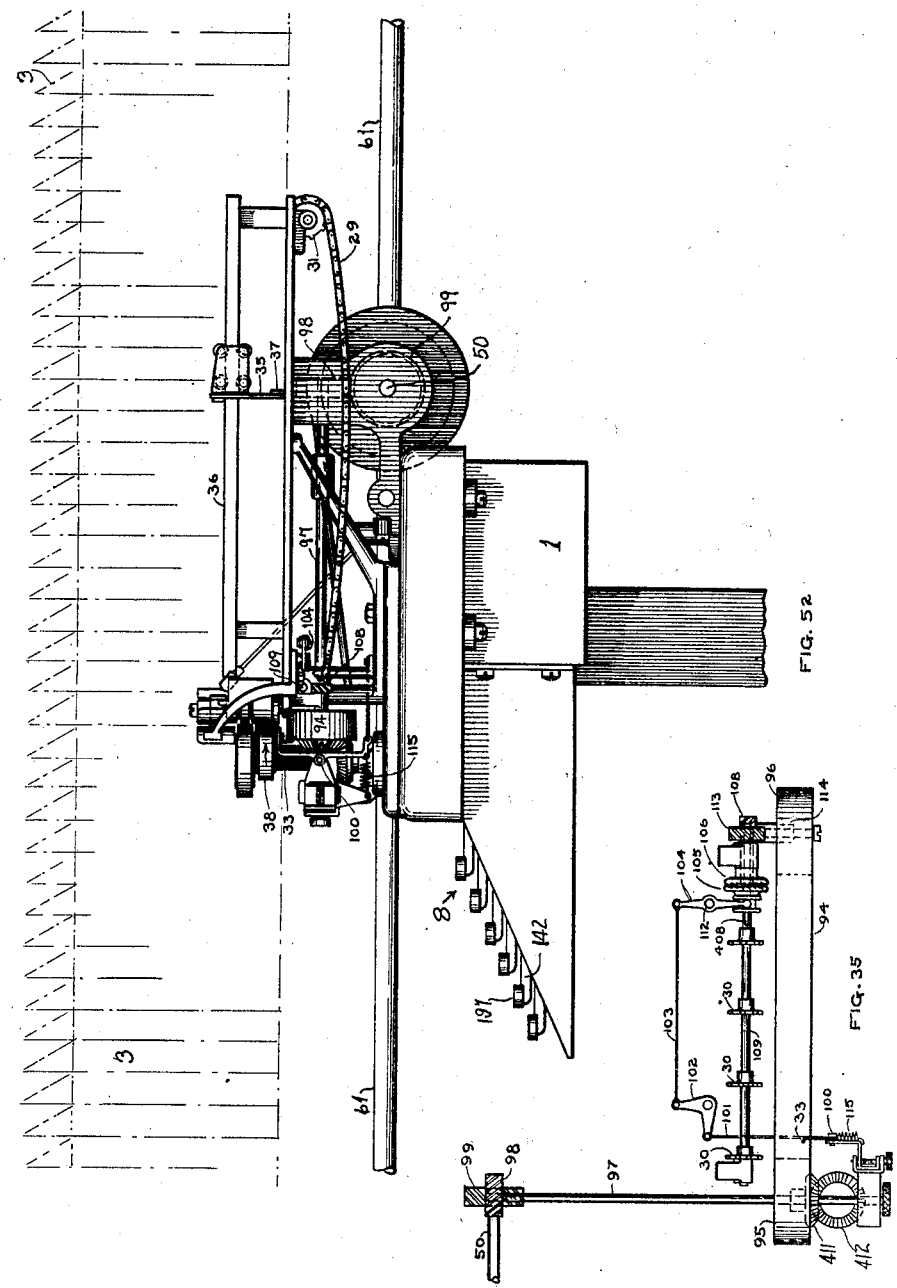

Jan. 16, 1923. 1,442,126
C. C. CADDEN.
MAIL ASSEMBLING MACHINE.
FILED FEB. 8, 1917.
20 SHEETS—SHEET 19.

INVENTOR
CHARLES C CADDEN,
BY
Baker & Macklin
ATTORNEYS

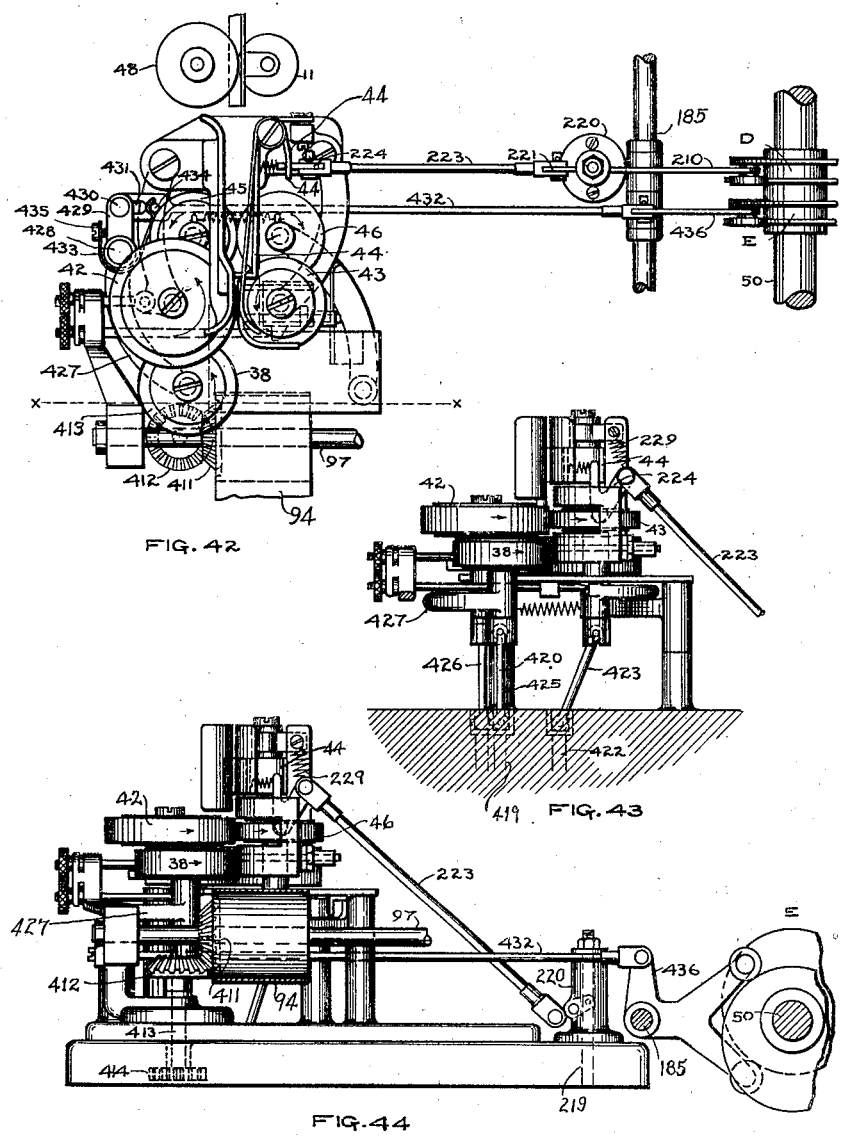

Patented Jan. 16, 1923.

1,442,126

UNITED STATES PATENT OFFICE.

CHARLES C. CADDEN, OF AKRON, OHIO, ASSIGNOR TO MECHANICAL EFFICIENCY COMPANY, A CORPORATION OF DELAWARE.

MAIL-ASSEMBLING MACHINE.

Application filed February 8, 1917. Serial No. 147,515.

*To all whom it may concern:*

Be it known that I, CHARLES C. CADDEN, a citizen of the United States, residing at Akron, in the county of Summit and State of Ohio, have invented a certain new and useful Improvement in Mail-Assembling Machines, of which the following is a full, clear, and exact description, reference being had to the accompanying drawings.

Heretofore mail distributing machines have been proposed wherein there is a keyboard, a series of receptacles, and mechanism whereby the operator at the keyboard, inspecting the addresses of successive letters may, by pressing the keys, mechanically distribute the letters to corresponding receptacles. In the operation of such machines, however, the limit of utility is quickly reached, because a large number of letters usually go to the same destination or route, and the corresponding receptacle or receptacles become rapidly filled and have to be continuously emptied by an attendant. If it is sought to obviate this difficulty by providing several receptacles for any important route, the labor of collecting mail for the same destination or route from such large number of receptacles offsets to quite an extent the time saved by means of the keyboard delivery.

It is not feasible to take care of the different amounts of mail for different routes by having extra boxes for special routes, or correspondingly different-sized boxes, because the relative quantities of mail for different destinations vary greatly at different times. Moreover, if the necessary number of duplicate boxes were provided, or if the boxes were made of sufficiently varying sizes to take care of the average run of mail, technical difficulties would be encountered in causing the distribution to them, as well as in arranging the machine within desirable compact space.

I have found that the desired result of rapidly taking care of vast quantities of mail intended for different routes and varying in amounts and relative proportions, may be accomplished efficiently by providing a plurality of keyboard-controlled mechanisms by which the mail from different sources may be individually and simultaneously distributed, and co-relating with such keyboard mechanisms an automatic assembling system, whereby the different letters as they are being distributed will be assembled from their various sources into single receptacles corresponding to the route or destination. By such a system, I provide a comparatively small number of large boxes, each corresponding to a route or destination, into which the letters from various sources are assembled and out of which they may be taken by the operator in quantities and tied ready for sacking. The delay incident to collecting distributed mail from a large number of boxes is therefore avoided, and a number of operators may work simultaneously in the selective assembling of mail from various sources into a single set of boxes.

My invention, comprising the means for effecting the desired selective assembling of mail, consists broadly of the combination of a plurality of keyboard mechanisms, where operators may manually control the distribution of the successive letters combined with automatic means for assembling such letters while they are being distributed. Phrased differently, my invention provides a series of receptacles, a plurality of keyboards, and mechanism whereby mail distributed by the various keyboards is noninterferingly assembled in the receptacles.

By the term keyboard, as used herein, I mean a set of individually operable manual elements or keys grouped together for convenient actuation by the hands of the operator. In a mail classifying machine, speed is one of the essential characteristics; otherwise the machine would have little advantage over hand classification. Experience has demonstrated that more rapid manual operation can be effected by individual keys which the operator touches with various fingers than by any other hand actuated arrangement. As will hereinafter appear, my classification machine finds its limit of speed simply in the speed of the operator.

An important characteristic of my invention is that I am enabled to combine into one compact machine several keyboards, conveying mechanism, and receptacles receiving letters despatched from the various keyboards, thereby avoiding the necessity of duplication of machines, such as heretofore used, where one keyboard is associated with a single set of boxes, and effecting a great saving of space, and of the time and labor of collection. With my machine all the letters from all the operators for any particular destination may be assembled into a single box, where, without any further gathering or assembling, outgoing mail can be at once tied into packs and sacked for shipment as fast as it accumulates. The attendants need only watch compactly positioned receptacles of large capacity arranged in a minimum space and in a manner that renders them easily accessible.

While a plurality of keyboards, selectively assembling mail from various sources, are employed in the preferred embodiment of my invention, it should be noted that the distribution system I have invented is thoroughly operative with a single keyboard, and when so used will provide some of the advantages of my invention. In fact, it is one of the valuable features of my invention that the number of keyboards employed with a given set of receptacles in the system may be varied from time to time as the quantity of mail requires. Thus, if the machine is put out in its preferred form with several keyboards, and any of them should be temporarily out of commission the machine may be operated in the usual manner with the remaining keyboards. Or the machine may be sold as a distributing machine with a single keyboard, and other keyboards added later, if an increase in the bulk of mail requires the assembling feature, resulting from multiple keyboards. Accordingly, many of the novel features of my invention are independent of the number of keyboards, and are so claimed herein.

I have likewise devised various other improvements for carrying out my idea of an apparatus to sort and assemble quickly large bulks of mail and classify it as completely as possible with one reading of the address of the letters. I have devised improvements in the selectors on the carriers and improved the mounting of carriers in the conveyor, and provided a duplex conveyor, so that I make available to the carriers a greater number of receptacles with a minimum travel of the same than has heretofore been possible, and I have simplified the keyboards to render practical the use of such increased number of receptacles.

In mail sorting machines as heretofore devised, a single key is used for each receptacle, hence the keyboard becomes large and cumbersome and difficult for the operator to manipulate with speed; whereas, with my improvements, I enable an operator to distribute to a large number of receptacles by a keyboard having but few keys, with which small number the necessary manual skill as to the location of the individual keys is quickly acquired by the average operator. I accomplish the result just referred to by dividing the keyboard into two banks, one for each hand, and arranging the selective mechanism so that it is controlled by the correlated actuation of two keys, one in each bank. Thus the number of receptacles served is equal to the product of the numbers of keys in the respective banks. This is another valuable feature of my invention, and may be availed of whether a plurality of keyboards or only a single keyboard, is employed.

My invention includes also the mechanism in the receptacles which renders the use of large ones permissible in practice, as that mechanism builds the mail into compact orderly stacks which are convenient to handle, and preserves the "facing" of the letters as established at the "Facing Tables," when the mail is first received into the office.

My invention includes also a number of other improvements which will be described in detail in the following specification, and be summarized in appropriate claims.

Figure 3:
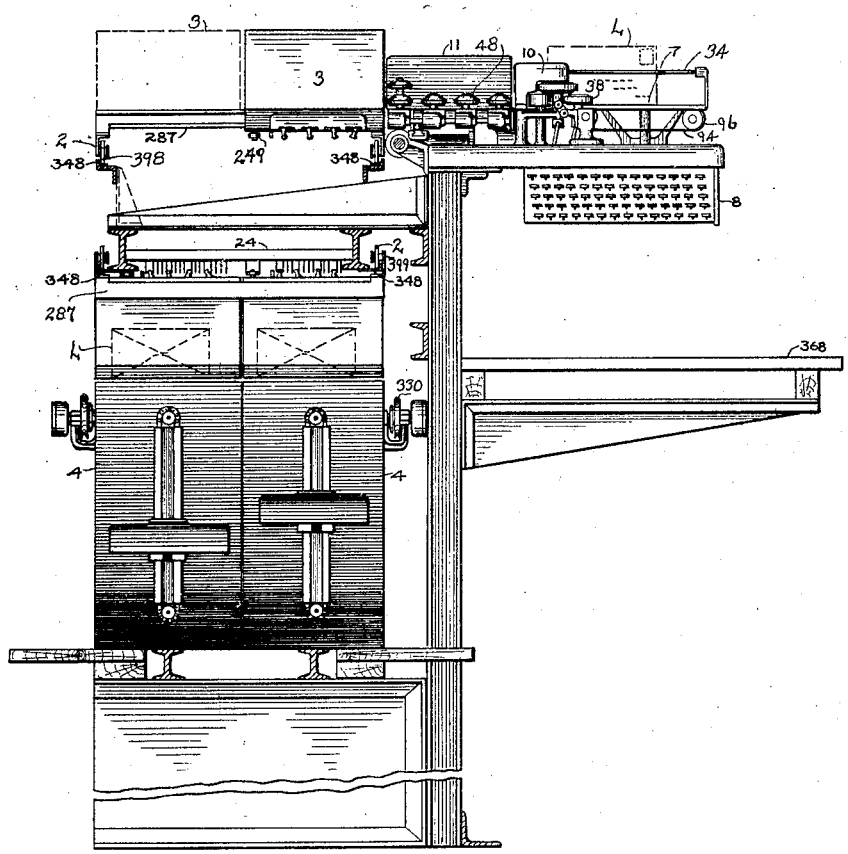
Figure 4:
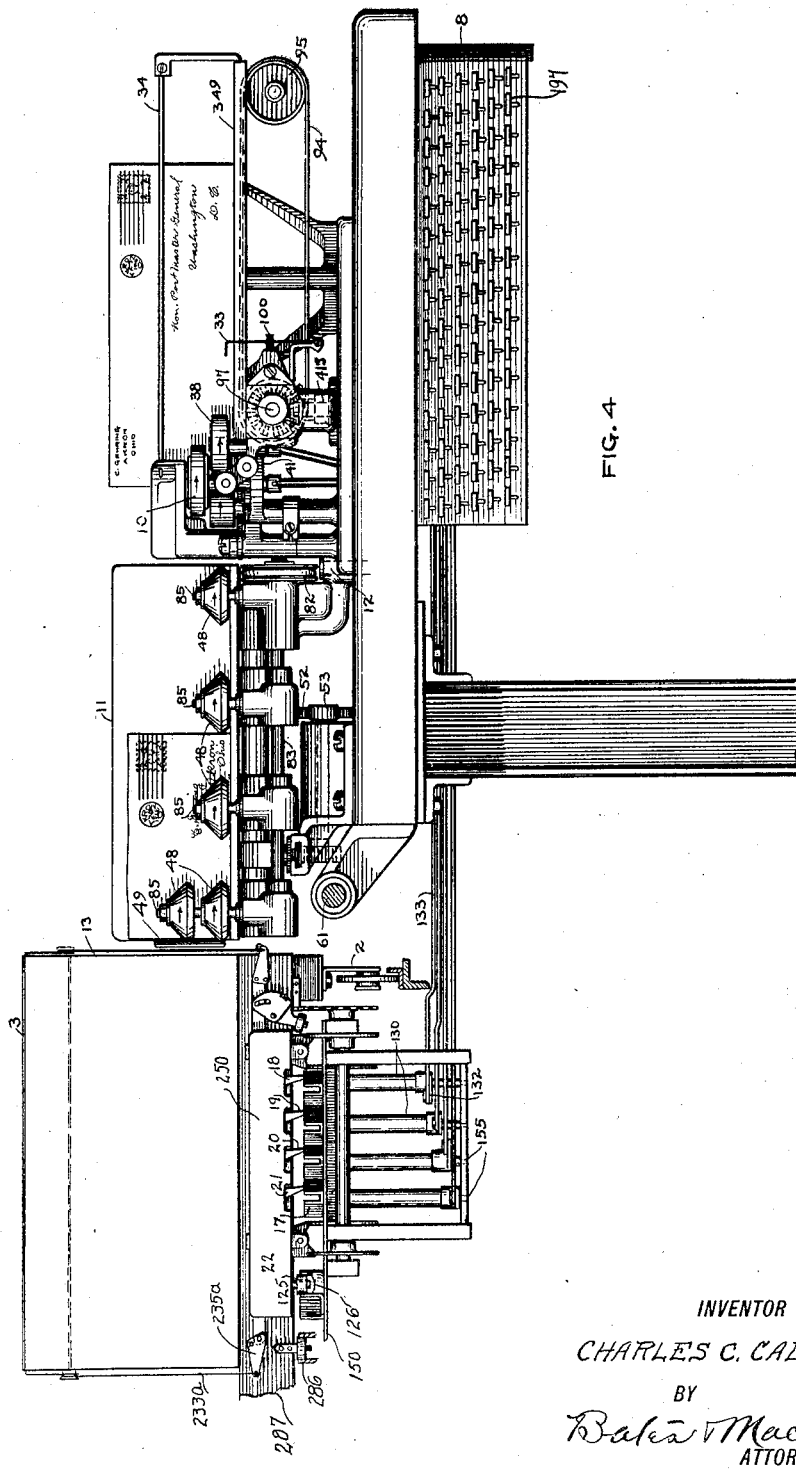
Figures 5, 36:
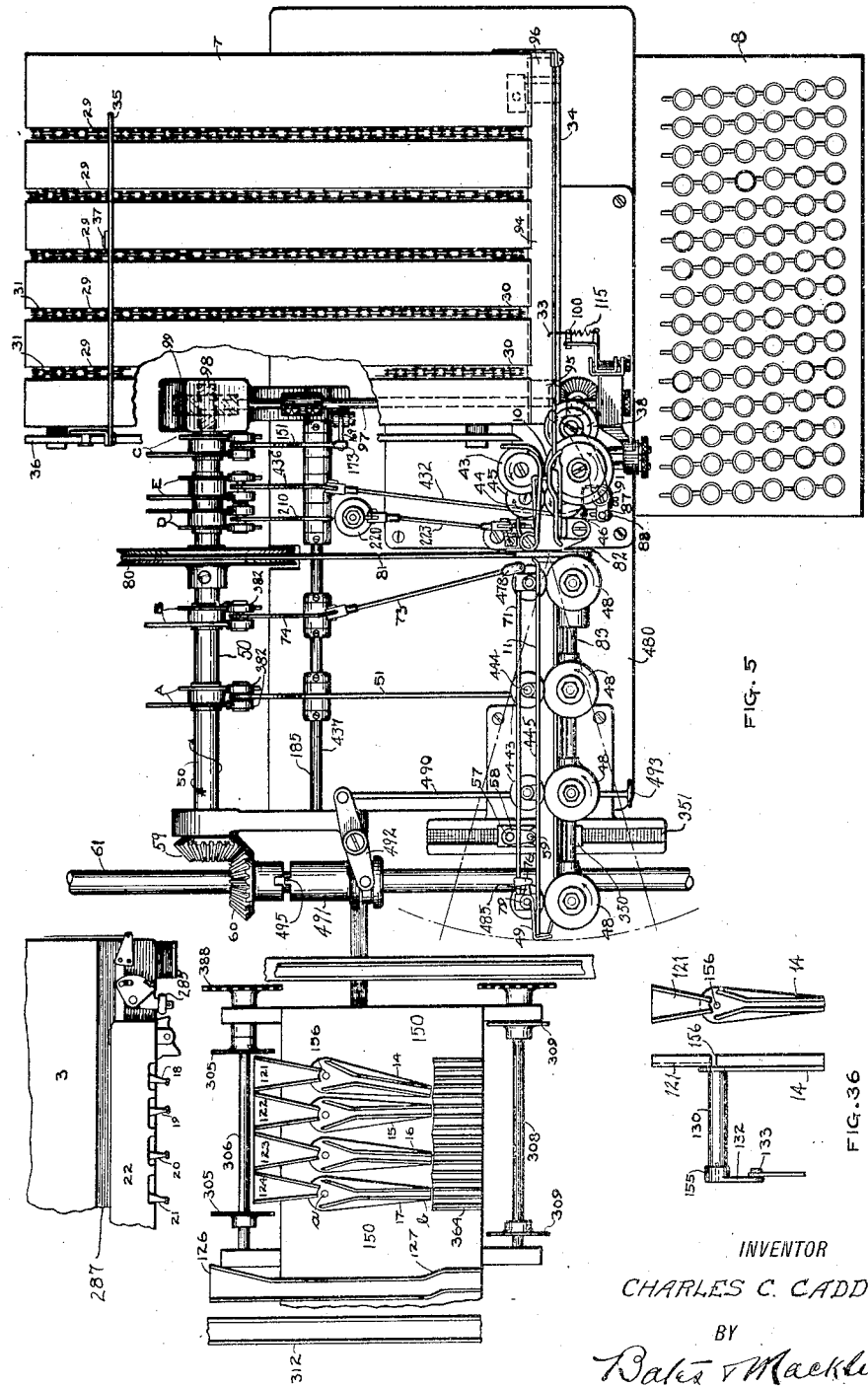
Figure 9:
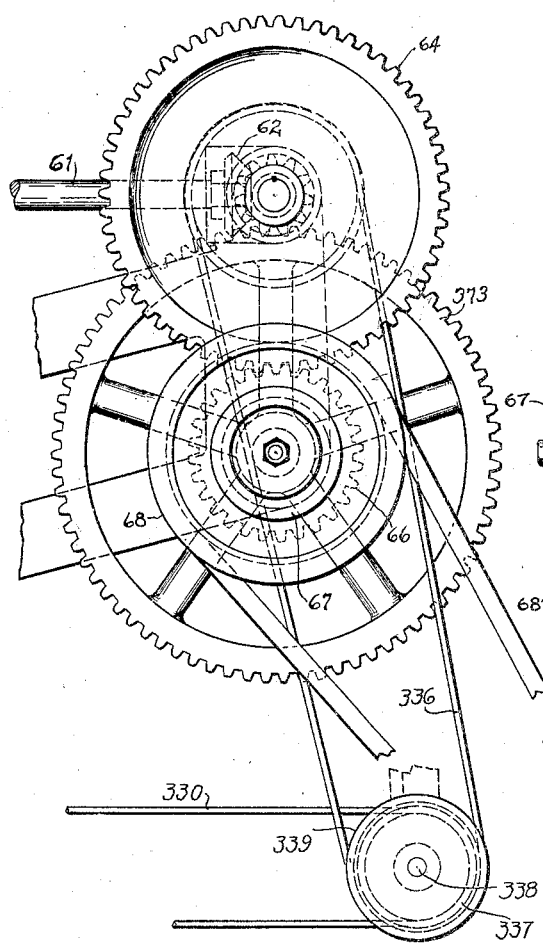
Figure 10:
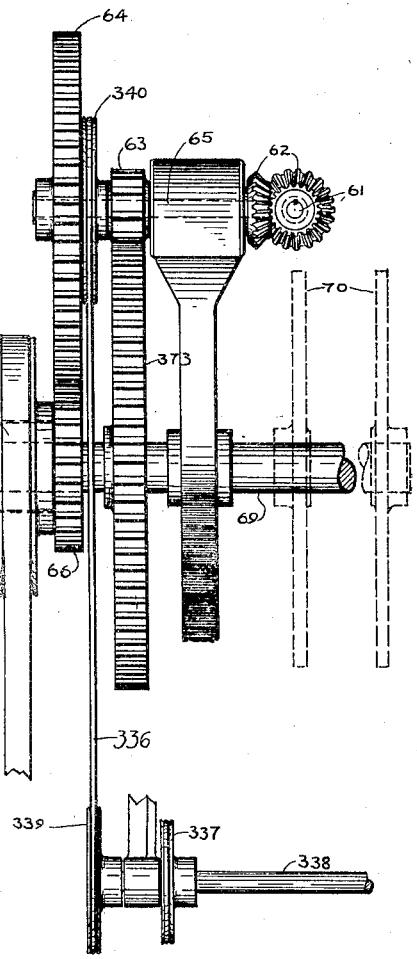
Figure 38:
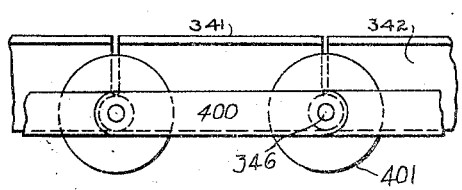
Figure 50:
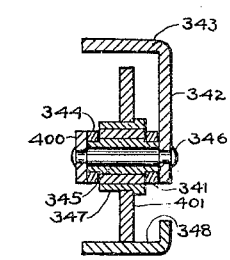
Figure 15:
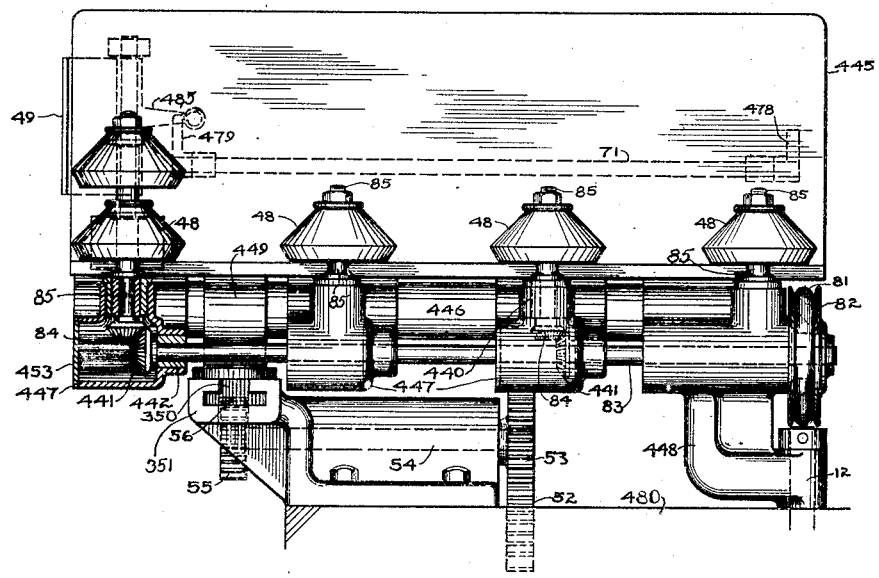
Figure 14:
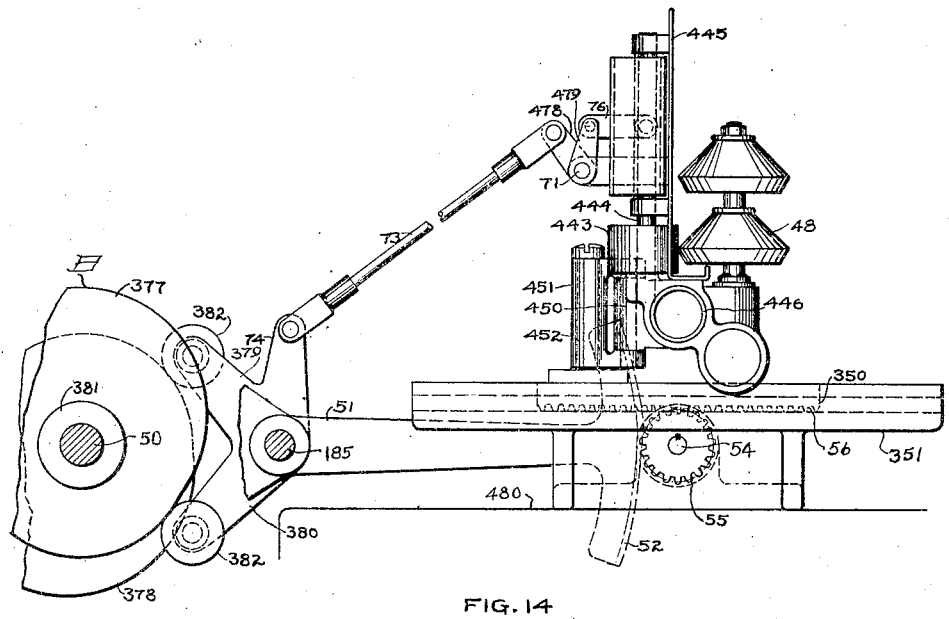
Figure 19:
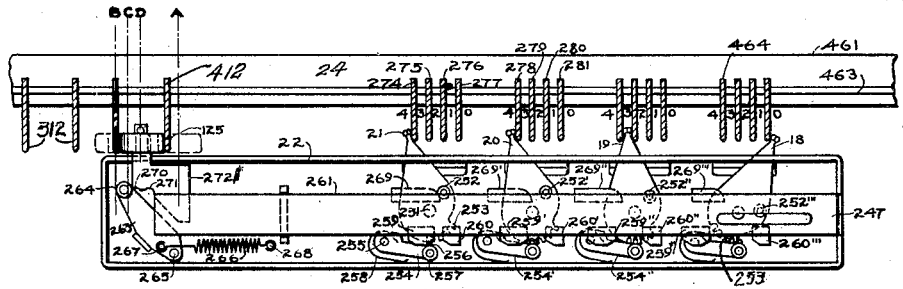
Figure 20:
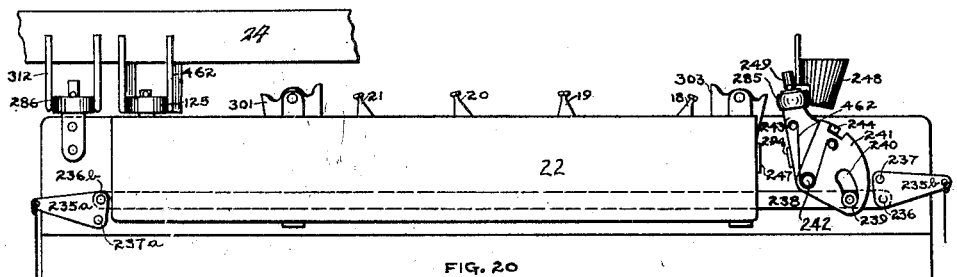
Figures 46, 47, 48:
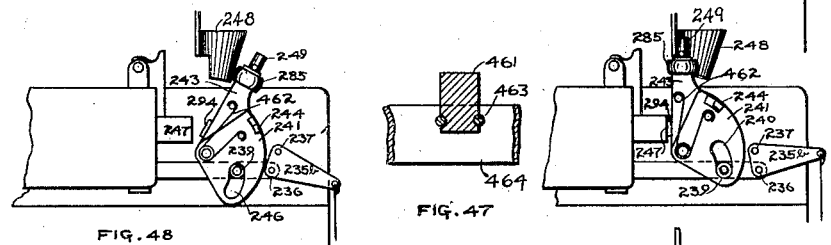
Figures 24, 25:
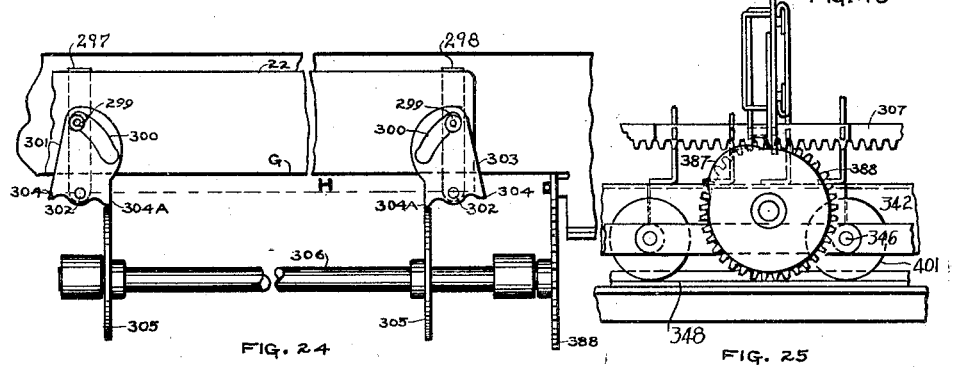
Figures 33, 34:
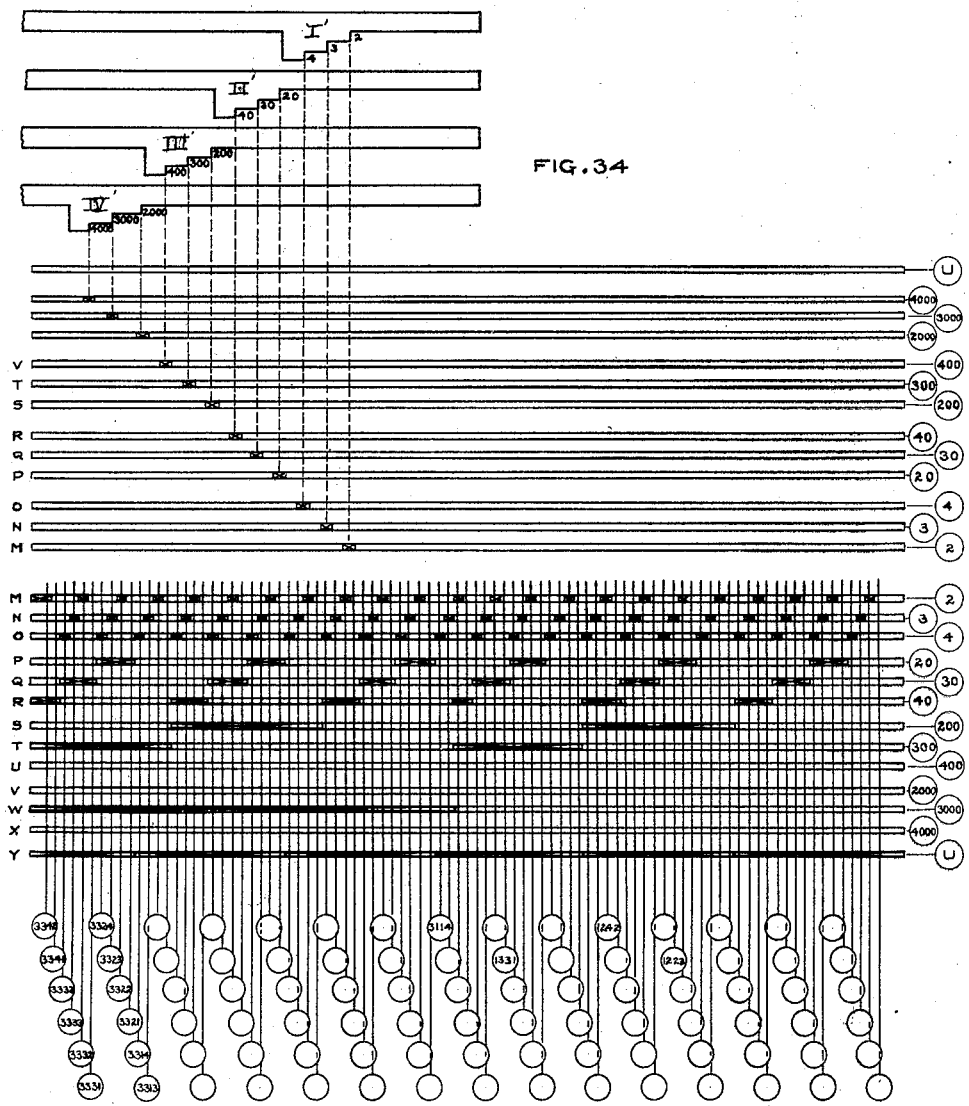
Figure 41:
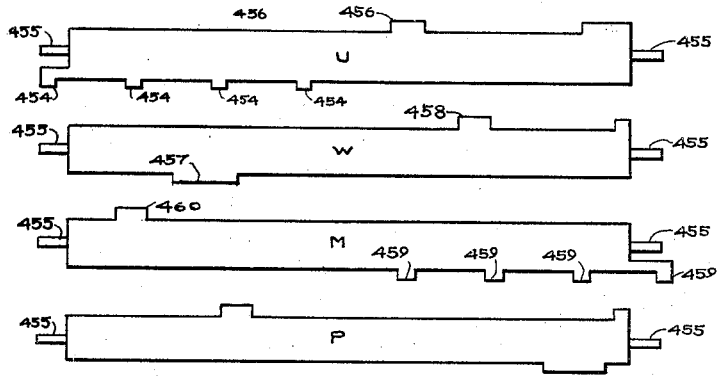
Figure 40:
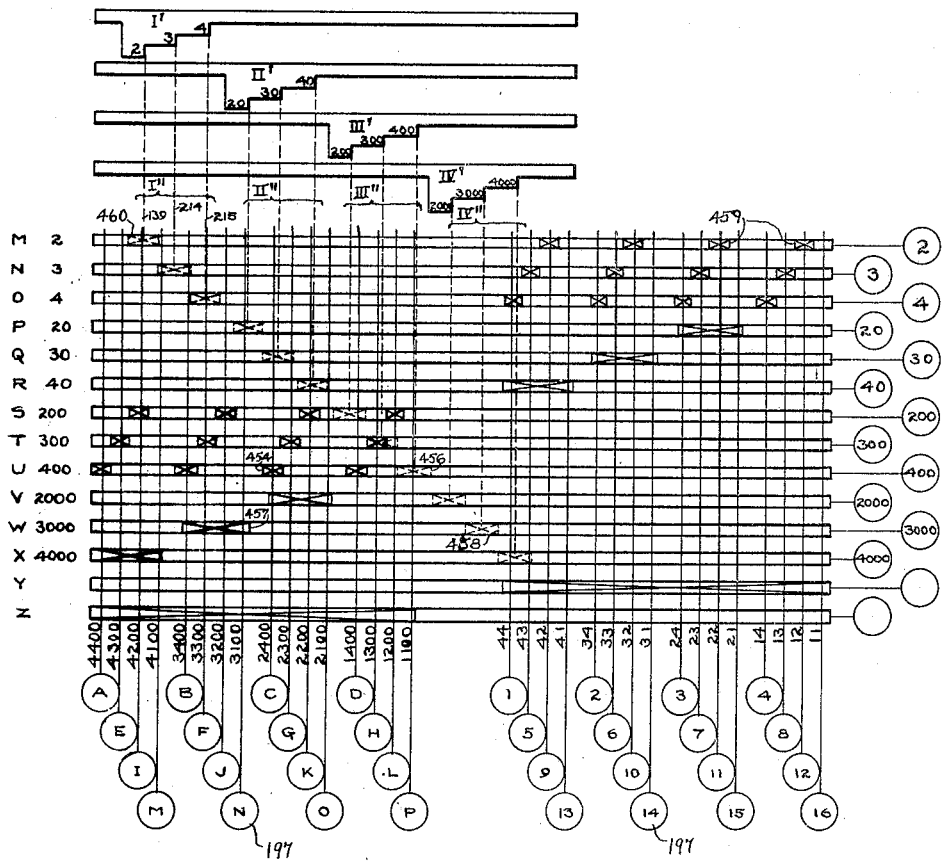

Referring to the drawings, Fig. 1 is a side view of my apparatus which shows the receptacles as accessible to attendants on the floor level, and the keyboard machines arranged for operators situated on a platform. Fig. 2 is a plan view of the apparatus shown in Fig. 1, showing the relative location of the keyboard machines and the conveyor which transports the carriers. Fig. 3 is a cross sectional view of the apparatus of the preceding drawings and shows the location of the two rows of receptacles, the permuted rails and the manner in which the carriers are moved across the conveyor to pass over either row of receptacles. Fig. 4 is a front elevation of a keyboard machine showing its operation on a carrier. (Right angles to Figs. 1 and 2). Fig. 5 is a plan view of the keyboard machine shown in Fig. 4. Figure 6 is a rear elevation of the same machine, parallel with Fig. 4. Fig. 7 is a side elevation of the carrier and a cross section of the conveyor. Fig. 8 is an end view of the same. Figs. 9 and 10 show details of the gearing driving the conveyor and keyboards. Fig. 11 shows details of the keyboard driving lever. Fig. 12 shows details of the keyboard mechanism in normal position. Fig. 12$^a$ shows some of the same parts after the depression of the corresponding key. Fig. 13 shows in plan details of said keyboard mechanism. Fig. 13$^a$ is an enlargement of some of the stepped plates and cooperating mechanism shown in Fig. 13. Figs. 14 and 15 are end and side views of the oscillating conveyor. Fig. 16 (Sheet 9), is a detail of keyboard mechanism. Fig. 17 is a detail side elevation of the receptacles showing the back stop operating mechanism. Fig. 18 is a detail plan view of the back stop mechanism. Fig. 19 is a view of the carrier, showing the selector mechanism thereon in coaction with the permuted rail. Fig. 20 is a detail view of the other mechanism on the carrier. Fig. 21 is a diagrammatic representation of the permuted rail, illustrating the scheme by which the various selector combinations are developed. Fig. 22 (Sheet 3) is a diagrammatic representation of the switch rails for directing the carrier from one side of the conveyor to the other. Fig. 23 (Sheet 9) illustrates details of the bail operating verticals of the keyboard mechanism. Fig. 24 is a detail view of the device by which the keyboard selects a carrier it is to load. Fig. 25 is an end view of the same. Fig. 26 is a side view of the back stop of the receptacle showing details. Fig. 27 is a side view of the contact mechanism and sprocket drive for the back stop mechanism. Fig. 28 is a front view of the back stop and carriage. Fig. 29 is a detailed representation of the intermittent driving mechanism for the keyboard movement. Figs. 30 and 31 and 32 (Sheet 10) show details of the keyboard movement. Fig. 33 is a chart showing the connections of the primary verticals and keyboard rockers for a keyboard for a small machine where one key is used for each receptacle. Fig. 34 is a chart showing what slides each of the secondary verticals in the preceding chart connects with. Fig. 35 is a detail showing the mechanism which drives the conveying chains of the letter magazine. Fig. 36 (Sheet 5) is a detail of the selector setting switch. Fig. 37 (Sheet 10) is an enlarged diagrammatic representation of the entrance end of the permuted rail. Fig. 38 (Sheet 8) is a detail side view of the conveyor chain. Fig. 39 (Sheet 16) is a detail view of the stop finger connection with the keyboard movement. Fig. 40 is a chart-like representation of the connections between the primary verticals, the rockers, the secondary verticals and the slides in my keyboard for large machines. Fig. 41 shows detail views of typical rockers in my keyboard movement. Fig. 42 shows a plan view of the separating rolls. Fig. 43 shows a sectional view of the same on the line X—X in Figure 42, and Fig. 44 shows an end elevation of the same set of rolls. Fig. 45 (Sheet 15) is a diagram showing the gearing which drives the rolls of Figure 42. Fig. 46 (Sheet 13) is a detail showing the operation of the carrier discharge mechanism. Fig. 47 (Sheet 13) is a detail showing the method of fastening the guide blades of the permuted rail. Fig. 48 (Sheet 13) is another detail view of mechanism of Figure 46. Fig. 49 (Sheet 15) is a detail of the vertical back stop to accompany Figure 26. Fig. 50 (Sheet 8) is a detail view of chain accompanying Figure 38. Fig. 51 (Sheet 15) is a sectional view of the electrically controlled friction clutch drive for the receptacle bottom stop. Fig. 52 (Sheet 18) is an end elevation of the keyboard machine.

For ready reference the following table is given, indicating the sheets on which the various views appear:

| Fig. | on Sheet | | Fig. | on Sheet |
|---|---|---|---|---|
| 1 | 1 | | 27 | 16 |
| 2 | 2 | | 28 | 16 |
| 3 | 3 | | 29 | 15 |
| 4 | 4 | | 30 | 10 |
| 5 | 5 | | 31 | 10 |
| 6 | 6 | | 32 | 10 |
| 7 | 7 | | 33 | 17 |
| 8 | 7 | | 34 | 17 |
| 9 | 8 | | 35 | 18 |
| 10 | 8 | | 36 | 5 |
| 11 | 9 | | 37 | 10 |
| 12 | 9 | | 38 | 8 |
| 12a | 9 | | 39 | 15 |
| 13 | 10 | | 40 | 19 |
| 14 | 11 | | 41 | 19 |
| 15 | 11 | | 42 | 20 |
| 16 | 9 | | 43 | 20 |
| 17 | 12 | | 44 | 20 |
| 18 | 12 | | 45 | 16 |
| 19 | 13 | | 46 | 13 |
| 20 | 13 | | 47 | 13 |
| 21 | 14 | | 48 | 13 |
| 22 | 3 | | 49 | 16 |
| 23 | 9 | | 50 | 8 |
| 24 | 13 | | 51 | 16 |
| 25 | 13 | | 52 | 18 |
| 26 | 16 | | | |

In Figures 1 and 2 of the drawings, I, II and III indicate what I call keyboard machines. I have shown the apparatus provided with three of these keyboard machines, arranged tandem. This is intended to be illustrative of any convenient number of such machines, as I conceive that in certain embodiments ten keyboards, for example, may efficiently be employed with a single set of receptacles and one general conveyor system. These views are much condensed longitudinally to bring them within the space available on single sheets. In practice there would be many more receptacles, for example, than it is possible to show in Fig. 1, and the conveyor system would be correspondingly lengthened.

In Figs. 1 and 2, 2 indicates a duplex endless conveyor; 3—3—3 indicate carriers mounted on the said conveyor; 4—4—4 indicate a series of receptacles to receive the sorted letters, and 6 is a suitable motor for driving the apparatus. The keyboard machines are arranged on a platform 368, which is located some distance above the floor, so as not to interfere with the attendants who remove the letters from the row of receptacles 4 below it. This arrangement enables me to utilize the upper reach of the conveyor for loading and setting carriers.

In the cross sectional view of the apparatus, Figure 3, I show two rows of receptacles whereby both sides of the apparatus may be utilized for the open sides of the receptacles. As indicated these receptacles are placed beneath the lower reach of the conveyor, which is so devised and arranged that a carrier on it may be positioned to discharge its contents into a receptacle in either row. In operation there are attendants on both sides of the apparatus who remove the letters from the receptacles, and either tie them into packages for shipment, or send them to other machines for more detailed sorting.

The stacks of letters to be sorted are placed in the magazines 7—7—7 of the keyboard machines, after the individual letters have been "faced," that is, after the addressed sides of all the letters have been turned the same way, so that an operator sitting before a keyboard 8 can read the address of the front letter of the stack 9. Upon ascertaining from the address to which receptacle the letter should be sent, the operator presses certain corresponding keys in the keyboard. These keys set in motion the mechanism which removes the inspected letter from the face of the stack and inserts it into a passing carrier 3 on the conveyor, and also mechanism which arranges the settable members of a selector on the carrier to cause the discharge of the letter into the receptacle predetermined by the particular keys pressed.

The conveyor 2, as shown, is duplex, consisting of two endless belt-like members traveling side by side in vertical planes, in the direction indicated by the arrows in Figs. 1 and 2. The letter is discharged from the keyboard mechanism into a carrier which is on the near belt of the conveyor. As the loaded and set carrier is moved along in this path by the traveling conveyor, it comes into coaction with a suitable switching mechanism located in the vicinity of the numeral 26 in Fig. 2. If the carrier has been set for a receptacle related to the far belt of the conveyor, such setting now acts on the switch mechanism to shift the carrier, while its travel continues, to such far belt. On the other hand, if the carrier is set for near belt receptacles, it remains on the near belt throughout.

Whichever belt of the conveyor the loaded carrier occupies, it is now conveyed around the sprockets 23 at the end of the machine and over the receptacles. Upon passing over the predetermined receptacle, the selector on the carrier acts to set in motion mechanism which opens the door of the carrier, and the letter is discharged by gravity into the receptacles. The further travel of the conveyor moves the carrier around the sprockets 374, and if it is on the far belt, into engagement with a guide rail located as indicated by 27 in Figure 2, which causes it to shift back to the near belt. Thus there is an alignment of all the carriers on the keyboard side of the conveyor when they are opposite the keyboard machines, enabling the keyboard machines to readily load the carriers.

It will be seen from the above description that the operator of a keyboard machine reads the letters one by one, and by pressing the proper keys directs the delivery of the letters to the desired receptacles. In post offices of the size for which this particular apparatus has been designed, it is desirable to divide the great bulks of mail to be sorted among a number of operators, performing duplicate sorting, that it may be ready for the city letter carriers, or shipment, within a short time after it has been received, and the apparatus has been devised in such a way that the several keyboard machines cooperate with the conveyor to non-interferingly deliver the product of the several operators into the single set of receptacles to meet this requirement.

The selector on each carrier, hereinafter described in detail, consists, as shown in the drawings, of four settable members, each having four positions, and this provides for two hundred and fifty-six (256) combinations, so that there may be that number of receptacles with the selectors shown. I can greatly increase this number of receptacles by using more positions for the settable members, or more settable members, or both, as may be convenient. I can use any suitable number of keyboard machines, without regard to the number of receptacles, as heretofore referred to. I have also referred to improving the arrangement of the keys in the keyboards so that the letters can be despatched to a large number of receptacles with a limited number of keys. In the specific embodiment shown in the drawings, I can despatch letters to any one of the two hundred and fifty-six receptacles with a keyboard of thirty-two keys.

In detail the construction of the apparatus shown is as follows:

Referring to Figures 1, 4 and 5, each keyboard machine has a magazine 7 to receive a stack of unsorted letters, and a group of separating rolls 10, under the control of the keyboard 8 to separate the letters one by one from the face of the stack and feed them to the oscillating conveyor 11, which inserts them into the passing carriers 3, as indicated in Figure 4.

In the plan view of the keyboard machine, Figure 5, the conveyor has been omitted to more plainly illustrate the selector setting switches, but the lower portion of one of the carriers is shown in elevation, to illustrate its coaction with the switches. The magazine consists of a grooved floor plate in which the endless chains 29—29—29 etc., are arranged to form a conveyor upon which the stack of "faced" unsorted letters is placed. The front or face letter is prevented from falling forward by the guard rail 34. The rear of the stack is supported by back plate or follower 35, riding on the rail 36 and engaging the chains 29—29, by means of the detent 37. The chains 29—29—29 are carried on the small sprockets 30—30, etc., keyed on a shaft 109 (Figs. 35 and 52), and the idler sprockets 31—31—31. The purpose of these chains is to move the stack of letters forward as the face letters are removed, to maintain proper contact conditions for the starting roll 38 with the succeeding face letters.

The rate at which the stack must be advanced depends upon the speed of the keyboard operator and the varying thickness of the letters. To provide for these variations the feeler finger 33 (Figs. 5 and 35), controlling the chain driving mechanism, is employed. This finger 33 bears on the face letter of the stack and rocks on the pivot 100. The finger operates to move the ratchet clutch member 105 into and out of contact with the clutch member 106, by means of the connecting rod 101, the bell crank 102, link 103 and catch fork 104. The clutch member 105 has the necessary sliding movement on the shaft 109, and drives that shaft by means of a feather 408. The clutch member 106 and a spiral gear 113, form a unit that rotates on the shaft 109 and is driven by a spiral gear 108 keyed to the shaft 114, this latter shaft being driven by a pulley 96. A spring 115 keeps the finger 33 bearing against the face letter until one or more letters have been drawn off the face of the stack, when the contact end of the finger moves toward the stack until it again takes bearing thereon.

When the movement toward the stack is sufficient, the clutch member 105 engages with the member 106 and drives the shaft 109 and the sprockets 30—30—30 thereon thereby moving the chains 29—29—29 and thus bringing the stack forward, pushing back the contact end of the finger 33. This operates through the connection before described to move the clutch member 105 out of contact with the member 106, stopping the forward movement of the stack, with the result that the desired contact conditions for the starting roll 38 are continuously reestablished automatically.

It will be seen from the above description that so long as there are any letters in the stack the face letter thereof is in a position ready for feeding. Attendants periodically supply fresh letters to the stack of the various keyboards, simply shoving back the follower 35 by hand and inserting a new supply of forwardly facing letters between it and the rear of the previous stack, and readjusting the follower against the rear of the new supply. The follower and chains, it will be understood, are free for manual movement whenever the feeler finger is forward. The first few letters at the forward end of the stack rest on a conveyor belt 94, which runs on pulleys 95 and 96, Figures 4 and 5. The pulley 95 is keyed to a shaft 97, extending longitudinally of the machine. This shaft carries a spiral gear 98, which meshes with a complemental spiral gear 99 keyed to the shaft 50. The shaft 50 is adapted to be continuously rotated from a continuously rotating shaft 61 extending along the front of the apparatus. A bevel pinion 59 on the shaft 50 and a meshing bevel pinion 60 normally clutched to the shaft 61, effect this transmission of movement. In addition to acting as a conveyor, the belt 94 serves also as a driving belt to operate the feed chains 29, which, as heretofore described, are geared with the pulley 96.

The belt 94, as a conveyor, operates to move several letters forming the front end of the stack toward the starting roll 38 and assist the same in feeding the letters to the group of separating rolls 10. Referring to Figures 42, 43 and 44, which illustrate the rolls of group 10 in detail, the starter roll 38 rotates constantly in the direction indicated by the arrow, and, as will be described later, is so mounted and actuated as to swing into and out of contact with the face letter of the stack periodically in the operating cycle of the machine.

The starter roll 38, upon coming into contact with the face letter of the stack starts it into the bight of the separating rolls 42 and 43. The roll 42 has a high speed, turning in the direction of the arrow and operates to drive the letter into the bight of rolls 45 and 46. 44 indicates a stop finger interposed in the path of the letter to prevent it entering between rolls 45 and 46, and retain the letter in position for the operator to read its address. The roll 43 rotates slowly in the direction of the arrow (reverse direction), and has a slight tendency to counteract the effect of the roll 42. This counteraction is ineffective on a single letter between these rolls, but if two or more letters happen to enter between the rolls the roll 43 forces the excess letter back into the stack; thus the face letter is separated from the succeeding letters, which might be drawn off the stack with it by reason of frictional contact.

When the operator presses the keys corresponding with the address found on the letter, the stop finger 44 (by means of a cam E on the shaft 50 and intermediate mechanism, to be described later), will be withdrawn from the path of the letter at a time in the cycle of the machine correlated with the position in conveyor 2 of the particular carrier 3 in which the letter will be placed. This same actuation of the keys automatically causes the corresponding setting of the selector on this particular carrier, as explained at length hereinafter. The letter having been released enters the bight of the rolls 45 and 46. These rolls rotate in the direction indicated by arrows and drive the letter forward into the oscillating conveyor 11, where the power driven rubber rollers 48—48, etc. (see Figs. 4 and 5), rotating in the direction indicated cause it to travel to the stop finger 49 which holds it against further travel, until, in the cycle of the machine the oscillating conveyor has been aligned and is travelling with the said carrier 3. Then the stop finger 49 is actuated by mechanism consisting of the cam B, rocker 74, link 73, arm 478, rock shaft 71, arm 479, link 76, and rear extension 485 of finger 49 (see Figures 14, and 15), and the letter is thus released to be forced forward into the carrier by the action of the rolls 48.

The speed of the rolls 48 is such as to propel the longest letter the machine is to handle, completely into the carrier, during the interval that the oscillating conveyor 11 is travelling with the carrier. The oscillating conveyor 11 swings back and forth on its pivot 12 in such a manner that when it is moving in the same direction as the conveyor 2 its free end registers with one of the carriers 3 and travels at the same speed, so that the letter can be discharged into the carrier, through the opening 13 in the same, until nearly the end of its forward travel. The movement of the letter in this device is so timed that it will be wholly ejected into the carrier during this part of the oscillation. The oscillating conveyor then makes a rapid return movement and aligns with a succeeding carrier in time to inject into it the next letter that the operator has despatched.

Reverting to the starting roll 38, the driving mechanism therefor is best shown in Figs. 42 and 44. As there shown this roll is mounted on the end of an arm 427 which is pivoted at 428. An extension 429 of this arm by means of a pin 430, engages a slot 431 in the pull rod 432. A spring 433 bears on a pin 434 mounted in the rod 432 and is anchored adjustably to the arm 429 by the screw 435. The rod 432 is connected to the cam rocker 436, and this cam rocker is pivoted at 185 and cooperates with the cam E on the shaft 50, as indicated in Figure 44.

The driving mechanism, whereby the rolls of the group 10 are constantly rotated by the shaft 97, is shown in Figures 42, 43 and 44. The shaft 97 terminates in a mitre gear 411 which drives a mate 412 which is secured to a vertical spindle 413 that terminates in a spur gear 414. Referring to diagram, Fig. 45, this gear 414 drives a gear 416 on a spindle 419, which, through the universal coupling 420 (Fig. 43) drives the starting roll 38. The gear 416 drives an idler 421 which meshes with the gears 415, 418 and 417. The gear 415 is on a spindle 422, which, through the couplings 423 drives the roll 43. The gear 418 is on a spindle which terminates in the roll 45, this spindle passing from the roll 45 through the post 425 to the gear. The gear 417, through the coupling 426, drives the roll 42.

Referring to Figure 15, the yielding rubber rolls 48 of the oscillating conveyor 11 are carried on spindles 85, mounted in bearings 440 and each terminating in a bevel pinion, as 84. A shaft 83, mounted in bearings 442, carries bevel pinions, as 441, meshing with the respective pinions 84. On this shaft is keyed the sheave 82 which is driven from the sheave 80 on the shaft 50 by means of the belt 81, as shown in Figure 5.

Each of the rolls 48 is opposed by an idler, as 443, which runs freely on a pin, as 444. This pin extends upwardly as shown in Fig. 6, and also serves as a standard to support the shield 445. The frame of the oscillating conveyor comprises a tube 446 upon which are mounted the three gear cases 447 and the pivot casting 448. The casting 448 includes the gear casing for the adjacent spindle 85 and is mounted on the pivot pin 12, which is secured in the bed 480 of the machine. A casting 449 is also mounted on the tube 446 and carries the hinge pin 450, Fig. 14. This hinge pin attaches the oscillating conveyor frame to the hinge link 451, which swings on a pin 452, mounted in a slide 350. This slide 350 may swing the conveyor 11 on its pivot 12 by means of these hinge connections. The gear cases 447 have covers, as 453, which serve to retain grease with which the cases may be filled to lubricate the bevel gears.

Referring to Fig. 5, a cycle of the keyboard machine is represented by one complete revolution of the cam shaft 50. This shaft carries the cams A, B, D, E, C. Each of these cams comprises two conjugate cams, as 377 and 378, Fig. 14, mounted on a bushing, as 381, and adapted to cooperate with arms, as 379 and 380, of a rocker, as 51, through the medium of rolls 382 on the same. The contour of the respective cams is such as to impart to their rockers at proper periods in a revolution of the shaft 50 the motions necessary to operate the connected mechanisms.

To oscillate the loader, the cam A operates the rocker arm 51. As shown in Figs. 14 and 15 this arm terminates in a segmental spur gear 52 which engages a pinion 53. The pinion 53 is keyed to a shaft 54, as is also a gear 55. The gear 55 engages with the gear rack 56 of the slide 350, connected with the oscillating conveyor. This slide moves in a guide 351 formed in a casting secured to the frame member 480, and also providing a bearing for the shaft 54. The result is that the cam A gives the conveyor one complete oscillation for each rotation of the shaft 50. The conformation of cam A is such as to drive the oscillating conveyor forward in synchronism with a carrier on the traveling conveyor 2 on the forward stroke, and to return it rapidly to meet another carrier and repeat the movement.

The cam shaft 50 is driven by the bevel gears 59 and 60 from the side shaft 61, which is common to all the keyboards for the purpose of driving them in synchronism with each other and relatively with the traveling conveyor. This side shaft extends to the motor end of the apparatus and terminates in the set of bevel gears 62. As shown in Figs. 2, 9 and 10, one of the bevel gears 62 is keyed to a short shaft 65, to which is also keyed a spur pinion 63 and a spur gear 64. The gear 64 meshes with a pinion 66 which is mounted on a bushing 67 carrying a belt pulley 68, belted to the driving motor 6. The bushing 67 is mounted to run freely on a shaft 69. A gear 373 is keyed to this shaft 69 and meshes with the pinion 63. The shaft 69 carries the conveyor chain driving sprockets 374—374, and thus the side shaft 61 and the chain sprockets 374—374 are positively driven at speeds that have a fixed relation.

The gears of the train just described are so proportioned (in the particular embodiment shown), that three carriers in the conveyor 2 will pass a given point while the shaft 61 makes one revolution. Now the gears 60 and 59, being mitre gears, the cam shaft 50 of the keyboard machine rotates at the same speed as the shaft 61, and the oscillating conveyor 11 accordingly registers with every third carrier in the chain on the letter discharge portion of its oscillation, whereby the oscillating conveyor is enabled to discharge letters into every third carrier.

As each of the keyboard machines, as above described, is capable of loading letters into every third carrier, and the cam shafts are driven positively with relation to the travel of the conveyor 2 by means of the gear train described, each keyboard machine can be so connected with the side shaft that its set of carriers will be different from the sets for either of the other keyboard machines. In other words, of each successive group of three carriers, keyboard machine designated I will load the first carrier; the keyboard machine II will load the second carrier, and keyboard III will load the third carrier.

It will be readily understood how this method of loading carriers by multiple keyboards can be extended for the employment of ten or more keyboards for the said conveyor 2, by simply using gears of the proper ratios in the train between the side shaft 61 and the conveyor shaft 69. Thus, if ten keyboards are used, ten carriers will pass a given point for one revolution of the side shaft 61, and the first keyboard will register its oscillating conveyor with the 1st, 11th, 21st, carriers, and so on, the second keyboard conveyor registering with the 2nd, 12th, 22nd, etc. carriers, and the tenth keyboard conveyor with the 10th, 20th, 30th, etc., carrier. In any case the registration of any oscillating conveyor is predetermined by the corelation of its cycle with the number of carriers constituting each repeating group.

As previously stated, each carrier 3 is equipped with a selector which is automatically set by the depression of the same keys of the keyboard machine which despatch the letter as heretofore explained. This setting of the selector determines the receptacle into which the letter in the carrier is thereafter automatically discharged. Referring to Figs. 5 and 7, the selector 22 is contained in the base portion of the carrier and has four settable members 18, 19, 20 and 21, each of which, as hereinafter explained, has four positions to which it may be set. Each keyboard machine is provided with key-controlled selector setting mechanism adapted to position the members 18, 19, 20 and 21 as desired.

The selector-setting mechanism, which is duplicated for each keyboard machine, includes stationary V-shaped guides 121, 122, 123 and 124, and the selectively settable switches 14, 15, 16, and 17, and parallel channels of stationary guide 364. The V-guides receive the members 18, 19, 20 and 21 in any position in which they may be located, and as the carrier advances direct them to the settable switches, which are set by the keys (as hereinafter described) to determine the position which the members 18, 19, 20 and 21 are to have. The corresponding channels of the stationary guide 364 retain them in the set position until locked.

The carrier having discharged the previous letter arrives at the keyboard machine with the roll 125 carried by the carrier, in a position to enter a guiding channel 126, which forces it over to a position designated "B" in Fig. 19, as the carrier advances, and operates mechanism in the selector to unlock the settable members for re-positioning by the V-guides and switches. When the re-positioned settable members enter the channels 364 the roll 125 is forced by the form of the guide 126 at 127 back to position hereinafter designated as C (Fig. 19), where it operates the mechanism in the selector to lock the settable members in the positions to which they have been moved and hold them thus after they leave the member 364 and until they enter the permuted rails hereinafter to be described.

Referring to Figs. 4, 5, 6 and 36, the switches 14, 15, 16 and 17 are mounted on the upper ends of tubular stems 130, which are pivoted at the bottom, as 155, and near the top are journalled in a plate 150. A crank arm 132 extends from each stem and is coupled by a link 133 with a slide, as 137. Switches 15, 16 and 17 are similarly connected by links 376, 375 and 374 to slides 136, 135 and 134.

Referring to Figs. 6 and 29, the slides 134, 135, 136 and 137 are connected through the tension springs indicated at 176 to the stationary member 175 and normally rest against the stop 174, which is secured to the sliding bar 162. The bar 162 carries a latch 163 which has an extension 164 and is pivoted at 177. A spring 178 tilts the end of the latch 163 upwardly into the path of a lever 169 when the extension 164 is not held back by engaging the finger 180 of a member 165. This member 165 oscillates on a pivot 181 and carries pawls 166 and 167. These pawls are adapted to engage extensions 182 and 183 of bails 146 and 168. These extensions, when engaging the side face of the aforementioned pawls as shown in Fig. 29, retain the member 165 in such a position that the finger 180 bears on the latch extension 164 to hold the latch 163 out of engagement with the lever 169. Referring to Figs. 11, 12, and 12ª, the lever 169 is oscillated back and forth on the pivot 170 by means of the rocker 151 of cam C. The lever 169 carries the pin 171 upon which the ball member 172 slides, and this member 172 has a rolling bearing in the cylindrically bored fork end 173 of the rocker 151. This rocker is fulcrumed on the shaft 185.

When the latch 163 is released by the finger 180 to engage the lever 169, this lever drives the bar 162, and this bar by means of stop 174 moves the slides 137, 136, 135 and 134 in the same direction, with the result that through connections previously described, the switches 14, 15, 16 and 17 are swung a little beyond what will be specified as position number 4. On the backward stroke of the lever 169, a spring 409 anchored to the bar 175 returns the slide 162. The slides 137, 136, 135 and 134 are caused to follow the stop 174 by the tension springs 176 unless stopped by an arrangement of selective stops which will be described hereinafter.

When the bar 162 was driven forward, the extension 186 engaged the finger 180, throwing it forward far enough for the pawls 166 and 167 to clear the members 182 and 183, permitting them to rise to the engaging position under the influence of the spring 165ª. Now, upon the back stroke of the bar 162, these pawls contacting with the shoulders 182 and 183 and bearing at their right hand edges against pins 165ᵇ carried by a bar 165ᶜ on the member 165 stop further movement of the member 165 as shown in Fig. 29. This causes the finger 180 to engage the arm 164 and actuate the latch 163 to move it down out of the path of the lever 169, with the result that the bar 162 will remain at rest against the stop 187 until the bails 168 and 146 are again actuated to release the pawls 182 and 183.

In Figures 13 and 13ª the detail of a slide, as 137, and the selective stop mechanism for the same, is shown in plan view. A plate I' with the faces 159, 158 and 157, is secured to the slide 137, which is moved longitudinally. Stop members 160, 161 and 138 are movable transversely of the slide and are arranged to be selectively interposed in the path of these faces. By reason of the stepped formation of plate I', and the differing widths of the stops 138, 161 and 160, the stop 138 will engage only face 159, stop 161 only face 158, and stop 160 only face 157. The mechanism actuating these stops is such that only one in each of the groups I'', II'', III'' and IV'' can be advanced at a time.

The faces mentioned are so arranged that if the stop 138 is interposed to engage face 159, the slide 137 will come to rest with the switch 14 in what I term the fourth position. If the stop 161 were interposed, instead, to engage face 158, the slide 137 will come to rest with the switch 14 in the third position. If stop 160 be interposed to engage face 157, the slide 137 will come to rest with the switch 14 at position two; while if no stop is interposed, the slide 137 will come to rest on the member 174 with the switch 14 in position one. Likewise slide 136 (see Fig. 6 for location) can be controlled by the group selective stops II'', coacting with the plate II'; slide 135 with group III'' and plate III', and slide 134 with group IV'' and plate IV', these slides controlling the switches 15, 16 and 17 respectively.

The selective stops are in turn controlled by the keyboard as follows: Referring to Figs. 12, 12ª and 16, the stop 138, for example, is pivoted on the rod 147 and the lower end terminates in a toe 194 that can enter the notch 191 when the vertical bar 139 is in the position shown in Fig. 12ª, provided the plate I' is in the position to leave the stop 138 free (the stop is not supposed to be free in Fig. 12ª, which corresponds to Fig. 13 as regards the period of the cycle). Normally the bar 139 (or secondary "vertical" as I call it), occupies a position on a higher level, as indicated in Fig. 16, for the secondary vertical 192. In this upper position the face of the secondary vertical is presented to the toe 194 holding the stop 138 in its normal position, out of the path of the plate I'. When the secondary vertical has been depressed, bringing the notch 191 opposite the toe 194, the stop 138 retains its position disengaged from the secondary vertical until the plate I' frees the stop, whereupon the spring 195 swings the stop 138 about the axis 147 to the extent allowed by the toe 194, entering the notch 191. This movement carries the upper end of the stop into the path of the stepped plate I'.

The secondary verticals, as 139, are depressed to their lower positions by the rocker bars M, N, O, P, etc., (Fig. 12ª) as will be explained hereinafter. These rocker bars each rock on an axis, as 196, and engage the key lever or primary verticals 140, as at 141, which verticals are in turn engaged by the key levers 142, as at 143. These levers terminate in finger pieces, as 197, which may be suitably marked on their faces to guide the operator.

When a key as 197 is depressed, key lever 142 rocking on the pivot 198 raises the corresponding primary vertical 140, which in turn tilts the rocker M and that in turn depresses the secondary vertical 139. The secondary verticals, as 139, have two notches in their lower ends to cooperate with a bail, as the bail 168, heretofore mentioned. The bail is formed to fit the notches as shown, and when a secondary vertical is depressed the bail enters the upper notch, as 200, and retains the vertical in the depressed position, until the time arrives for the toe 194 to enter the notch 191. The lower notch provides clearance for the bail in those verticals that are in the upper position, so as to allow the bail to swing into place. When a bail is actuated by a depression of a vertical, the extension, as 183, is raised clear of the pawl 167, and when both bails 168 and 146 have been thus actuated, both of the pawls will have been released, and swing toward the left (Fig. 29) to come beneath the extensions 182 and 183 to unlock the member 165, and the setting of the switches 14, 15, 16 and 17 is brought about as before described. That is, when the lever 165 is no longer held by the pawls 162, 163, and the members 182, 183, the arm 180 will offer no resistance to the motion of the lever 164 which will therefore be swung under the influence of the spring 178, to bring the end 163 of the lever 164 into position where it may be engaged by the member 169. This motion of the lever 164 of course incidentally involves the swinging to the left of arm 180 of member 165 as viewed in Fig. 29. Each bale 146 and 168 after being swung by a key to clear the extension 182 or 183 swings back into position, and as the corresponding pawl has now come beneath such extension, the top of the pawl is engaged by the extension, but a slot 165ᵈ in the pawl allows it to be forced downward idly as the bale returns. As soon as the second bale has been raised freeing its pawl (the other pawl being already beneath its bale extension) the member 165 becomes released and swings to the left as already explained.

It is obvious that the operator must be free to press a key at any instant in the cycle of the machine; it is also clear that the effect of the act can only be used by the machine at a certain instant in the cycle. The synchronizing mechanism to provide for this comprises the bail and latch mechanism actuated by the keys (Fig. 29) in conjunction with the selector setting lever 169 and its operating mechanism, including the cams C on the shaft 50, which is moved in time with the conveyor. The bails are utilized as locks on the verticals, to maintain the conditions the operator establishes by the pressing of the keys until the machine can respond. Member 202 is provided to restore the selective stops, as 138, to their normal positions after they have been used, and to release the verticals, as 139, which after having been released by the bail are still locked by the toe 194. The member 202 is actuated as the lever 169 begins its counter-clockwise motion, as seen in Fig. 29, or shortly subsequent thereto, but is actuated and returned to inoperative position before the carrier has had its toes 18, 19, 20, 21, set by the switches 14, 15, 16, 17. The result is that the combination set up on the switches and subsequently on the carrier corresponds to the combination of keys depressed by the operator in accordance with the address on the letter delivered to the carrier.

In the operation of the keyboard these secondary verticals which have been depressed by one key, are held depressed by the bail until the next key is depressed, when the bail is swung out of the notches, releasing the vertical previously used, and on returning, locking the verticals depressed for the new combination. Some of the verticals used in the new combination may have been used in the previous combination, but they are simply redepressed and locked like the rest. The released verticals raise until the toes 194 of the stops for these verticals hold them by occupying the notch 191, but this notch 191 is of sufficient extent to permit the verticals to rise sufficiently to allow a bail to enter the notch 201 of the released verticals, and the notch 200 of the depressed vertical, to retain the new combination. This provides for the operator, establishing the new combination while the machine is still in a part of the cycle where it has not finished with the combination previously set up, making it possible, as aforesaid, for the operator to press a key at any moment in the cycle of the machine without interfering with the proper operation thereof.

As previously stated, the member 202 restores all the stops at a certain instant in the cycle of the machine, and when it moves back stops belonging to verticals that have been depressed are free to tilt forward into the path of the plates on the slides, because the toes 194 can enter the notches 191. Referring to Figures 23, 30 and 31 and 32, the member 202 is actuated by the levers 203 and 204 which protrude into slots in the member 202, and are secured to the rock shaft 147 which terminates in the lever arm 206 actuated by the cam slot 207 in a plate 208. This plate 208 oscillates on a pin 209 and is actuated by the cam rocker 210, operated by the cam D, on the shaft 50.

Referring again to Figures 13 and 13$^a$, I have explained that when no selective stop is interposed in the path of the plates I′, II′, III′ and IV′, that their respective switches will take position one. In order to actuate the bails 146 and 168 to release pawls 166 and 167 to bring about the setting of the switches for position one, without interposing a selective stop, I provide an extra vertical (as 211 and 212) for each bail. These extra verticals are duplicates, and as illustrated in Fig. 23 each has a tooth 213 which engages a pawl 214 on the bail. When the vertical is depressed the tooth acts on the pawl 214, to swing the bail and travels far enough past the pawl after the bail has swung it clear to allow the pawl under the influence of the spring 215 to regain its normal position. The vertical can recover its upper position without disturbing the bail, as the pawl is easily moved backward against the light spring 215 by a restoring spring, as is shown for vertical 139 at 405, (Fig. 12$^a$).

The verticals 211 and 212 have no locking notches engaging the bails, and hence return to normal position immediately the operator releases the key. One or the other of these two verticals is depressed by every key regardless of what other verticals are used in making a combination, so that if the verticals of any one of the groups are not used, the switches for those groups will come to rest in position one, and in the case where no verticals are used in any of the groups, these two verticals alone are depressed and all of the switches come to rest in position one.

The purpose of the rockers M, N, O, P, etc., is to actuate the secondary verticals in combinations, so that pressing any key will result in the switches 14, 15, 16 and 17 assuming a combination of relative positions that is different from the combination of positions resulting from pressing any other key on the keyboard. The keyboard shown in Figs. 2, 3, 4 and 5, is of the single key type, suitable for a comparatively small machine where there are but a limited number of receptacles required in the sorting of the letters, and hence, only a small number of keys are necessary in the keyboard.

For a large machine the keys are arranged in two groups, each group controlling two switches, the group for the right hand controlling switches 16 and 17, and the group for the left hand controlling the switches 14 and 15. This grouping of the keys is shown in Fig. 40. Each group might be said to constitute a keyboard in itself. As before stated, I may use but a single group for controlling four switches, but where the number of keys exceed one hundred the keyboard becomes large and cumbersome, and it requires considerable practice to locate quickly any one key. By dividing the keys into groups and pressing one key with each hand to make a combination, that is, using two keys instead of one, to make a combination, I am enabled to make a large number of combinations, for a correspondingly large number of receptacles, with a comparatively small number of keys.

Take, for instance, the machine shown: each of the switches 14, 15 16 and 17 has four different positions. Now, combining the positions of two of the switches, as 14 and 15, sixteen combinations of relative positions can be made. That is to say, the switch 14 can occupy four different positions while the switch 15 is in position one, and can again take the same four positions with switch 15 in position two, the same for switch 15 in position three, and the same for switch 15 in position four, giving a total of sixteen combinations. Switches 16 and 17 are likewise capable of assuming sixteen different combinations. In the keyboard as shown I provide two banks or groups of sixteen keys each. Each key in the left hand group represents one of the sixteen combinations, of switches 14 and 15. By an arrangement of the rockers M, N, O, P, etc., to be hereinafter explained, an actuation of one of these left hand keys can cause the switches 14 and 15 to assume any one of these combinations of position. Similarly the group of keys for the right hand has one key each for the sixteen combinations of switches 16 and 17.

It is readily understood that key No. 1 of the right hand group can be pressed with any one of the sixteen keys in the left hand group, thus giving sixteen combinations of the right hand No. 1 key with the left hand keys. Likewise right hand No. 2 key can give sixteen different combinations with the left hand group, and the same is true of the rest of the sixteen right hand keys, so that a total of sixteen multiplied by sixteen combinations, or 256 combinations, can be made with the 32 keys, as shown and described.

In Fig. 41, I show illustrations of typical rockers. The chart-like representation, Fig. 40, is a diagrammatic elevation of the rockers with the keys and primary verticals removed, the same being represented by the light vertical lines ending in circles indicating the keys. The rocker U as shown has the lugs 454 which are the lugs shown on the same rocker in Fig. 40, with the diagonally crossed lines to indicate them. These lugs are engaged by the primary verticals that actuate the rocker. The rocker is pivoted on the pins 455 which rest in suitable bearings in the machine. The lug 456 engages the secondary vertical belonging to this rocker and is indicated by the dotted crossed lines in Fig. 40. The rocker W has but one lug 457, but this is wide enough to connect with four primary verticals as shown in Fig. 40. The lug 458 is indicated by dotted lines in Fig. 40, and engages the secondary vertical belonging to this bar. The rocker M is similar to rocker U, but differs in the location of the lugs, as 459, which are so placed as to engage primary verticals of the right hand instead of the left hand bank of keys, and of the lug 460, which engages a different secondary vertical. The rocker P resembles the rocker W except for like differences.

Referring to Fig. 13, there is shown a primary vertical, as 140, for each key bar, as 142, and each primary vertical engages but one definite set of rockers. One rocker may have several lugs and each is engaged by several primary verticals, as illustrated at 406, 407 and 408; also each rocker engages but one individual secondary vertical. The primary verticals as shown comprise two groups; all those in the right hand group engage the rocker Y, and all those in the left hand group engage the rocker Z. The rocker Y actuates secondary vertical 212, and rocker Z actuates secondary vertical 211 (see Fig. 13). These verticals are not shown in this chart.

As has been heretofore described, the vertical 211 operates the bail 168 (Fig. 29) to disengage the pawl 167, and pressing any key in the left hand group will bring about this result. Similarly all the keys in the right hand group engage the rocker Y, which in turn actuates the secondary vertical 212 and the bail 146 releasing the pawl 166. Thus, in this arrangement of my keyboard, a key in each group must be pressed to completely release the member 165 to allow the latch 163 to engage the lever 169 and bring about the setting of the switches.

This intermediate mechanism just referred to between the two banks of keys on the one hand and the selector setting lever 169 on the other, I call the "correlating mechanism", as it puts into mutual relation the individual actuations of the different keys and delivers the result thereof to the selector setter. It is also cumulative, in that it stores up the action of whatever key is first actuated until a key in the other bank is actuated. The two banks are thus independent as to time of actuation, while the result effected is conjoint.

The rockers M, N, and O, in Fig. 40, actuate the secondary verticals 139, 214 and 215 respectively, operating selective stops 138, 161 and 160, for plate I' of Figs. 13 and 13ª, and this connection is represented diagrammatically in the chart by the dotted lines extending from these rockers to plate I'. Similarly rockers P, Q and R cooperate with plate II'; rockers S, T and U cooperate with plate III', and rockers V, W and X cooperate with plate IV'.

As has been explained the plate I' and associated stops, determine the position in which the switch 14 will come to rest, and, as indicated in Fig. 13, the rocker M is arranged to bring this switch 14 to rest in position two; the rocker N to bring it to rest in position three; and rocker O to bring it to rest in position four. These positions are marked on the chart with the unit numerals 2, 3 and 4. If none of these three rockers are actuated in conjunction with rocker Y, the switch 14 will come to rest in position one, as no stops have then been interposed in the path of plate I'.

In a like manner the rockers P, Q and R determine the positions in which the switch 15 will come to rest, and these positions are marked as Nos. 20, 30 and 40, on plate II' in the chart; the rockers S, T and U determine the position the switch 16 will assume, and are marked Nos. 200, 300 and 400 on plate III' and rockers V, W and X determine the positions for switch 17, and are marked Nos. 2000, 3000 and 4000 on plate IV'. The vertical lines extending from the keys represent the primary verticals and the connections they make with the rockers. Thus the vertical for key 11 (referring to the row of numerals above the key circles) engages only rocker Y; the vertical of key 12 engages rocker M, in addition to rocker Y; the vertical of key 13 engages rocker N and Y; the vertical of key 23 engages rockers N, P and Y, etc.

The connections as indicated are permuted so that every possible combination of the positions of switches 14, 15, 16 and 17, are represented, to the number that are needed to correspond with the number of receptacles employed. Thus as each of the primary verticals is actuated by a key of the keyboard, the switches can be set to any desired combination by operating the keys.

For convenience in expressing any combination the rockers are indicated by the numerals assigned them in the chart, and thus the combination of rockers W, S, Q and O would be expressed as combination 3234 and this would mean that switch 14 is set to position four, switch 15 to position three, switch 16 to position two and switch 17 to position three, and this combination would be set by pressing keys representing 3200 and 34 respectively. In the chart, Fig. 40, I have apportioned the right hand bank of keys for units and tens of such numerical combinations, and the left hand bank for hundreds and thousands. In practice I may mark the individual keys of one bank with numerals and the other with letters. This is shown in the chart where the two keys J2 give the illustrative combination 3234.

From the mechanism heretofore described it will be apparent that the operator reading the address on the front letter of the pack presses a key with the right hand and a key with the left hand, which actuate corelated mechanism operating the selector-setting mechanism to set the carrier for the route corresponding to the address on the letter. With comparatively little practice the duplicate keyboard and the various routes it represents may be memorized so that the actuation of the proper keys is instinctive, as soon as the operator reads the address. When the address is read and the keys depressed, the rest of the operation is entirely automatic. The letter is fed forward by the group of feeding rollers to the oscillating conveyor and from the conveyor the letter passes to the carrier, which has been set according to the address.

The arrangement of rockers for a single-group keyboard is shown in the diagrams of Figs. 33 and 34, and needs no detailed explanation. When but a single group of keys is used for the keyboard, I use but one universal rocker, as Y, and arrange it to engage all the keys in the keyboard, and I omit one of the pawls, as 166, so that pressing any one key will cause a setting of the switches.

The mechanism for releasing the letter to the oscillating conveyor 11 is best shown in Figs. 29 and 39. As there shown, the slide bar 162 of the selector setting mechanism, carries the member 179 pivoted to it at 225 and held against a stop 226 by a spring 461. This member is adapted to strike a plunger 219 in passing, and, being supported by the stop 226, operates by the inclined contact surfaces to drive this plunger upwardly. On the return of the slide bar the plunger, under the influence of a spring (as 229 in Fig. 39) offers sufficient resistance against upward movement to overcome the spring 461 and the member 179 tilts back, passing under the plunger. The plunger 219 is carried in the support 220, and by a notch in the upper end engages a lever 221, which is pivoted at 222. This lever connects with a bell crank 224 by means of the link 223. The bell crank 224 is pivoted at 228 and actuates the stop finger 44, described in connection with Fig. 42. Thus when the slide bar 162 moves forward in the setting of the switches in response to the keyboard, stop finger 44 is actuated to release a letter to the oscillating conveyor 11, from which it passes to the carrier being set.

In Fig. 2 some of the carriers, as 369, are shown moving away from the right hand or keyboard side of the conveyor 2 to the left hand side of the same. These are carriers that have had their selectors set to combinations for receptacles on the left hand or distant side of the machine. The shifting of the carriers is brought about by a switch 26, constructed according to Fig. 22 (Sheet 3). This figure illustrates the switch diagrammatically with the conveyor removed, and the carriers are indicated by center lines only. 26 indicates a guide rail secured to the frame of the machine. Blades 370 are also secured to the frame and positioned to perform the functions hereinafter described. The guide rail 27 is at the other end of the frame and secured thereto, as is the blade 284. The approximate locations of these rails are indicated in Fig. 2 by the braces marked 26 and 27. The settable member 21 of the carrier, as shown in Figs. 7 and 19, can be set in any one of four positions. The blades 370 of the transfer switch are so placed in the path of this settable member that they will engage the same when it is set in positions 3 or 4, and by their curved shape cause the carrier 3, as the conveyor advances it, to shift on the conveyor cross rail 287 (Fig. 3), a sufficient distance to the left for the stem 249 to engage the blade 460 which continues the shifting movement until the roll 286 engages the rail 26 and completes the movement of the carrier to the left hand side of the machine.

If the settable member 21 is in position 1 or 2 it does not engage the blade 370, hence the carrier is not shifted to engage the switch rail 26 and the carrier stays on the right hand side of the machine to discharge its contents into a receptacle on that side. The switch rail 27, as indicated in Fig. 22, is arranged at the other end of the machine to engage the roll 286 of the returning carriers and shift them all to the right hand side of the machine adjacent the keyboard machine for reloading.

The various controlling blades for the settable members of the selector and the guides for the cam-operated rolls, which control the carriers as they pass over the receptacles and cause the discharge at the receptacle determined by the setting of the selector, are organized into what I term a "permuted rail." This element of the apparatus extends longitudinally of the machine, just above this lower reach of the endless conveyor, and is secured to the frame by suspending cross bars as 24 in Fig. 3, in the path of the settable members and rolls on the carriers. This permuted rail comprises a number of vertical blades mounted in slots in cross members, as shown in detail in Fig. 19, where 461 indicates one of the supporting cross members that are attached to the frame of the machine, 464 is a typical blade and slot, and 463 a rod passing through holes in the blades and lying in a groove in the cross member to bind the whole together. Fig. 47 is a cross sectional view of the member 461, showing how, by the use of a groove on each side of the cross member and a rod 463 passing through holes in the blades, the rods are made to serve as fastenings.

Referring to the diagrammatic representation of the permuted rail, Fig. 21, the same is seen to comprise two (in most respects, duplicate), series of blades of different lengths which are adapted to engage the settable members 18, 19, 20 and 21, of the carriers, whether on the keyboard-side of the conveyor or the far side thereof, and to release them during the progress of the carrier in such an order as to cause the discharge of the letter in the carrier at a point predetermined by the positions in which said settable members have been set at the keyboard machine.

As has been explained in describing the keyboard movement, for convenience I write the combinations in which the members 18, 19, 20 and 21 may be set at a number of four digits, as 2314, in which the units figure represents the position in which the member 18 is set; the tens figure the position in which the member 19 has been set, and the figures in the hundreds and thousands place represent respectively the positions in which members 20 and 21 have been set. In Fig. 21 the blades of the permuted rail are represented by the heavy lines of varying length, and the location of the points of discharge at the receptacles by the light lines.

In Fig. 21, because of the limited size of the diagram, I show a permuted rail for each row of receptacles laid out for but seventy-two receptacles in a row. In such a limited number the settable member 21 of the selector is employed only for switching the carrier from one side of the conveyor to the other, and is set only in position one or three, and group 21 of the controlling blades does not appear in the diagram for reasons which will be understood from the description below. An enlarged section of the entrance end of the diagram 21 is shown in Fig. 37, and illustrates more clearly the location of the cams 248 which actuate the discharge mechanism of the carrier and the initial selector unlocking cam 462, which moves the roll 125 of the carrier from position C to position D (Fig. 19).

The set of blades for the settable member 18 consists of a series of groups of short blades, each blade of the group varying in length in consecutive order from the one beside it by the distance from one discharge point to the next, which distance I will, for convenience, call an interval. The first section of the permuted rail which the carriers enter is designated J in Fig. 21 and corresponds in extent to one interval. While in this section of the rail, the carrier roll 286 engages the guide blades 312, and the roll 125 engages the cam 462 which shifts it to position D, unlocking the slide 261 in the selector, enabling the actuation of the settable members thereof. These members are prevented from acting until they pass the position indicated by the line 1111 of the diagram, when, if all the settable members are set for the first position, so that the combination is 1111 according to the notation I have explained, member 21 is released and is moved to position O by mechanism in the selector to be hereinafter described. The member 20 in turn moves to the O position, then the member 19 moves to the O position, and finally the member 18 moves to the O position, whereupon the member 247 of the carriers advances against the stem 249, shifting it into the path of a discharge cam 248 (see Figs. 46, 48 and 37). This cam is first engaged by the stem 249 and then by the roll 285 and swings the member carrying that roll to actuate the discharge mechanism of the carrier, and the letter in the carrier is thereby deposited in the box indicated by the combination 1111.

If the member 18 had been set in the second position it would have engaged the blade 2 and the discharge would have occurred on the line 1112; had it been set in the third position it would have engaged the blade 3 and the discharge would have occurred on the line 1113, and so on. The point of discharge of any carrier is accordingly determined by the point where its selectors clear the permuted rail. As there are permuted rail blades connecting at every position, discharge can be caused at any position by setting the selector fingers so that they are in engagement with some rail blades until the desired position is reached.

As will be shown in the description of the selector mechanism, the settable member 18 is held locked in any position until the member 19 takes position O, and the member 19 is held locked in any position until the member 20 takes position O, and the member 20 is held locked in any position until the member 21 takes the O position. The roll 125 in the C position locks the member 21, and in position D unlocks it to go to zero; suitable spring-actuated mechanism in the selector causing any unlocked and free settable member to promptly snap to its O position. Thus had the member 19 been set in the second position it would have been retained by the blade 2 in the 19 group and would hold the member 18 locked until the line 1121 was reached, when the member 19 would have been released and the member 18 being set for position one, and the discharge would have taken place on line 1121. Then follow the positions two, three and four for member 18 combined with this setting of the member 19. Thus the member 19 is used to predetermine in which group of the units set the member 18 will be released. Likewise the blades in the set 20, or the hundreds group, determine in which group of set 19 the member 19 will be released, and the blades of set 21 determine in which group of set 20 the member 20 will be released.

Following the described arrangement, as shown in Fig. 21, and carrying it out in full, the successive release of the four settable members as shown would give a total of 256 possible discharge points. In the machine illustrated, with two rows of receptacles, and a permuted rail for each row, I use on the keyboard side of the machine all or part of the combinations resulting from the positions one and two of the member 21, with all of the positions of members 18, 19 and 20, and for the other row of receptacles I use all or part of the combinations resulting from positions three and four of the member 21, with the other settable members. This conforms to the division of the carriers as made by the switch 26, as previously described.

Referring to Figs. 7 and 8, the carrier consists of a box 116 with an opening 13 in the end to receive the letter, and a door 25 to discharge the letter, and mechanism for operating said door. These figures show the carrier in receiving position, but in discharge position it is inverted, so that the letter may drop out by gravity—when the door is opened. The door is hinged to the side of the box at 231 and connected to bell-cranks 235$^a$ and 235$^b$ by links 233$^a$ and 233$^b$. The bell-cranks are pivoted at 236$^a$ and 236$^b$ and connect to a link 238 at 237$^a$ and 237$^b$. The link 238 carries a roll 239 which works in a cam slot 240 of a rocking member 241. This member 241 is pivoted at 242 and engages a finger 244 of the operating member 243, which carries the roll 285, heretofore referred to. This operating member 243 is also pivoted at 242, and is actuated by engagement with stationary cams 248 located over the receptacles and correlated with the elements of the permuted rail, as shown in Fig. 37. The result of such actuation is to open and close the door 25.

The cam slot 240 is so formed as to lock the door shut when in the position shown in Fig. 7. As shown more in detail in Figs. 20 and 46, the rocking member 243 has a small amount of lost motion when operating the rocker 241, and when the door is locked shut the spring 462 maintains the member 243 in the position shown in Fig. 20. When the door is thus locked, the stem 249 is normally in the position shown in this figure, and out of engagement with the cam 248, but when the carrier has arrived at a point where it is to discharge a letter, the mechanism in the case 22, which will be described later, forces a slide 247 against the member 243, at 294, moving it into the position shown in Fig. 46, where it engages the cam 248.

Fig. 19 is a view of the selector mechanism with the cover removed. The four settable members are shown at 18, 19, 20 and 21. Each of these members is pivoted as at 251 and carries a roll, as at 252, and has teeth for locking purposes, as at 253. A pawl 254 mounted on the center 255, with a tooth 256 is employed for locking the settable member in its various positions. The slide 261 carries cams like 259, which engage rolls 257 on the pawls 254 to move those pawls out of engagement with the teeth 253. The slide 261 also carries a cam 269 which engages the roll 252 on the settable member 21. This slide 261 terminates in a bracketed piece 272 which has a stem 262 carrying the roll 125 and has detent notches 270 and 271 which receive a roll 264 of the arm 263. This arm is pivoted at 265 and attached at 267 to the spring 266, the other end of the spring being anchored at 268.

The roll 125 on the carrier is used to engage cams that are arranged in its path to move the slide 261 to the various positions A, B, C and D. In position D, the slide 261 is under the control of the spring 266, through the arm 263, and this spring acts to force the slide to the position A. The cams 259, 260 and 269, are duplicated on the slide 261 for each of the settable members as shown. The cams 260 are so located on the slide that when the slide is in position B these cams move all the pawls 254 out of engagement with teeth 253 of the members 18, 19, 20 and 21, allowing the same to swing freely on their centers. The slide 261 is locked to this position by the roll 264 engaging the notch 271. This position of the slide is used for shifting the settable members by means of the V guides 121, 122, 123 and 124, and the switches 14, 15, 16 and 17 of the keyboard machines, the roll 125 being controlled by the guide 126, as shown in Fig. 5.

After the carrier has been advanced by the conveyor to the location where the settable members are traversing the guides 364, the roll 125 is moved to position C by the guide 127. In the position C of the slide 261, the pawls 254 are free of the cams 260, and the springs 258 force them to engage in the teeth 253, locking the settable members in the position they then occupy. The selector mechanism is locked by these means during the travel of the carrier from the keyboard machine to the permuted rail.

The settable members 18, 19 and 20 and 21, at the permuted rail, enter a series of guides, the arrangement of which is shown diagrammatically in Figs. 21 and 37, and has already been explained. These guides consist of blades in four groups of four each, as 274, 275, 276 and 277, which engage the settable members as shown in Fig. 19. When these members have entered this series of guides a cam guide 462 engages the roll 125 and moves it to position D, which places the slide 261 under the control of the spring 266 through the arm 263. The cam 269 is so placed on the slide 261 that it then bears against the roll 252 on the settable member 21, and the cam 259 is so placed that it engages the pawl 254 to unlock that member, but the like cams for the members 18, 19 and 20 are so arranged on the slide 261 that they do not engage the rolls or pawls for those members with the slide in this position. The slide 261 now operates to force the member 21 to the position O, except as the blades 274, 275, 276 and 277 interfere.

Referring again to Figs. 21 and 37, the blades of the permuted rail are of various lengths and grouped in certain relations which have been explained. According to the position in which the settable member 21 has been set by the switch 17, this member will enter the permuted rail and engage a corresponding blade. When the carrier has advanced to the point where this blade terminates this member is then forced to position O by the cam 269 acting on the roll 252. In this position the roll 252 (which swings in an arc about the center 251) passes beneath the cam 269 (which moves in a straight line) and the cam 259 allows the pawl 254 to resume the locking position. A cam 269' is so located on the slide 261 that it now takes bearing against the roll 252' to force the member 20 towards the O position, and the cam 259' is so located on the slide as to move a pawl 254' out of the locking position. The settable member 20 now takes bearing on either blade 278, 279, 280 or 281, according to the position to which it was set by switch 16. When the engaged blade terminates the member 20 swings to position O and the cam 259 releases the pawl 254', to lock the member 20 in this position. The cam 269'' is so located upon the slide 261 as to now take bearing upon a roll 252'' of the settable member 19, and a cam 259'' engages a pawl 254'' to unlock the member 19, and the operations described for the members 21 and 20 are repeated for the member 19, and it, in turn, is locked in the O position. Like cams similarly located engage the member 18 and the described operations are repeated on this member, and it is moved to and locked in the O position, and a cam 269''' clears a roll 252''', permitting further movement of the slide until the end 247 thereof engages an extension 294 of the member 243, as in Fig. 46, and moves it from the position of Fig. 20 to the position of Fig. 46, to engage one of the cams 248 and accomplish the opening of the carrier door. It will be seen in Fig. 19 that while the cam 269 is in engagement with the roll 252, there is considerable space between the cam 269' and the roll 252', and still greater space between the cam 269'' and the roll 252'', and a space still greater between the space 269''' and the roll 252'''. The result is that a sufficient space interval is allowed for each cam to shove to the right and downwardly, the roll engaged by it before any of the cams at the right thereof can engage their rolls.

The carrier door remains open until the carrier arrives at a cam 284 (see Fig. 22), which engages the roll 285, forcing it over to the position of Fig. 20, thus closing the door for the next passage of the carrier through the apparatus. The roll 286, Figs. 7, 20 and 37, is used to engage guides as 312, to hold the carrier against sideways movement when the rolls 125 or 285 are being forced from one position to another by the various cams, and to engage rails 26 and 27 of Fig. 22, for switching.

Referring to Fig. 7, I show in detail the cross rail 287 on which the carrier 3 rides and is secured in the conveyor. This rail as shown is mounted on the two parallel chains 398 and 399 comprising the conveyor, by means of screws, as 383, and nuts, as 384. The lengthwise edges 290 and 291 of this cross rail are turned over, as shown in Fig. 8, to serve as runways for the three rolls 292, 293 and 294, of the carrier. These rolls are flanged and hold the carrier on the cross rail but permit it to be moved freely from one end to the other. When the carriers are in the upper reach of the conveyor they are uniformly lined up on the keyboard side of the conveyor, those which were on the distant side while passing over the receptacles being gathered and shifted to the front side by the track 27, as has been described. The carriers then pass the keyboard machines and are loaded with letters and have their selectors set for the next pass over the receptacles.

I have shown how the apparatus is arranged so that certain carriers are filled by the individual keyboard machines, that is, the carriers in the upper reach of the chain may be considered as made up of a series of groups of three carriers each (for a three-keyboard machine), the first carrier of each group being loaded by the first keyboard machine, the second carrier of each group by the second keyboard machine, and the third carrier by the third machine. I provide means, therefore, whereby the first keyboard machine sets only the selectors of the first carriers of the groups, and the second machine sets only the second carriers of the groups, and the third machine only the third carriers of the groups, and the settings given by any keyboard machine are not disturbed when the set carrier passes any other keyboard machine. The mechanism for accomplishing these results will now be described.

Referring to Fig. 24, the case 22 containing the settable members, the slide and cooperating mechanism, is mounted upon guiding ribs 297 and 298 upon which it has a short up-and-down movement from position indicated by G to position H. On the cover of the case there are two rolls 299 which work in slots 300 of rocking members 301 and 303. These members 301 and 303 are pivoted at 302 and have the wings 304 and 304$^A$. When the wings 304$^A$ are moved toward the carrier, the members 301 swing away from each other, and the cam slots act to force the rolls in a direction to bring the case 296 to the position H. When the wings 304 are moved toward the carrier, the members 301 and 303 swing toward each other and the cam slots 300 operate to force the rolls in a direction to move the case 296 to position G. The cam slots, as indicated, are shaped with a slight depression to normally hold the case in position G.

Figs. 24 and 25 show a shaft 306, of which there is one for each keyboard machine, and which carries cams 305, which, as indicated, are formed as at 387 to engage the wings 304$^A$ of every third carrier; this shaft also carries a gear wheel 388, which meshes with the sections of a gear rack 307 attached to the chain conveyor. These gears are so proportioned that the cams will rotate in synchronism with the passing carriers, and operate the members 304$^A$ of every third carrier. The gears 388 for the different keyboard machines are meshed with the rack 307 in such relation to the passing carriers as to actuate the cases 22 on those carriers which are to be loaded by the associated keyboard machine. This device is shown mounted in Fig. 5.

The V guides 121, 122, 123 and 124, and the switches 14, 15, 16 and 17, are on a level such that they will engage the settable members of a carrier with the case 22 in position H, but not those of a carrier with the case 22 in position G. Accordingly, only those carriers whose cases 22 are drawn down by the cams 305 at any keyboard will coact in any manner with the V-guides and settable switches appertaining to that keyboard. A shaft 308 (Fig. 5) carries the plain wheels 309 which engage the wings 304 of the carrier after it has passed the switches, and actuates the members 301 to return the case 22 to the position G, where it remains until the carrier on the next trip is again selected by its appropriate keyboard machine for loading and setting. The plain wheels 309 of Fig. 5, are used on the shaft 308 instead of the cam-shaped wheel 305, as the function of the wheels 309 are simply to restore the case 22 to position G, and no selective feature is required. The gear 388 is proportioned according to the number of keyboards for which the apparatus is constructed, and is different for one of three keyboards than one of ten keyboards, as is readily understood from the description of side shaft gearing and carrier groupings for loading.

The endless conveyor 2, which is arranged adjacent the keyboard machines and above the receptacles 4—4—4, may be specifically constructed as follows, reference being had to Figs. 2, 3, 7 and 8: This conveyor 2 consists primarily of two parallel chains 398 and 399, carrying the cross rails 287. These cross rails are of sheet metal with a right angle foot at each end, indicated by 365—365, for attachment to the parallel chains. It will be noted in Figs. 38 and 50 that the conveyor chains comprise the links 341 and 342 bent over the top, as 343, and adapted to receive the feet of the cross rails 287, which are bolted in place. The link 341 and a side bar 344 are secured to a bushing 345. The link 342 and a side bar 400 are secured to the pin 346, which has a running fit in the bushing. A small wheel 401 is mounted on the bushing 347 and carries the weight of the parts and is adapted to travel the track 348. Between the bushings 345 and 347 is a bushing of anti-friction material, as impregnated wood, for example. As shown in Fig. 3 the chain is arranged to ride the trackage 348 in both the upper and lower reaches, so that the weight of the conveyor and the carrier is transferred directly to the tracks and the frame through the wheels 401, of which there is one at every juncture of one link with another.

Referring to Fig. 1, the receptacles (of which only a few are shown) consist of a series of inclined back plates 314, downwardly movable shelves or bottom stops 315, and shields 316. The blades of the permuted rail and the cams 248 are so arranged as to cause the discharge of the letter for a given receptacle, at approximately the line 317. While the letters L are dropping from the moving carriers they have a horizontal movement, indicated by broken lines in Fig. 17, due to momentum, so that, during the first part of its fall the letter follows very closely the curve of the shield 316, as illustrated. The letter continues and strikes either the bottom stop or the face of the stack of letters on it, and the lower edge of the letter is arrested while the momentum continues the forward movement of the top, causing the letter to fall over and take its place on the face of the stack, as shown.

The incline of the back is such that the letters stack up with their lower edges in contact with the same. As the stack builds up provision must be made for moving it down, so as to maintain a uniform location for the receiving face of the stack to insure the proper stacking of the letters to facilitate future handling by the attendant, and to keep the letters with their addressed faces "faced" the same way—an important factor in handling the mail.

Referring more particularly to Figs. 17, 18, 26, 27 and 28, the bottom stop 315 of each receptacle is mounted upon a small carriage 467 which rides a rail 318 secured to the rear face of the back plate 314 of the next receptacle. This carriage is either propelled or restrained in its movements by the endless chain 319, carried by the sprockets 463 and 320. The sprocket 320 is secured to a spindle 313, terminating in the worm gear 322, which is driven by the worm 323 on the shaft 324.

As shown in Figs. 18 and 51, the shaft 324, which, as just explained is geared with the bottom stop carriage, terminates in a disk-like clutch member 325. A sheave 326 is faced to form the companion member of a friction clutch to cooperate with the disk 325 and is mounted on a spindle 327 which extends through the center of the electro-magnet 329 and terminates in the armature disk 328. The sheave 326 is driven by the continuously running belt 330. The electro-magnet is mounted on the bracket 335, and is stationary. The spindle 327 has a lengthwise movement in its bearing through the core of the electro-magnet, to permit the friction face of the sheave 326 to make and break operative contact with the member 325.

One terminal of the electro-magnet is connected with a suitable source of electric current, and the other terminal is connected to the contact 334. A feeler finger carrying a cooperating contact 333 is pivoted at 332 (Fig. 27) and has an end 321 arranged to clear the face letter of the letter stack, its contact being connected with the return terminal of the source of electric current. The feeler finger 321 is sensitively mounted, and closes the two contacts 333 and 334 when a letter rests upon it. The closing of the circuit through the electromagnet causes the latter to attract the armature 328, imparting a lengthwise movement to the spindle 327, resulting in the friction face of the sheave making operative contact with the member 325, and imparting rotary motion to the worm 323, turning the gear 322 and the sprocket 320. The direction of rotation of the sheave, and the direction of the worm helix is such as to move downward the reach of the chain to which the bottom stop 315 is attached. The downward movement of the bottom stop allows the letter to clear the feeler finger, which is then moved back to normal position by the spring 325, breaking the electric contact between the points 333 and 334, whereupon the electro-magnet 329 is de-energized, resulting in the sheave 326 breaking frictional contact with the clutch member 325, and the bottom stop 315, thereupon coming to rest.

The belt 330 is shown as running alternately over one sheave and under the other, whereby each sheave rotates in the direction the opposite of the one on either side; hence, the worms 323 and worm gears 322 are alternately right and left hand sets, so that in any of the receptacles the bottom stop 315 will be given a downward movement when the corresponding feeler finger causes the energizing of the electro-magnet for that receptacle. The belt 330, after passing over and under the alternate sheaves, as above described, is returned to the driving sheave 337, see Fig. 10. This sheave 337 is secured to a shaft 338 (Figs. 1 and 10), which also carries a duplicate of sheave 337 at the other end for driving the bottom stop devices of the rear row of receptacles. A sheave 339 on the shaft 338 is driven by a belt 336 leading over a sheave 340 on the shaft 65, thereby driving the belts 330 for both the rows of receptacles.

The bottom stop 315 is hinged to its carriage, and is supported by the strut 464, which is hinged in a bearing 465, on the under side of the shelf and is caused by a torsion spring 466 to take bearing against the carriage at 467, the movement of the same being limited by the cranked end 468 which bears against the under side of the shelf. When it is desired to move the bottom stop from beneath a stack that has accumulated, and move it up to start a new stack, the crank arm 468 is swung by the attendant to move member 464 to the position indicated by the dotted lines in Fig. 26, where its end projects through a slot in the carriage plate provided above the normal position of the strut, and permitting such movement. The plate 315 is then free to turn on the hinge 463 and swing down against the carriage 389 and pass up over the top of the old stack, as shown in Fig. 1, at 470. It is then forced upwards and the plate 315 swung back to its normal position, the strut being brought to its supporting position by the spring 466. The arriving letters begin to fall to position on it and the attendant can then remove the stack in the bottom of the receptacle without interfering with the proper stacking of the arriving letters.

The carriage 467 is attached to the chain 319 by means of the pawl 471 (see Fig. 49), which is pivoted at 472, engages the chain at 473, and is held in position against a stop 474 by a spring 475. When the carriage is moved upward, as described, which is in the direction of the arrow, the pawl automatically becomes free from the chain, but immediately the carriage is moved downward the pawl engages the chain and the further downward movement of the carriage is controlled by the chain.

Attention has been called to the independence of the various keyboard machines. On account of this independence it is immaterial, so far as any keyboard machine is concerned, whether the other keyboard machines are idle or running. It is desirable, however, in order to save wear and power, to disconnect the drive of any keyboard machine which is idle. To readily effect this I provide a clutch for disconnecting the shaft of the pinion 60, which transmits power from the through shaft 61 to the corresponding keyboard shaft 50. Each of these pinions 60 is accordingly rotatably free on its shaft. A clutch member 491 (Figs. 2 and 5), is splined to the shaft and adapted to engage the pinion 60 or be free from it, such condition being controlled by a shipper lever 492 which is connected with a rod 490, which has a finger knob 493. When this knob is pulled out, the keyboard mechanism is connected; when it is pushed in, the keyboard mechanism is disengaged. To insure any keyboard being connected in synchronism with the conveyor and the other keyboards, I provide only one tooth 495 on the clutch member 491 adapted to engage only one notch in the gear hub 60.

Briefly summarized, the operation of my apparatus is as follows: The unassorted but faced letters are supplied by the attendants from time to time to the feed tables of each keyboard machine. The various keyboard operators work entirely independently of each other. Each reads the address on the face of the letter (or so much of the address as determines the route), and presses two keys, one with each hand, which represent a combination corresponding to the receptacle to which the letter should go. The depression of these keys raises corresponding primary verticals which move rockers connected therewith to depress certain secondary verticals. The movement of these secondary verticals results in releasing certain slides which move until stopped by certain stops positioned by the secondary verticals. These slides are connected with the pivoted switches for the selective mechanism on the carriers and result in setting those switches to a combination corresponding to the keys depressed and to the desired receptacles.

The operator presses the keys at any instant desired in the cycle of the machine. The effect of such depression, however, remains in abeyance, so to speak, until the proper carrier is in position for setting and loading. The travel of the carriers is synchronized with the positioning of the switches, so that, just before the carrier arrives at the switch, the switch becomes positioned by the actuation of the mechanism which was set by the keys. Then the positioned switches will set the selectors on the carrier. An oscillating conveyor, in a pathway leading from the front of the stack of letters, registers with the carrier and swings with it as the carrier travels, and during this movement the letter is released and is fed through the oscillating conveyor into the carrier.

The carriers are located consecutively on an endless belt conveyor, but act in groups of as many units as there are keyboard machines, the first keyboard machine acting on the first carrier in each group, the second on the second carrier in each group, and so on. When the carriers have been loaded they continue to travel with the conveyor. They may either remain on the side of the conveyor adjacent the keyboards or be moved to the rear portion thereof, according to the setting of their selectors, to enable them to cooperate with two rows of receptacles, one beneath the keyboard side of the conveyor and the other beneath the distant side thereof.

After the carriers have passed over the end of the machine they travel horizontally on the lower reach of the conveyor above either row of receptacles, the selectors on the carriers coacting with the permuted rail extending lengthwise of the machine which has blades terminating in various positions. The carriers have their discharge mechanism unlocked just before they coact with the blades and then are held shut by those blades but are released when the connection of their selectively positioned members with the blade terminates. The point where this takes place depends upon the setting of the selector members. When these members clear the permuted rail, the door at the lower end of the carrier is thereby automatically opened and the letter drops into the receptacle beneath such position. The carrier then goes on and rises over the other end of the machine and those carriers which were on the distant portion of the conveyor are cammed back to the keyboard side thereof and thus empty carriers are continuously represented for reloading.

When the discharged letter has dropped into the receptacle it falls either on a bottom stop or on previously discharged letters resting on such stop. When the letter space above the bottom stop becomes filled, the topmost letter crowds back a feeler which makes an electric contact, which, through an electro-magnet, throws in a clutch to connect mechanism to lower the bottom stop in that receptacle. The classified letters may be removed by the attendant from above the bottom stop, or whenever desired he may tip the bottom stop and thus discharge the letters above it into the lower part of the receptacle for removal.

It should be noted that the term "letters" used in the specification, refers to mail matter in general of any sort, kind or condition, which an apparatus within the spirit and scope of my invention is adapted to handle. While the particular machine shown in the drawings has been constructed and proved to operate successfully in the actual handling of large quantities of mail, it should be noted that the mechanisms shown can be added to or subtracted from or differently arranged, without departing from the spirit and scope of my invention. I believe myself to be the first to produce an apparatus for simultaneously sorting and distributing a plurality of divisions of a large bulk of mail, rapidly and with the minimum amount of handling, by means of multiple keyboards, and a series of carriers all cooperating in a single system to distribute the letters to predetermined delivery points and assemble the letters for the same immediate destination from two or more inspection stations to the same delivery point.

Having thus described my invention, what I claim is:

1. In a mail assembling apparatus, the combination of a plurality of keyboards, a set of receptacles, and mechanism controlled by the various keyboards for selectively assembling mail in the different receptacles.

2. In a mail assembling system, the combination of a set of receptacles, a plurality of independent keyboard machines, and means operated thereby for selectively assembling mail from various sources into said set of receptacles.

3. In a mail assembling system, the combination of a plurality of keyboards, a set of receptacles common to the different keyboards, and mechanism controlled by the keyboards for assembling in the different receptacles mail individually distributed by the keys of the respective keyboards.

4. In a mail assembling system, the combination of a plurality of key-board machines having mechanism for arranging mechanical characterizing features associated with the individual letters, means for dispatching such letters with such associated features, a series of receptacles, and means whereby letters so associated and dispatched by the various key-board machines are non-interferingly assembled in the receptacles.

5. In a mail assembling system, the combination with a set of receptacles, of a plurality of key-boards and mechanism correlated therewith, adapted to associate mechanical characteristics with individual letters from different sources, and assemble them in interspersed relation in different receptacles into which they are automatically distributed according to such mechanical characteristics.

6. In a mail assembling apparatus, the combination of a series of receptacles, a plurality of keyboards, an inspection station associated with each keyboard, independent means for feeding unclassified mail to the respective inspection stations, and mechanisms controlled by the various keyboards independently of each other to despatch inspected letters and to effect the assemblage in the appropriate receptacles of letters so despatched.

7. The combination of a plurality of keyboards, a series of receptacles common to the various keyboards, conveying mechanism adapted to receive letters from any keyboard and discharge it to any receptacle, and mechanism controlled by the keys for determining the points of discharge.

8. The combination of a plurality of keyboards, a series of receptacles common to each of the keyboards, conveying mechanism adapted to receive letters from any keyboard, mechanism associated respectively with each keyboard for mechanically characterizing letters and despatching them to the conveyer, and means coacting with such mechanical characterization for determining the points of discharge from said conveyer.

9. In a mail assembling apparatus, a series of inspection stations, keyboard mechanisms at said stations, a conveyer common to all the inspection stations and adapted to be controlled by the said keyboard mechanisms to deliver letters, and a single set of receptacles to receive the letters from said conveyer as determined by said keyboard mechanisms.

10. The combination of a plurality of keyboards, an inspection station associated with each keyboard, means for independently feeding unclassified mail to the inspection stations, conveying mechanism adapted to receive letters from any inspection station, keyboard-controlled means for loading inspected letters into the conveyer, and mechanism associated respectively with the different keyboards and controlled thereby for mechanically determining the points of discharge of the respective letters from the conveyer.

11. In a mail assembling system, the combination of a plurality of substantially identical keyboards, a single set of receptacles individually corresponding to the key-routes of any of said keyboards, a suitable conveying system, and mechanism under the control of the keys of any keyboard and serving to mechanically characterize the conveying system to cause it to discharge mail to the appropriate receptacles, dependent upon such characterization but independent of which particular keyboard accomplished the characterization.

12. In a multiple keyboard mail assembling machine, the combination of a series of keyboard-controlled letter feeding and selector-setting devices, a conveyer, sets of selectors on the same, and a set of selector-release devices adjacent the conveyer and common to all of said sets of selectors, whereby selectors of the various sets when given the same setting are released at a common selector-release device.

13. In a mail assembling system, the combination of a plurality of substantially identical keyboards, a set of receptacles, each corresponding to a different key or set of keys of any keyboard, a conveyer having as many sets of carriers as there are keyboards, mechanism whereby each keyboard may characterize the corresponding carriers, and mechanism whereby any carrier may discharge its contents at any receptacle depending on the characterization of the carrier.

14. The combination, with a plurality of keyboards and letter feeding mechanism controlled thereby, of a conveyer system common to all of the keyboards and having letter-transporting devices respectively correlated with different ones of said keyboards.

15. The combination with a plurality of keyboards, of a conveyer system having letter-transporting devices arranged in groups, the different individuals in each group each appertaining to one keyboard only, and means controlled by the keyboards for loading the conveyer and for determining the discharge from the conveyer.

16. The combination, with a plurality of keyboards, of a conveyer system common to all of the keyboards and having letter-transporting devices arranged in repeating groups, there being as many individuals in each group as there are keyboards and each individual appertaining to a particular keyboard only, and means controlled by the keyboards for loading the conveyer and for determining the discharge from the conveyer.

17. In a mail assembling system, the combination with a plurality of keyboards and selector setting mechanism controlled thereby, of a corresponding number of sets of carriers, each set appertaining to one particular keyboard, and the sets being regularly interspersed to provide repeating groups of carriers in a single continuous series, and discharge-controlling selectors adapted to be set by said selector setting mechanism.

18. In a mail assembling system, the combination of a plurality of substantially identical keyboards, a set of receptacles, the individuals of the set corresponding to the same key-routes of all of the keyboards, as many sets of carriers as there are keyboards, and means controlled by the keyboards for causing the carriers to discharge their contents at selected receptacles corresponding to the key or keys operated and independently of which particular keyboard was actuated.

19. The combination with a plurality of keyboards and a set of receptacles, of a conveyer system between the keyboards and receptacles having letter transporting devices apportioned among the different keyboards, and means controlled by the keyboards for loading the conveyer and for determining the discharge from the conveyer to the receptacles.

20. The combination with a set of receptacles and a plurality of keyboards, of a conveyer system between the keyboards and receptacles having letter transporting devices arranged in groups, the different individuals in each group each appertaining to one keyboard only, and means controlled wholly by the keys of the keyboards for loading the conveyer and for determining the discharge from the conveyer to the receptacles.

21. The combination with a set of receptacles and a plurality of keyboards, of a conveyer system between the keyboards and receptacles having letter transporting devices arranged in repeating groups, the corresponding individuals in each group appertaining to one keyboard only, and means controlled by the keyboards for feeding letters to the conveyer and for determining the discharge from the conveyer to the receptacles.

22. The combination with a plurality of keyboard machines, and a conveying system having carriers arranged in repeating groups, the carriers of each group individually appertaining to certain individual keyboards, and means controlled by the keyboards for loading the carriers.

23. The combination with a plurality of keyboard machines, a series of receptacles common to all the keyboard machines, a conveying system having duplicate carriers arranged in repeating groups, there being as many carriers in the group as there are keyboards and the carriers of each group individually appertaining to certain individual keyboards, and means controlled by the keyboards for loading the conveyer and for causing discharge of the carriers into the appropriate receptacles.

24. The combination of a plurality of keyboards, a set of receptacles, a series of movable carriers each appertaining to a certain one of said keyboards, mechanism whereby each keyboard may control the loading of mail into any of its own carriers, and means whereby each keyboard may control the discharge of mail from any of its own carriers into said receptacles.

25. The combination of a plurality of keyboards, a set of receptacles, an endless movable conveyer, carriers thereon, each appertaining to a certain one of said keyboards, means for propelling the conveyer to cause the carriers to travel past all of the keyboards, and discharge mechanism adapted to be set differently by different keys of a keyboard, whereby each keyboard may control the discharge of mail from any of its own carriers into any said receptacles.

26. The combination with an endless conveyer, carriers arranged in succession thereon, a series of keyboards, and mechanism whereby each keyboard may load mail into certain carriers only, the carriers for the different keyboards being regularly interspersed in said continuous set.

27. The combination with a set of carriers having duplicate discharge controlling selectors thereon, a plurality of keyboards, mechanism associated with each keyboard and adapted to set selectors on the carriers, means whereby a setting by one keyboard is not disturbed by the other keyboards, and a set of receptacles into which said carriers may discharge.

28. The combination with a plurality of keyboards, of a conveyer, common thereto, carriers thereon each having duplicate selective mechanism, mechanism associated with each keyboard and adapted to set selective mechanism on the carriers, and means whereby a setting by one keyboard is not disturbed by the other keyboards.

29. In a mail assembling system, the combination with a plurality of keyboards, a set of carriers, means for propelling them past all the keyboards, selective mechanism on each carrier, mechanism associated with each keyboard and adapted by the keys to set differently the selective mechanism on the carriers, and means whereby a setting by one keyboard is not disturbed by the actuation of the keys of the other keyboards.

30. The combination, with a series of common receptacles, movable carriers adapted to transport mail to all of the receptacles, settable selective mechanisms on the carriers for controlling the discharge of the carriers, a plurality of keyboards and mechanism associated individually therewith for setting said selective mechanisms by the actuation of the separate keys of the keyboard, and means for causing each keyboard mechanism to cooperate with certain carriers independent of those apportioned to the other keyboards.

31. The combination with a series of receptacles, of an endless conveyer, carriers on the conveyer adapted to transport mail to all of the receptacles, mechanism for controlling the discharge of the carriers, a plurality of keyboards and mechanism associated individually therewith and controlled by the separate keys thereof for setting the selective mechanism, and means for causing each keyboard mechanism to cooperate with certain carriers independent of those apportioned to the other keyboards.

32. The combination of an endless conveyer, a series of carriers thereon, settable selective mechanism on each carrier adapted to control the point of discharge thereof, a series of keyboards, individual mechanisms appertaining to said keyboards respectively and adapted to set the selective mechanism on said carriers, means for propelling all of the carriers in succession past all the keyboard mechanisms, and means whereby during such travel each carrier has its selective mechanism coacting with only one of the keyboard mechanisms.

33. The combination of a series of mail carriers each provided with a settable selector, a plurality of keyboard machines each provided with selector setting mechanism, and means whereby each keyboard machine operates only on carriers having the same position in groups in said series, there being as many individuals in each group as there are keyboards.

34. In a mail assembling apparatus, a conveyer comprising a series of groups of letter carriers and a plurality of synchronized letter feeding devices adapted to feed letters to said carriers, the individual feeding devices being so timed that the first device feeds letters to the first carriers of each group, and the succeeding letter feeding devices feed letters to the corresponding succeeding carriers in each group.

35. In a mail assembling apparatus, a letter distributing mechanism, a series of receptacles arranged to receive the letters from said mechanism, a plurality of letter feeding mechanisms, a keyboard-controlled mechanism associated with each of said feeding mechanisms to predetermine the receptacle in which a letter fed to the said distributing mechanism will be deposited, and means to prevent any of said feeding and keyboard mechanisms interfering with the course of a letter from any other of said feeding mechanisms, through the distributing mechanism.

36. The combination of a series of carriers each provided with a settable selector, a plurality of keyboards, individual mechanism associated with each keyboard for setting selector mechanism on the carriers, means for causing the selectors of certain carriers to come into coacting relation with the selector setting mechanism of certain keyboards only, whereby each keyboard sets certain carriers without interfering with the others, discharging means coacting with all of the selectors, and a series of receptacles common to all of the carriers and adapted to receive the discharge therefrom.

37. The combination of a series of carriers each provided with a settable selector, a plurality of keyboard machines each provided with mechanism for setting selectors on the carriers, means for propelling the carriers in succession past the keyboard machines, means for moving the selectors of the different carriers into coaction with only one of the keyboard machines in each cycle of operation, certain carriers having their selectors moved into coaction with certain different keyboard machines.

38. The combination with a series of carriers, settable selective mechanism on each carrier, a plurality of keyboard machines each provided with settable switches adapted to coact with the settable mechanism on the carriers, means for causing certain carriers to come into conjunction with the switches of certain keyboard machines individually while traveling past all of the keyboard machines, and a series of discharge receptacles fed by said carriers.

39. The combination of a series of movable carriers each provided with a settable selector, a plurality of keyboard machines each having means for setting selectors on the carriers, means for moving the carriers in succession past all of the keyboard machines, means for bringing carriers separated by intervals corresponding to the number of keyboard machines into coaction with the setting mechanism of each keyboard machine, and discharge controlling mechanism coacting with the settable selector on the carriers.

40. The combination of a series of carriers each provided with a settable selector, a plurality of keyboard machines each provided with mechanism for setting said selectors, means for propelling the carriers in succession past the keyboard machines, means for causing coaction between certain carriers and the selector setting mechanism of certain keyboards, the carriers thus appertaining to the various keyboards being arranged successively in repeating groups, each group having as many carriers as there are keyboards, a discharge device coacting with the set selectors, and a series of receiving receptacles into which the discharge is effected.

41. In a mail assembling machine the combination of a conveyer, a set of carriers for pieces of mail on the same, a series of receptacles to receive the pieces of mail as discharged from said carriers, a plurality of dispatching stations along said conveyer, keyboard mechanisms at said dispatching stations, selectors on said carriers controlled by the keys of said keyboard mechanisms to cause the carriers to discharge their contents at predetermined receptacles, and selector-setting and loading mechanisms connected with the respective keyboard mechanisms and controlled by the keys thereof to cause each dispatching station to load pieces of mail into, and set the selectors of, carriers that have not been loaded at preceding dispatching stations.

42. The combination of a set of mail carriers each provided with a settable selector, a plurality of keyboard machines each provided with selector-setting mechanism, means actuated by the keyboards for loading mail into the carriers, and means whereby the discharge of the contents of the carrier is controlled by the setting of its selector.

43. The combination of a series of carriers each provided with a settable selector, a plurality of keyboard machines each provided with mechanism for setting the selectors on the carrier, means for propelling the carriers in succession past the keyboard machines, means controlled by the keyboard machines for loading mail into the carriers as they move, and a set of receptacles into which the carriers selectively discharge their contents.

44. The combination with a series of carriers, settable selective mechanism on each carrier, a plurality of keyboard machines each provided with settable switches adapted to coact with the settable mechanism on the carriers, means controlled by the keyboard machines for loading mail into the carriers, a series of discharge receptacles, and means coacting with the settable mechanisms on the carriers for causing selective discharge from the same into said receptacles.

45. In a mail assembling apparatus, a conveyer, a series of receptacles adjacent to the same, a plurality of keyboard-controlled mechanisms adapted to discharge letters to said conveyer, means directing the discharge of said letters from the conveyer into said receptacles, said means being controlled by said keyboard mechanisms and adapted to direct the letters in the conveyer from several of the keyboard mechanisms, and means to deliver them superimposed into a single stack in any receptacle.

46. In a mail handling apparatus, the combination of a letter transporting mechanism comprising a plurality of letter carriers, and means for propelling them, a reciprocating letter feeding device, and means for moving it in synchronism with said carriers and timed to feed letters into certain carriers.

47. The combination, with a movable letter conveyer, of a keyboard having an inspection station, and a reciprocating conveyer adapted to discharge the inspected letter under the control of the keyboard to the first mentioned conveyer while it is moving in the same general direction as the discharging end of the conveyer.

48. The combination, with a continuously movable letter conveyer, of an oscillating conveyer at substantially right angles to the path of movement of the conveyer first mentioned and adapted to discharge letters to the continuously moving conveyer in the same general direction as the movement of the discharging end of the oscillating conveyer.

49. The combination of a movable endless conveyer, letter carriers thereon, a keyboard having an inspection station, a reciprocating conveyer, means for causing it to periodically register with carriers on the conveyer and load the carriers while the conveyer is moving, and means controlled by the keyboard for determining the discharge of the carriers.

50. The combination of a movable conveyer having a series of letter holders, a keyboard, mechanism controlled thereby to feed letters successively, a reciprocating conveyer leading from the keyboard and adapted to register with letter holders on said movable conveyer while the same is moving.

51. The combination of a movable conveyer having a series of letter holders, a keyboard, mechanism controlled thereby to feed letters, and an oscillating conveyer leading from the keyboard and adapted to periodically register with the letter holder on the conveyer while the same is moving.

52. The combination of a set of letter carriers, means for moving them forwardly in succession, a reciprocatory conveyer adapted to register with a carrier, means for moving said reciprocatory conveyer forwardly while in registration with a carrier and for thereafter moving it backwardly into registration with another carrier, a keyboard, and mechanism controlled thereby for feeding letters to the carrier by means of said reciprocatory conveyer.

53. The combination of an endless conveyer having letter carriers, an oscillating conveyer, means for causing said oscillating conveyer periodically to register with a carrier on the endless conveyer and move with it and then swing into registration of another carrier, a keyboard and mechanism controlled thereby for feeding letters to the carriers through the oscillating conveyer.

54. The combination with a series of carriers, means for propelling them in a continuous direction, an oscillating conveyer adapted to register with a carrier and then swing back into registration with a succeeding carrier, means for so moving the carriers and conveyer in synchronism, and means for discharging letters through such oscillating conveyer to the carriers.

55. The combination of an endless conveyer, a series of letter carriers mounted thereon, an oscillating conveyer, means for causing said oscillating conveyer to register temporarily with a carrier as it progresses and then swing back into registration with a following carrier, mechanism for continuously moving the endless conveyer in synchronism therewith, and mechanism for feeding letters through the oscillating conveyer to the carriers.

56. The combination with a series of carriers, means for propelling them in a continuous direction, a movable conveyer adapted repeatedly to regitser with a carrier and then move into registration with another carrier, means for so moving the carriers and conveyer in synchronism, a keyboard associated with an inspection station where the address on a letter is inspected, and means for discharging the inspected letter through said conveyer to the carrier.

57. The combination with a series of carriers, means for propelling them in a continuous direction, an oscillating conveyer adapted to register with a carrier and then swing back into registration with a succeeding carrier, means for so moving the carriers and conveyer in synchronism, a keyboard, and means controlled thereby for discharging letters through the oscillating conveyer to various carriers.

58. The combination of an endless movable conveyer, a series of carriers thereon, an oscillating conveyer adapted repeatedly to register with a carrier on the conveyer for a time and then move back into registration with a succeeding carrier, means for concurrently moving the endless conveyer and the oscillating conveyer, a keyboard having an inspection station, and means for discharging a letter from said inspection station through the oscillating conveyer to a carrier.

59. The combination of a series of carriers, means for moving them in succession, an oscillating conveyer adapted to register with a carrier for a time and then move back into registration with a succeeding carrier, means for moving the oscillating conveyer in synchronism with the carriers, means for feeding a stack of letters to said inspection station and separating the foremost letter of the stack and feeding it to said oscillating conveyer, and means for discharging a letter from the oscillating conveyer to a carrier.

60. The combination of an endless conveyer, a series of letter carriers mounted thereon, an oscillating conveyer adapted to register temporarily with a carrier as it progresses and then swing back into registration with a succeeding carrier, mechanism for continuously moving the endless conveyer and for oscillating the oscillating conveyer in synchronism therewith, means for supporting a stack of unassorted letters and feeding them as a whole to an inspection station where the foremost letter is visible, a keyboard, mechansm controlled thereby for separating the foremost letter from the stack and feeding it to the oscillating conveyer, and mechanism for feeding said letter from the oscillating conveyer into the carrier with which it registers.

61. In a mail handling apparatus continuously moving letter carriers, a fixed group of letter feeding rolls and an oscillating letter conveyer arranged with its pivoted end adjacent said feed rolls to receive letters therefrom, and its other end arranged to feed the letters into said carriers, and driving means timed with the carriers to align the discharge end of said oscillating conveyer with a carrier during the discharge portion of the conveyer's oscillation, and to return the same during the other part of the oscillation in time to align with another of said carriers.

62. In a mail handling apparatus, a stop-finger adapted to be interposed in the path of the letters, means for urging a letter against said stop-finger while so interposed, letter-sorting mechanism, a keyboard controlling said mechanism, and means for operating said stop-finger controlled by said keyboard mechanism and arranged to move said stop-finger out of the path of the letter and permit the same to pass, upon an actuation of said keyboard mechanism.

63. In a mail assembling apparatus, a series of inspection stations, keyboard mechanisms at said stations, a conveyer common to all the inspection stations and adapted to be controlled by the said keyboard mechanisms to deliver mail matter, local conveyers from each keyboard mechanism to said common conveyer, and means for separating mail matter from a supply thereof and individually feeding it to said local conveyers.

64. The combination with a plurality of keyboards, of a conveyer system common to all of the keyboards and having letter transporting devices arranged in groups, local conveyers associated with the respective keyboards and adapted to deliver letters to different devices in each group, and means controlled by the keyboards for determining the discharge from the conveyer.

65. The combination with a plurality of keyboards, of a conveyer system common to all of the keyboards and having letter-transporting devices arranged in repeating groups, the different individuals in each group each appertaining to one keyboard only, an oscillating conveyer for each keyboard, means for causing each oscillating conveyer to periodically register with the corresponding devices in the successive groups, and means controlled by the keyboard for determining the discharge from the conveyer.

66. The combination with a series of letter carriers, means for propelling them, a plurality of keyboard mechanisms each having an inspection station and means controlled thereby for feeding letters therefrom and each having a movable conveyer adapted to carry a letter dispatched from the inspection stations to a carrier, and means for causing said conveyers to register with different carriers and move with such carriers while the letters are being fed to them, and mechanism for moving the conveyers to cause them to register with different succeeding carriers.

67. The combination with a continuous series of letter carriers, means for propelling them in one direction continuously, a plurality of keyboard mechanisms each having an inspection station and means controlled thereby for feeding letters therefrom and each having an oscillating conveyer adapted to carry letters dispatched from the inspection station to various carriers, and means for causing said oscillating conveyers to register with different carriers and swing with such carriers while the letters are being fed to them, and mechanism for swinging the oscillating conveyers in opposite direction to the movement of the carriers to cause them to register with different succeeding carriers.

68. The combination of a keyboard, a series of mutually movable members, and mechanical connections between the keys of the keyboard and said members adapted to set the members in various combinations of relative positions greater in number than the number of said members, said mechanical connections including primary and secondary movable elements and means for mechanically coupling them in various combinations.

69. The combination of a keyboard, a series of members adapted to be set in various combinations of relative positions greater in number than the number of said members, and connecting mechanism between said keyboard and said series of members comprising primary elements mechanically connected with the keys for actuation thereby, secondary elements actuating said members, and mechanism connecting said primary and secondary elements in various combinations.

70. The combiation of a keyboard, a set of movable carriers, a settable selector on each carrier, a series of members adapted to be set in various combinations of relative positions and adapted to settingly coact with said selectors, and connecting mechanism between said keyboard and said series of members comprising primary elements mechanically actuated by the keys, secondary elements actuating said members, and mechanism connecting said primary and secondary elements in various combinations.

71. The combination of a keyboard, primary movable elements duplicates of each other, each mechanically operable by a corresponding key of the keyboard, secondary movable elements, classifying mechanism connected with the secondary elements, and a series of members differing from each other and forming a connection between the primary and secondary elements and co-acting with primary elements in combination and with secondary elements individually.

72. The combination of a keyboard, primary movable elements respectively connected with the keys thereof, movable members individually characterized and connected with various primary elements, secondary elements each connected with one of said movable members, and classifying mechanism connected with the secondary elements.

73. The combination of a keyboard, primary movable elements connected with the keys thereof, one element for each key, individually characterized movable members mechanically connected with the primary elements in various combinations, secondary elements each connected with one of said movable members, and classifying mechanism connected with the secondary elements.

74. The combination of a keyboard, primary movable elements duplicates of each other and mechanically connected with the keys of the keyboard respectively, a less number of secondary movable elements, a mechanical connection between the primary and secondary elements comprising members differing from each other and individually connected to the respective secondary elements and connected in various combinations to the primary elements.

75. The combination with a letter conveyer, of a keyboard, a series of primary movable elements duplicates of each other and connected with the keyboard, members differing from each other adapted to be engaged and moved by various primary elements, secondary movable elements connected with said members, and selectors adapted to be set by said secondary elements for controlling the discharge of letters from said conveyer.

76. The combination of a keyboard, primary movable elements duplicates of each other and connected therewith, members differing from each other and each adapted to be engaged by several primary elements, secondary elements each connected with a different one of said permuted members, a conveyer, mechanism controlled by the keyboard for loading letters into the conveyer, and mechanism adapted to be set by said secondary elements for controlling the discharge of letters from the conveyer.

77. The combination of a keyboard, primary movable elements connected therewith, movable transmitting members connected with various primary elements, secondary elements connected with the transmitting members, switches positioned by the secondary elements, a conveyer for mail, a series of selectors adapted to control the discharge from the conveyer, and means whereby said switches may set said selectors.

78. The combination of a series of movable carriers each provided with a selective mechanism having settable members for controlling its discharge, a keyboard, a set of primary movable elements connected therewith, movable transmitting members variously connected with the primary elements, secondary elements connected with said transmitting members, switches connected with said secondary elements, and mechanism for moving the carriers to cause their settable members to move through said switches whereby they may be set by the switches.

79. The combination of a keyboard, primary movable elements connected therewith, rockers connected with various primary elements, secondary elements connected with the rockers, stops positioned by the secondary elements, switches controlled by said stops, a conveyer, carriers thereon each having a set of selector members adapted to be set by said switches and to control the discharge from the carrier, and mechanism controlled by the keyboard for dispatching letters to the carriers.

80. In a keyboard mechanism for mail handling apparatus, a spring-actuated member with a series of stops on the same, a plurality of settable members adapted to be set to selectively engage said stops and halt the said spring-actuated member in various positions, a settable member to control each of said first-mentioned settable members, and a periodically actuated restoring member adapted to engage said first settable members and restore them to their normal position.

81. In a keyboard mechanism for mail-handling apparatus, a spring-actuated slide member with a series of stops on the same, a plurality of settable stops adapted to be set to engage the stops on said slide member and stop the same in various positions, a settable member for each of said settable stops to control the same, a locking member adapted to lock said settable member in its set position, and key-actuated mechanism for setting said settable members and operating said locking member, whereby said key-actuated mechanism may cause the spring-actuated slide member to stop in a selected position and the corresponding settable member to be locked in the set position.

82. In a keyboard mechanism for setting terminal members in a series of combinations of relative positions, primary members actuated by keys, each of said primary members representing a combination of relative positions of two or more of said terminal members, secondary members each representing one position of an individual terminal member, mechanism controlled by the secondary members to position the corresponding terminal members, connecting members between these primary and secondary members, every secondary member being connected with a certain one of said connecting members, and said primary members being arranged to engage two or more of said connecting members to set two or more of said terminal members in the combination of relative positions represented by the actuating key thereof.

83. The combination of carriers each having a selector adapted to control its discharge which selector consists of a plurality of relatively movable members, means for moving the carriers, movable switches, guides adapted to bring the selector members whatever their positions on the carrier into coaction with the switches, a keyboard, and mechanism controlled thereby for moving said switches.

84. The combination of carriers each having a selector adapted to control its discharge which selector consists of a plurality of relatively movable members, means for moving the carriers, movable switches, guides adapted to bring the selector members on the carrier into coaction with the switches, mechanism for moving said switches, means for temporarily retaining said members in the position given them by the switches, and means for locking said members in set posititon.

85. The combination of a series of carriers each having a selector with movable members, means for propelling the carriers, V-shaped guides adapted to engage said members as the carrier is propelled and bring them from various positions to definite positions, switches with which the V-guides communicate, a keyboard, and mechanism operated thereby for shifting the switches.

86. The combination of a series of carriers each having a selector with movable members, means for propelling the carriers, V-shaped guides adapted to engage said members as the carrier is propelled and bring them from various positions to definite positions, channel-shaped switches with which the V-shaped guides communicate, a keyboard, mechanism connecting the same to the channel-shaped switches for positioning the switches, a stationary channeled guide into which the switches selectively discharge and which are adapted to retain the set members in the positions given them by the switches.

87. The combination of an endless conveyer, a series of carriers mounted therein each carrier having a selector with a set of projecting movable elements, guides adapted to bring said elements to definite positions as the carrier moves, switches to which said guides direct the elements, a keyboard, mechanism controlled thereby for moving said switches, and mechanism coacting with the set members on the carrier for determining the point of discharge thereof.

88. The combination with carriers each having a selector with movable elements, movable switches for setting said elements in various positions as the carrier moves, means for moving the carrier, a keyboard, mechanism controlled thereby for setting the switches and mechanism controlled thereby for feeding a letter to the selected carrier while it moves.

89. The combination with carriers each having a selector with movable elements, movable switches for setting said elements in various positions as the carrier moves, means for moving the carrier, a keyboard, mechanism controlled thereby for setting the switches and mechanism controlled thereby for feeding a letter to the particular carrier thus set, a discharge controller coacting with the set selector elements, and a set of receptacles into which the carriers discharge.

90. The combination with a set of carriers, each having a selector with movable elements, a plurality of keyboards correlated with said set of carriers, a set of movable switches for each keyboard for setting said elements in various positions as the carriers move, mechanism controlled by the respective keyboards for setting the switches, and mechanism for moving different cariers into coaction with the switches appertaining to different keyboards.

91. In a classifying system, the combination with settable selectors of means governed by said selectors for controlling the discharge of classified articles, a divided keyboard and means controlled by the conjoint action of different parts of the keyboard for setting the selectors, said means being operable by the actuation and release of one key and the actuation of another key after the release of the former key.

92. In a mail handling machine, the combination with a conveyor having selectors for controlling the discharge from the conveyor, of a selector setter, a divided keyboard, correlating mechanism actuated by both sections of the keyboard and released by the second section, and means controlled by the correlating mechanism for setting the selector setter.

93. In a mail handling machine, the combination of a conveyor, a set of receptacles, selectors, a divided keyboard having two sections each manually operable, means controlled by the conjoint action of the keyboard sections for setting the selectors, and means whereby one section may be actuated and released in advance of the other section without interfering with said conjoint action, and means coacting with the set selectors for determining the discharge from the conveyor to the receptacles.

94. The combination of a keyboard, settable selectors, cumulative mechanism for setting the same under the control of the conjoint action of a plurality of keys in the keyboard independently of the release of the first actuated key, and discharging mechanism controlled by said selectors.

95. The combination of a divided keyboard, selective mechanism having a plurality of members adapted to be set in various combinations, cumulative means controlled by the conjoint action of keys in both portions of the keyboard independently of the release of the first actuated key for so setting said selective mechanism, and discharging mechanism controlled by said selective mechanism.

96. The combination of a keyboard, selecting mechanism having a plurality of members adapted to be set in combinations, cumulative correlating mechanism controlled by the conjoint action of a plurality of keys independently of the release of the first actuated key for setting said selective mechanism into a greater number of combinations than there are keys in the keyboard, and discharging mechanism controlled by said selecting mechanism.

97. The combination of a keyboard, settable selectors, correlating mechanism for setting the same under the control of the conjoint action of a plurality of keys in the keyboard independently of the release of the first actuated key, and means whereby the setting of said selectors may control the discharge of mail.

98. The combination with a series of carriers, selectors thereon adapted to be set in combinations, a keyboard, and cumulative mechanism controlled by the conjoint action of a plurality of keys of the keyboard independently of the release of the first actuated key for setting the selectors on the carriers in various combinations.

99. In a mail handling machine, the combination with a conveyor for moving mail, of a divided keyboard and an inspection station, mechanism controlled by the conjoint action of keys in both portions of the keyboard for controlling the loading of a piece of mail from the inspection station to the conveyor.

100. The combination of a movable conveyor, a series of carriers thereon, a settable selector on each carrier, a divided keyboard, cumulative mechanism for setting the selectors under the control of the conjoint action of keys in the two parts of the keyboard irrespective of the time of release of the key first actuated, and means for discharging the carriers, at points determined by the setting of their selectors.

101. The combination with a conveyor, carriers thereon, each having a selector, a selector setting mechanism for the selectors synchronized with the travel of the conveyor, a divided keyboard, and means for actuating said synchronized setting mechanism independently of the time of operation of the keys in said divided keyboard, a set of receptacles, and means for effecting the discharge from the carriers to the receptacles under the control of said selectors.

102. The combination of a divided keyboard, selector-setting switches, mechanism for setting the same under the control of the conjoint action of keys in the two parts of the keyboard, carriers having selectors, means for propelling them to bring their selectors into coaction with said switches, and means whereby the setting of said selectors may control the discharge of the carriers.

103. In a mail handling apparatus, a selector-setting device arranged to set the settable members of a selector in various combinations of positions, a keyboard mechanism controlling said device, and means for causing some of the keys of said mechanism to control the positioning of some of said settable members and for causing other keys to control the positioning of others of said settable members, and correlating mechanism to prevent either set of keys acting on the selector setter independently of the other set whereby the said keys by being used together in combination render possible the setting of said settable members to a greater number of combinations than the total of the number of keys in the keyboard.

104. The combination of a divided keyboard, settable selectors, mechanism for setting the same under the control of the conjoint action of keys in the two parts of the keyboard, a conveyer for mail, means for effecting the discharge from the conveyer under the control of said settable mechanism, and mechanism controlled by the same conjoint action of the keys for feeding a letter to said conveyer.

105. The combination of a series of carriers each provided with a settable selector, a divided keyboard, mechanism operated by the conjoint action of keys in both portions of the keyboard for setting the selectors on the carriers, and mechanism for loading the carriers actuated also by the conjoint action of the same keys.

106. In a selecting system, the combination of a keyboard divided into two banks, letter feeding mechanism and selective mechanism each controlled by the correlated actuation of keys in the respective banks, and including members traveling with the letters.

107. The combination of keyboard correlating mechanism actuated by two keys thereof but not functioning until the second key has been actuated, selective mechanism including settable members controlled by said correlating mechanism, means for conveying mail matter, and means for moving the settable members with the traveled mail matter, and discharge mechanism controlled by the settable members.

108. The combination of a keyboard divided into two banks, and selective mechanism controlled by the correlated actuation of two keys, one in each bank, the keys in either bank being operable in advance of those in the other bank, but not functioning until the key in the second bank has operated the said selective mechanism having mutually movable members adapted to be set in combinations, the number of which is limited by the product of the numbers of keys in the two banks.

109. The combination of a keyboard divided into two banks, a series of receptacles of a number corresponding to the product of the numbers of coacting keys in the two banks, correlating mechanism actuated by each bank of keys and selective mechanism controlled by the correlating mechanism and controlling delivery to the receptacles including a series of sets of members, the members of a set being actuated by the conjoint action of any two keys, one in each bank, and the different sets coacting successively with the keys.

110. The combination of a keyboard divided into two banks, a series of receptacles of a number corresponding to the product of the numbers of keys in the two banks, a letter conveyor, and carries thereon each having a selective mechanism controlling the discharge thereof to said receptacles, correlating mechanism actuated by keys in each bank independently, but requiring the conjoint action of keys in both banks before the correlating mechanism functions, and means whereby said correlating mechanism sets said selective mechanism.

111. The combination of a keyboard, an endless conveyer adapted to move past the same, carries on said conveyer moving sidewise and having openings in their ends adjacent to the keyboard, and means for feeding letters from under the control of the keyboard into the carriers through such openings.

112. The combination of an endless conveyer moving in a substantially vertical plane and consisting of a series of transverse rails linked together, a trackway for said conveyor, transverse carriers on said rails, and a keyboard past which the carriers move and mechanism controlled by the keyboard for discharging letters into the ends of the carriers.

113. The combination of an endless movable conveyer, carriers arranged transversely thereon and open at one end, a keyboard past which the carriers move and which is adapted to discharge letters, and an oscillating conveyer adapted to register at its movable end with a carrier and transmit thereto letters received at its pivoted end.

114. In a mail handling apparatus, the combination with a conveyor adapted to move the articles of mail and provided with settable selectors, a series of receptacles arranged to receive the sorted articles, and a self-contained unit mounted at the side of the conveyor and comprising a letter exhibiting mechanism independent of the conveyor, mail feeding mechanism for transferring a letter from the exhibiting mechanism to the conveyor, and a keyboard for controlling said selectors.

115. The combination with a series of keyboards, of an endless conveyer one portion of which moves past the keyboards, carriers traveling on the conveyer, means controlled by the keyboards for feeding letters into different ones of said carriers, a set of receptacles, and means for discharging letters from the carriers into said receptacles irrespective of the keyboards at which they were loaded.

116. In a mail handling apparatus, a plurality of rows of receptacles, a letter conveyer extending over all of the rows, means for controlling the discharge from the conveyer at various points in a row, and means for shifting a letter transversely on the conveyer to bring it over receptacles in different rows.

117. In a mail-handling machine, a plurality of rows of receptacles, a conveyer extending along all the rows, and individual carriers mounted on said conveyer and adapted to be moved crosswise on said conveyer to register with any of said rows.

118. In a mail-handling apparatus, a plurality of rows of receptacles arranged side by side, a conveyer spanning all the rows, a carrier on said conveyer, means for shifting said carrier transversely of the rows to cause it to pass over any of said rows, and mechanism to cause the carrier to discharge its contents into any receptacle.

119. The combination of an endless movable conveyer, carriers mounted on the conveyer and shiftable laterally thereon, a plurality of rows of receptacles beneath the conevyer, into which the carriers may discharge, and means for shifting some of the carriers laterally on the conveyer to cause carriers to cooperate with all of the rows of receptacles.

120. The combination of an endless conveyer, carriers mounted on the conveyer and shiftable laterally thereon, means for loading the carriers when on one side of the conveyer, discharge receptacles in a plurality of rows beneath the conveyer, and means for shifting some of the carriers laterally on the conveyer to cause them to cooperate with receptacles on the distant side thereof.

121. The combination of a conveyer, a plurality of keyboard machines on one side thereof, carriers on the conveyer, means controlled by the keyboard machines for switching some of the carriers laterally on the conveyer as the conveyer moves, and a plurality of sets of receptacles adapted to cooperate with carriers in different positions on the conveyer.

122. The combination of an endless conveyer, a series of keyboard machines on one side thereof, carriers on the conveyer, each provided with a settable device, means controlled by the keyboard machines for setting said devices on the carriers, means controlled by said setting for switching some of the carriers laterally on the conveyer as the conveyer moves, and a plurality of sets of receptacles adapted to cooperate with carriers in different positions on the conveyer.

123. The combination with a conveyer, of carriers on the conveyer and movable transversely thereon, selectors on the carriers for controlling their point of discharge, a keyboard on one side of the conveyer, mechanism controlled thereby for setting the selectors on carriers, switching mechanism for shifting on the conveyer carriers having certain settings, and two sets of receptacles coacting with the carriers according to whether they remain on the keyboard side of the conveyer or have been switched to the other side.

124. The combination with a conveyer movable in an endless path, carriers on the conveyer and movable transversely thereon, selectors on the carriers for controlling their point of discharge, a plurality of keyboards on one side of the conveyer, mechanisms for causing the selectors of certain carriers to coact with certain keyboards, mechanisms controlled by the keyboards respectively for setting the selectors on appropriate carriers, switching mechanism for shifting carriers having certain settings on the conveyer, and two sets of receptacles coacting with the carriers according to whether they remain on the keyboard side of the conveyer or have been switched to the other side.

125. The combination of a conveyer having a series of parallel transverse rails linked together, carriers mounted on said rails and shiftable crosswise on the conveyer, selectors on the carriers, a keyboard, mechanism controlled thereby for setting the selectors on carriers, switch mechanism adapted to coact with selectors to cause the lateral shifting of carriers on the conveyer as the conveyer moves, and two sets of receptacles into which the shifted and unshifted carriers respectively may discharge.

126. The combination of an endless conveyer, a series of carriers mounted thereon and adapted to be shifted thereon from one side of the conveyer to the other, two series of receptacles side by side beneath the conveyer, means for moving the conveyer to cause the carriers to pass lengthwise of the rows of receptacles, means for automatically shifting some of the carriers from one side of the conveyer to the other, means for returning said shifted carriers to the original side of the conveyer, and means for loading all of the carriers on said original side of the conveyer.

127. The combination of an endless conveyer, movable in substantially vertical planes, a series of carriers mounted thereon and adapted to be shifted from one side of the conveyer to the other, two series of receptacles side by side beneath the conveyer, means for moving the conveyer to cause the carriers to pass over the end thereof and travel above both series of receptacles, means for automatically shifting some of the carriers from one side of the conveyer to the other before they pass over the receptacles, and means for returning said shifted carriers to the original side of the conveyer.

128. The combination of a conveyer, a series of carriers mounted thereon and adapted to be shifted thereon from one side of the conveyer to the other, two series of receptacles side by side, means for moving the conveyer to cause the carriers to pass along said receptacles, means for automatically shifting some of the carriers from one side of the conveyer to the other, means for returning said shifted carriers to the original side of the conveyer, selectors on the carriers, means coacting with the selectors for causing discharge at receptacles predetermined by the position of the selectors, a keyboard, and mechanism controlled thereby for setting the selectors of a carrier and for loading said carrier with mail while it is on said original side of the conveyer.

129. The combination with a conveyer, of a carrier adapted to be mounted thereon and moved thereby, said carrier comprising a narrow box open at one end and having a door at one of its other edges, means for loading said carrier through the open end, and means for opening said door at a time when the letter is above it, whereby the letter may drop by gravity through the open doorway.

130. The combination with a conveyer, of a carrier adapted to be mounted thereon and moved thereby, said carrier comprising a narrow box adapted to stand in a vertical position and be open at one vertical end and having a door at its then top edges, means for loading said carrier through the open vertical end, and means for inverting the carrier and opening said door at a time when the letter is above it, whereby the letter may drop by gravity through the open doorway.

131. In a mail handling system, the combination with a conveyer, of a carrier adapted to be mounted thereon and consisting of a narrow box having an open end, a selector carried by the carrier, discharging mechanism cooperating with said selector, a receptacle into which the carrier may discharge under the conjoint action of such selector and discharging mechanism, a keyboard, and mechanism controlled thereby for loading the carrier through its open end and for setting the selector.

132. In a mail handling system, the combination with an endless movable conveyer, of a set of carriers mounted thereon transversely of the conveyer and each consisting of a narrow box having an opening at one end, a keyboard past which the carriers move, mechanism controlled thereby for loading carriers through their open ends, and a set of receptacles into which the carriers may discharge.

133. In a mail handling apparatus, a letter carrier and a letter discharge controlling selector comprising a series of successively operating settable members, and means for causing the initial member to hold the second member locked until said initial member is moved to the zero position.

134. In a mail handling apparatus, a letter carrier and a letter discharge controlling selector comprising a series of successively operating settable members, and means for causing the initial member to hold the second member locked until said initial member is moved to the zero position, and the second member being arranged to hold the third locked until said second member is moved to the zero position, and so on throughout the series.

135. In a mail handling apparatus, a letter discharge controlling selector comprising a series of settable members each adapted to be set in any one of a plurality of positions and means controlled by each member except the last for locking another member, whereby any member but the first and last one of the series is held locked by the preceding member and in turn holds locked the succeeding member of the series.

136. In a machine of the character described, the combination of a series of receptacles, a conveyer, carriers adapted to be propelled on the conveyer, a series of mutually movable selector members on each carrier, each member locking the subsequent member of the series, means for setting said selector members, and a discharge device with which said selector members coact to be successively released.

137. The combination with a conveyer, of carriers thereon, each provided with selecting mechanism comprising a plurality of progressively interlocking members adapted to be moved into different positions, and discharge controlling mechanism coacting with said members to successively release them.

138. The combination with a conveyer and distribution receptacles, of carriers each provided with selecting mechanism comprising a plurality of pivoted members adapted to be swung into different positions and locked, and discharge controlling mechanism adapted to successively unlock the pivoted members.

139. A carrier for a mail handling system having means for holding a letter, and having a selector comprising a plurality of members adapted to be set in combinations of two or more members, combined with a conveyer for propelling the carrier, means for moving the selector as a whole relative to the carrier when the latter is in a certain position, and setting mechanism for the selector brought into coaction with it by such movement.

140. A carrier for a mail handling system having a compartment for a letter, a door to said compartment, and a selector controlling said door and comprising a plurality of members adapted to be set in combinations of two or more members.

141. A carrier for a mail handling system having a compartment for a letter, a door to said compartment and a selector comprising a series of members adapted to be set in combinations of two or more members, each of said members locking the subsequent member of the series and the last of said members when released being adapted to unlock said door, and a discharge controlling device successively releasing said members.

142. In a mail handling apparatus, the combination of a letter conveyer system provided with settable selective mechanism, and a continuous permuted selector controlling device common to a series of discharge stations and adapted to engage the said settable mechanism and release the same at a point determined by the setting of said mechanism.

143. In a mail handling system, the combination with a set of receptacles and a conveyer adapted to transport mail matter, of a permuted rail adapted to coact with settable mechanism carried by the conveyer to determine the discharge to said receptacles.

144. The combination, with a set of receptacles, of a series of carriers, a conveyer adapted to transport the same in proximity to the set of receptacles, selectors on the carriers, and a permuted rail with which said selectors coact to determine into which receptacles they discharge.

145. The combination of a series of receptacles arranged in a row, a permuted rail extending longitudinally thereof above the receptacles, a series of letter carriers adapted to be propelled longitudinally above the row of receptacles, each carrier having a settable discharge controlling mechanism coacting with the permuted rail.

146. The combination with a row of receptacles, of a permuted rail extending lengthwise of said row, carriers, means for propelling them lengthwise of the permuted rail, each carrier being provided with a plurality of selector members adapted to coact with said rail, and means whereby discharge from the carriers is determined by the point where the selectors pass out of such coaction.

147. In a mail assembling apparatus, a series of receptacles, a letter delivering mechanism including selective devices to cause the delivery of letters to predetermined receptacles, each selective device comprising a series of settable members, and a continuous permuted selector controlling device extending along the receptacles and arranged to engage the settable members of said selectors and release the same in the permuted order to control the discharge to the receptacle predetermined by the setting of said members.

148. The combination with a row of receptacles, of a permuted rail extending lengthwise of said row, carriers, means for propelling them lengthwise of the permuted rail, each carrier being provided with a series of progressively interlocking selector members adapted to coact with said rail and be successively released by it, and means whereby discharge from a carrier is determined by the point where the last selector member is released.

149. In a mail assembling apparatus, a distributing mechanism comprising a selector having a plurality of settable members arranged such that each member when released unlocks for operation the succeeding member, and a permuted selector controlling device comprising a series of groups of controlling members for each of said settable members, said groups being so arranged that the group controlling each settable member according to the setting of the same determines in which group the next following settable member will be released, and discharging means coacting with the last settable member of the selector upon its release to discharge the letter.

150. In a mail assembling apparatus, a series of receptacles, a letter distributing mechanism including settable members to control the distribution of letters to said receptacles, and a permuted selector-controlling device arranged to engage said settable members and release them at points predetermined by their setting, said selector-controlling device comprising a plurality of series of groups of engaging members, the members of the first series being arranged to release the said settable members in predetermined groups of the second series, and the members of the second series being arranged to release said settable members in predetermined groups of the third series, whereby the discharge of a letter to a given receptacle is predetermined by the setting of said settable members and their consequent release successively in a predetermined group in each of said series of controlling members.

151. In a mail assembling apparatus, a selector comprising a series of settable members adapted to be released successively, the last member upon release being arranged to control letter discharge mechanism, and a permuted device to control the successive release of said settable members comprising engaging members for the same arranged in groups such that the group that engages the first member of said series determines by the setting thereof in which one of a plurality of groups the second member will be released, and this group predetermining by the setting of the said second member in which one of a plurality of groups the third member will be released.

152. The combination of a row of receptacles, a permuted rail extending lengthwise thereof, a set of carriers, means for propelling them lengthwise of the permuted rail, each carrier having a set of movable selector members adapted to coact with the rail, a door for the carrier, and mechanism for locking the door connected with the selectors and serving to open the door when the last selector is released.

153. In a mail handling system, the combination, with a set of receptacles, of a conveyer system adapted to transport mail matter and provided with settable selective mechanism, and a permuted rail adapted to coact with said settable mechanism to determine the discharge to said receptacles, said permuted rail having longitudinal guiding members terminating at various points.

154. The combination with a series of receptacles, of a permuted rail extending along the series and having a plurality of guiding members terminating at various points, a conveyer, and settable selective mechanism carried thereby and adapted to coact with the permuted rail.

155. The combination of a permuted rail having a plurality of guiding members terminating at various points, a letter conveyer, settable selective mechanism carried thereby and adapted to coact with the permuted rail, said selective mechanism having a series of progressively interlocking movable members, and means for discharging a letter when the last member of the selective mechanism appertaining thereto is released.

156. The combination with a series of receptacles, of a permuted rail extending along the series and having a plurality of guiding members terminating at various points, a conveyer, carriers on the conveyer, and settable discharge-controlling mechanism on each carrier adapted to coact with the permuted rail.

157. The combination with a series of receptacles, of a stationary permuted rail having a series of guiding members terminating at various points corresponding to the entrances of the receptacles, a series of carriers, settable selective mechanism on each carrier comprising a series of mutually movable members adapted to coact with the permuted rail, mechanism for releasing the letter on the carrier when the last of said members clears the permuted rail, and means for propelling the carriers.

158. The combination with a series of receptacles, of a permuted rail having a series of guiding members terminating at various points corresponding to the entrances of the receptacles, a series of carriers, settable discharge controlling mechanism on each carrier adapted to coact with the permuted rail, means for propelling the carriers, a keyboard, and mechanism controlled thereby for setting the discharge controlling mechanism on the carriers.

159. The combination of a series of receptacles arranged in a row, a permuted rail extending longitudinally of the row above the receptacles and having guiding members terminating at various points, a mail conveyer adapted to transport letters one after the other in a path above the receptacles, and settable selecting mechanism movable by the conveyer and adapted to coact with the permuted rail and serving to control the discharge of the letters to the receptacles.

160. The combination of a series of receptacles arranged in a row, a permuted rail extending longitudinally thereof above the receptacles, a series of letter carriers adapted to be propelled longitudinally above the row of receptacles, each carrier having a settable selective mechanism coacting with the permuted rail, each carrier having a door at the edge which is at the bottom when the carriers are above the receptacles, and mechanism connecting said door with the settable selective mechanism to cause it to be opened when the selective mechanism clears the permuted rail.

161. The combination, with a series of receptacles, an endless conveyer movable in a vertical plane, the lower reach of its travel extending along above the receptacles, carriers mounted in said conveyer and each provided with a settable selector to control the discharge therefrom, and a permuted rail extending along the set of receptacles and adapted to coact with the settable mechanism on the carriers as they are propelled over the receptacles.

162. In a mail handling apparatus, a set of carriers each provided with a selector comprising mutually movable members, a selector setting device comprising a plurality of settable guide members adapted to engage the individual settable members and guide said members to position, each of said guide members being independently settable whereby said members may be set in various combinations of positions including two or more members, and a discharge controller having variously terminating longitudinal guiding portions adapted to engage said settable members and release them at various points.

163. In a mail assembling apparatus, a selector controlling permuted device comprising a plurality of series of groups of blades each of said groups comprising a set of blades, each blade in the set being shorter than the preceding blade and longer than the succeeding blade, the first series comprising a single group of said blades, the second series comprising a group of blades for each blade in the first series and the third series comprising a group for each blade in the second series.

164. In a mail handling system, the combination with a conveyer, of a series of receptacles arranged in a row each receptacle comprising a back plate and a bottom which is secured to the back of the adjacent receptacle, and a shelf in each receptacle carried by the back of the adjacent receptacle.

165. In a mail handling system, the combination with a conveyer, of a set of receptacles arranged in a row, each receptacle standing in an inclined position and comprising a back plate, an end plate, and a bottom plate, the backs of the various receptacles constituting the fronts of the adjacent receptacles, and means for feeding letters from the conveyer to the receptacles.

166. In a mail handling system, the combination of a row of receptacles, a conveyer extending along the same and adapted to discharge letters thereinto, a movable bottom stop in each receptacle, and feeler mechanism controlled by the letters for causing the stops to recede.

167. In a mail handling system, the combination of a conveyer, a series of receptacles, means whereby letters transported by the conveyer may be discharged into various receptacles, a movable bottom stop for each receptacle, power mechanism and individual clutches for effecting the movement of the bottom stop, and feeler mechanism for controlling the respective clutches.

168. In a mail assembling apparatus, a letter moving and distributing mechanism, a series of receptacles arranged adjacent the same to receive the letters, and a plurality of controlling keyboard mechanisms arranged along the same and adapted to control said distributing mechanisms to discharge letters into said receptacles, and means to feed unsorted letters to said keyboard mechanisms.

169. In a mail assembling apparatus, the combination of a plurality of keyboard-controlled letter despatching stations, a conveyer, a set of carriers on said conveyer for each of said despatching stations, and a set of receptacles common to all of said carriers, whereby carriers from any of the despatching stations in the system may be controlled to discharge into a common receptacle.

170. In a multiple keyboard mail assembling apparatus, the combination of a plurality of keyboard-controlled letter sorting mechanisms, a single set of receptacles, and a conveyer common to all the said keyboard mechanisms to take letters from the same and deposit them in certain of said receptacles as predetermined wholly by said keyboard mechanisms, whereby letters from all of said keyboard mechanisms are automatically sorted and assembled into the single set of receptacles.

171. Mail distributing apparatus comprising a carrier having a continuous series of letter-holding pockets, a plurality of discharge chutes over which said carrier moves, and manually controlled selective mechanism for mechanically opening the pockets when they overlie predetermined discharge chutes.

172. Distributing apparatus for conveying units from a common source and distributing them to selected discharge stations, said apparatus embodying a series of selective devices controlling the distribution of said units, each device having several movable members for attaining the set ups necessary to cause discharge of a unit at any one of said stations, each member movable to any one of several positions, and setting up mechanism comprising means to move one of said members to any one of said several positions and other means to move another of said members to any one of its several positions, and a discharge mechanism which said set of members is adapted to engage to control the discharge.

173. In a mail handling machine, the combination with a conveyor for moving mail, of a divided keyboard and an inspection station, mechanism controlled by the conjoint action of keys in both portions of the keyboard for controlling the loading of a piece of mail from the inspection station to the conveyor, and means for freeing said keys to enable them to determine the loading of other mail independently of the time of feeding the piece first mentioned.

174. In a mail assorting machine, the combination with a letter delivering means, of a distributing device adapted to successively receive and to carry a plurality of letters, said device including a pocket for an individual letter provided with a movable discharge door, a discharging member mounted independently of the distributing device and adapted to effect movement of the discharge door, and a key board controlled selective mechanism for cooperating with said discharge member.

175. In a mail assorting machine, the combination with letter delivering means, of a distributing device including a pocket provided with a movable discharge door, a locking device for holding the door normally against movement, a discharging member mounted independently of the distributing device and adapted to cooperate with the locking device to effect release of the discharge door, an adjustable trip arm carried by the distributing device for engagement with the discharging member, and locking means for holding the trip arm in adjusted position.

176. Distributing apparatus for conveying units from a common source and distributing them to selected discharge stations, said apparatus being characterized by a series of selective devices for controlling the distribution of said units, each device having several movable members for attaining various selective set ups, each of said members being movable to two or more different operative positions to cooperate in attaining various set ups, whereby the total number of set ups thereby attained in each device is greater than the number of said members of said device, and a discharge device which said members engage to determine the points of distribution.

177. Distributing apparatus for conveying units to and discharging them at various discharge stations, comprising a conveyor, keyboard-controlled means for delivering units to the conveyor for distribution, a series of keyboard-controlled selective devices moving with said conveyor and controlling and predetermining the points of discharge of the units from the conveyor, and a series of runways for said selective devices arranged side by side and longitudinally of the conveyor and terminating at various points, said selective devices being movable transversely of the conveyor to attain various set ups and select the runways in which they will travel, the points of termination of the sets of runways determining the discharge station at which the units will be respectively discharged.

178. Distributing apparatus for displaying the addresses of mail units for reading by the operator and for conveying such units to and delivering them at various discharge stations according to the addresses of such units, said apparatus comprising a series of mail unit carriers movable in a circuit past various discharge stations, a keyboard-controlled feeder for causing delivery of mail units to said carriers, and a series of keyboard-controlled selective devices movable in a circuit in timed relation to the movement of said carriers and predetermining and controlling the points of discharge of the units from the carriers, said selective devices each comprising a plurality of members each individually movable transversely of the direction of forward movement of said series of devices to any one of several positions, to attain various selective set ups.

179. Distributing apparatus comprising a series of carriers movable in a circuit past a series of discharge stations, keyboard-controlled means for delivering units to be distributed, one at a time to said carriers respectively, selective devices for said carriers respectively, and movable forward therewith, each selective device embodying a plurality of shiftable members which by means of their combination control and predetermine the point at which the unit will be discharged from its carrier, setting up mechanism for said selective devices embodying a plurality of members, each movable to various positions, and a series of independent controlling elements operatively connected to said last mentioned members.

180. Distributing apparatus comprising conveying means for transporting units to be distributed and discharging them at various predetermined discharge stations, mechanism for successively delivering units to be distributed to said conveying means, selective devices movable with said conveying means and controlling the points at which the units are discharged from said conveying means, each selective device embodying a plurality of members shiftable to various operative positions transversely of the direction of movement of said devices to attain various selective set ups by means of the combination of said members, and keyboard controlling means for said mechanism for delivering the units and for said selective devices.

181. Distributing apparatus comprising conveying means for transporting units to be distributed and discharging them at selected discharge stations, feeding means for delivering units one at a time to said conveying means, a series of selective devices each comprising a plurality of mutually acting members controlling and predetermining the points at which the units are discharged, setting up mechanism for said selective devices embodying a plurality of movable members, and a keyboard controlling said feeding means and said setting up mechanism and embodying several independently movable controlling elements operatively connected with said movable members to shift each of the same to various positions.

182. Distributing apparatus for conveying units from a common source and distributing them to selective discharge stations, said apparatus being characterized by a keyboard controlled feeder, a series of selective devices for controlling the distribution of said units, and keyboard controlled mechanism for setting up said devices to predetermine the station at which each unit is to be discharged, each device embodying a plurality of mutually acting members each movable by said setting up mechanism to two or more different operative positions in attaining various set ups.

183. The combination with an endless continuously moving conveyor for units to be distributed, of receptacles arranged adjacent thereto for receiving said units, a keyboard alongside of the conveyor, a letter exhibiting mechanism associated with the keyboard, a normally inactive feeder associated with the exhibiting mechanism and controlled by the keyboard for delivering units one at a time from the exhibiting mechanism to the conveyor, and selective devices also controlled by the keyboard predetermining the discharge of units from said conveyor, said selective devices continuously moving in unison with said conveyor.

184. In combination, in a mail distributing apparatus, a continuously moving letter conveyor, a series of adjustable selective elements determining the delivery points of the letters from the conveyor, exhibiting mechanism alongside the conveyor, feeding mechanism for feeding letters from the exhibiting mechanism to the conveyor, a setting-up mechanism common to all of said elements and for setting the same, a keyboard having a series of manually-controlled keys, and operating mechanism therefrom to said setting up mechanism to determine the position to which the same shall be moved.

185. Distributing apparatus comprising a series of carriers, means for continuously moving the carriers in a circuit past various discharge stations, exhibiting mechanism alongside the carriers, feeding mechanism for feeding letters from the exhibiting mechanism to the conveyor, and a continuously moving series of keyboard-controlled selective devices controlling the delivery of units from the carriers at discharge stations predetermined by said selective devices.

186. Distributing apparatus comprising a series of receptacles, a series of carriers for conveying units and distributing the same to said receptacles, mechanism for moving said carriers in a circuit past said receptacles, letter exhibiting mechanism alongside the carriers, associated keyboard mechanism alongside the carriers, and a normally inactive feeder also alongside the carriers for delivering units one at a time from said letter exhibiting mechanism to said carriers as the carriers are advanced past the feeder, means whereby said feeder and carriers are so mutually arranged and controlled that the feeder delivers a unit only when a carrier is in position to receive the same, and keyboard-controlled selective devices predetermining and controlling the delivery of the units from the carriers, said selective devices moving in unison with said carriers.

187. Distributing apparatus comprising a series of carriers movable in a circuit past a series of discharge stations for conveying units and distributing the same to such stations, a series of selective devices movable with said carriers, for predetermining and controlling the points at which the units will be discharged from the carriers, each carrier being provided with a selective device comprising a plurality of members, each movable laterally with respect to the path of movement of the carrier to various positions to attain, by reason of their combination, any set-up necessary to cause discharge of the unit in said carrier at any one of several discharge stations, and setting up mechanism common to the selective devices of said carriers and embodying movable means to shift said plurality of members of the selective devices laterally to various set ups.

188. Distributing apparatus comprising a series of carriers movable in a circuit past a series of discharge stations for conveying units and distributing the same to such stations, key-board-controlled means for delivering units to said carriers, a series of selective devices movable with said carriers, for predetermining and controlling the points at which the units will be discharged from the carriers, each carrier being provided with a selective device comprising a plurality of members, each movable laterally with respect to the path of movement of the carrier to various positions to attain, by reason of their combination any set up necessary to cause discharge of the unit in said carrier at any one of several discharge stations, and keyboard-controlled setting up mechanism common to the selective devices of said carriers and embodying movable means to shift said plurality of members of the selective devices laterally to various set ups.

189. The combination with a continuously moving conveyor, carriers thereon, each having a selector, a selector setting mechanism for the selectors synchronized with the travel of the conveyor, a keyboard, and means for actuating said synchronized setting mechanism independently of the time of operation of the keys in said keyboard but requiring the conjoint operation of two keys, means automatically acting consequent upon the keyboard operation for loading the carriers, a set of receptacles, and means for effecting the discharge from the carriers to the receptacles under the control of said selectors.

190. The combination with a keyboard, of a conveyor having a series of containers adapted to confine mail matter loosely, and means controlled by the keyboard for inserting mail matter in the individual containers.

191. The combination with a keyboard, of a conveyor comprising a series of containers adapted to envelop mail matter loosely, a selector associated with each container and adapted to control the discharge thereof, and means whereby the keyboard may set the selectors.

192. The combination with a keyboard, of a conveyor comprising a series of containers adapted to confine mail matter loosely, means controlled by the keyboard for inserting mail matter in the individual containers, a selector associated with each container and adapted to control the discharge thereof, and means whereby the keyboard may set the selectors.

193. The combination of an endless conveyor comprising a set of containers, each adapted to envelop mail matter, mechanism for inserting mail matter in the respective containers, settable selectors respectively associated with the containers, a series of receptacles, mechanism coacting with said selectors to effect the discharge from the containers to the receptacles, a keyboard, and mechanism controlled by the keyboard for setting the selectors.

194. The combination of an endless conveyor comprising a set of containers, each adapted to confine mail matter without clamping it, mechanism for inserting mail matter in the respective containers, a settable selector associated with each container, mechanism coacting with said selector to effect the discharge from the containers, a keyboard, and mechanism controlled by the keyboard for operating the inserting mechanism and for setting the selectors.

195. In a mail distributing apparatus, the combination of a narrow movable container adapted to loosely confine mail matter, and means for inserting such matter by moving it edgewise through an open narrow side of the container.

196. In a mail distributing apparatus, the combination of a narrow movable container adapted to loosely confine mail matter, a keyboard and mechanisms controlled thereby for inserting such matter by moving it edgewise through an open narrow side of the container.

197. In a mail distributing apparatus, the combination of a movable conveyor comprising a connected series of narrow containers, each adapted to confine mail matter, and mechanism for inserting such matter by moving it edgewise through an open narrow side of the container.

198. In a mail distributing apparatus, the combination of a movable conveyor comprising a connected series of narrow containers, each adapted to confine mail matter, mechanism for inserting such matter by moving it edgewise through an open narrow side of the container, a keyboard and mechanism controlled thereby for operating said inserting mechanism.

199. In a mail distributing apparatus, the combination of a movable conveyor comprising a connected series of narrow containers, each adapted to confine mail matter, mechanism for inserting such matter by moving it edgewise through an open narrow side of the container, a selector associated with each container and adapted to control the discharge therefrom, a keyboard, and mechanism controlled thereby for setting the selector.

200. In a mail distributing apparatus, the combination of a movable conveyor comprising a connected series of narrow containers, each adapted to confine mail matter, mechanism for inserting such matter by moving it edgewise through an open narrow side of the container, a series of receptacles, a selector associated with each container and adapted to control the discharge therefrom to a receptacle determined by the selector, a keyboard, and mechanism controlled thereby for operating the inserting mechanism and for setting the selector.

201. The combination with a letter conveyor, of a keyboard, a series of primary movable elements duplicates of each other connected with the keyboard, rockers individually different from each other pivoted on stationary pivots and adapted to be engaged and moved by various primary elements, secondary movable elements connected with the rockers, and selectors adapted to be set by said secondary elements for controlling the discharge of letters from said conveyor.

202. The combination of a keyboard, primary movable elements duplicates of each other connected therewith, intermediately pivoted rockers individually different from each other each adapted to be engaged on one side of the pivots by several primary elements, secondary elements each connected on the other side of the pivots with a different one of said rockers, a conveyor, mechanism controlled by the keyboard for loading letters into the conveyor, and mechanism adapted to be set by said secondary elements for controlling the discharge of letters from the conveyor.

203. In a mail handling apparatus, the combination of a letter moving conveyor having settable selectors, a series of receptacles arranged beneath the same to receive sorted letters, letter feeding mechanism located alongside of the conveyor, selector setting mechanism, and letter exhibiting mechanism and an associated keyboard mechanism also arranged alongside of the conveyor and adjacent to the letter feeding mechanism, said keyboard mechanism being adapted to control the selector setting mechanism after the operator has read the address on the letter and to control the feeding mechanism to dispatch such letter from the exhibiting mechanism to the conveyor.

204. Apparatus for distributing mail comprising a movable carrier provided with a plurality of pockets each adapted to envelop an individual piece of mail matter, a series of movable index members associated with each of said pockets, means to feed letters to said pockets successively, a keyboard disposed at the side of said carrier and from which at least one of the index members of the pocket filled may be set, a plurality of discharge chutes over which said carrier passes, and means engageable with the set index members during the movement of said carrier to control the opening of the pockets to discharge each of the letters from the carrier into a predetermined discharge chute.

205. Apparatus for distributing mail comprising a movable carrier having a continuous series of pockets each adapted to envelop an individual piece of mail matter, and selective mechanism for discharging letters from said pockets at predetermined points comprising a plurality of movable index members associated with each letter-holding pocket, each of said members being capable of assuming any one of a plurality of different positions, means to adjust the position of said index members, and means adapted to operate upon the adjusted index members to discharge the letters from the carrier.

206. Apparatus for distributing mail comprising a movable carrier having a continuous series of letter-holding devices, and selecting mechanism for discharging letters from said devices at predetermined points comprising a plurality of movable index members associated with each letter-holding device, each of said members being capable of assuming any one of a plurality of different operative positions, a key-board by means of which any one of said members may be moved to any one of its positions, and means co-operating with the adjusted index members to discharge the letters from the carrier.

207. Apparatus for distributing mail comprising a movable carrier having a continuous series of letter-holding pockets, a series of adjustable index members for each of said letter holding pockets each of which members is shiftable to any one of a plurality of different operative positions, and means coacting with said index members to discharge the letters from the carrier.

208. Apparatus for distributing mail comprising a movable carrier having a continuous series of letter-receiving pockets, a series of adjustable index members associated with each of said pockets, each of said members being shiftable to any of a plurality of different operative positions, a keyboard having means for shifting any one of said members to any one of its several positions, and means adapted to coact with said index members during movement of the carrier to discharge the letters from the carrier.

209. Apparatus for distributing mail comprising a movable carrier having a plurality of letter-receiving pockets, a series of adjustable index members associated with each of said pockets, each of said members being shiftable to any one of a plurality of different operative positions, a keyboard by which said carrier moves having a series of shiftable bars, each of which is capable of cooperating with and shifting to a predetermined extent one of the members of any series of said index members, and means coacting with said index members during movement of the carrier to discharge the letters therefrom.

210. In a mail distributing apparatus, the combination of a conveyor having a series of letter confining carriers each having a plurality of index members, each index member being settable to a plurality of operative positions, means for feeding letters to said letter confining carriers, and a keyboard controlling the index members.

211. In a mail distributing apparatus, the combination of a conveyor having a series of pockets, each adapted to loosely confine an individual piece of mail, a plurality of index members associated with each pocket, each index member being settable to a plurality of operative positions, and a keyboard with mechanism controlled thereby for setting the index members.

212. An apparatus for distributing mail comprising a movable conveyor having a continuous series of pockets each adapted to envelop an individual piece of mail matter, a selector for each pocket, and means coacting with said selector to cause the discharge of the mail from the pocket.

213. An apparatus for distributing letters comprising a movable conveyor having a series of pockets each adapted to envelop a letter, a selector for each pocket, a keyboard and an associated letter exhibiting station, and mechanism controlled by the keyboard for characterizing the selector and for controlling the feeding of the letter from the inspection station to the pocket.

214. An apparatus for distributing mail comprising a movable conveyor having a continuous series of pockets each adapted to envelop an individual piece of mail matter, a plurality of adjustable index members for each pocket, a keyboard for setting the index members, and means coacting with said index members to cause the discharge of the mail from the pockets.

215. An apparatus for distributing mail comprising a movable conveyor having a continuous series of pockets each adapted to envelop an individual piece of mail matter, a plurality of adjustable index members for each pocket, a keyboard, means controlled thereby for feeding mail matter into the pockets and for setting the index members, and means coacting with said index members to cause the discharge of the mail from the pockets.

In testimony whereof, I hereunto affix my signature.

CHARLES C. CADDEN.

Witnesses:
GEORGE OENSLAGER,
C. GEHRING.